(12) United States Patent
Yoshida et al.

(10) Patent No.: US 7,822,204 B2
(45) Date of Patent: Oct. 26, 2010

(54) ENCRYPTION METHOD, CRYPTOGRAM DECODING METHOD, ENCRYPTOR, CRYPTOGRAM DECODER, TRANSMISSION/RECEPTION SYSTEM, AND COMMUNICATION SYSTEM

(75) Inventors: Setsuo Yoshida, Kawasaki (JP); Osamu Hirota, Yokohama (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 968 days.

(21) Appl. No.: 11/525,164

(22) Filed: Sep. 22, 2006

(65) Prior Publication Data

US 2008/0044011 A1   Feb. 21, 2008

(30) Foreign Application Priority Data

Sep. 22, 2005  (JP) .............................. 2005-276117
Jul. 10, 2006  (JP) .............................. 2006-189313

(51) Int. Cl.
*H04K 1/00* (2006.01)
*H04L 9/00* (2006.01)
*H04L 9/28* (2006.01)

(52) U.S. Cl. ...................... 380/268; 380/255; 380/259; 380/260; 380/263; 380/28

(58) Field of Classification Search ................ 380/255, 380/44, 28–30, 259–263, 268; 713/150, 713/160, 161; 709/224, 230

See application file for complete search history.

(56) References Cited

U.S. PATENT DOCUMENTS

| | | | | |
|---|---|---|---|---|
| 5,193,115 | A * | 3/1993 | Vobach | 380/46 |
| 6,052,786 | A * | 4/2000 | Tsuchida | 726/14 |
| 6,882,727 | B1 * | 4/2005 | Vialen et al. | 380/33 |
| 2005/0157875 | A1 * | 7/2005 | Nishioka et al. | 380/46 |
| 2005/0182833 | A1 * | 8/2005 | Duffie et al. | 709/224 |
| 2007/0103204 | A1 * | 5/2007 | Egan et al. | 327/100 |
| 2008/0019523 | A1 * | 1/2008 | Fuse et al. | 380/256 |

OTHER PUBLICATIONS

Handbook of Applied Cryptography by Menezes et al; Year: 1997; Publisher: CRC Press LLC; Pertinent pp. 169-172.*
H.P. Yuen, KCQ: "A New Approach to Quantum Cryptography, I. General Principles and Key Generation", quant-ph/0311061, vol. 6, dated Jul. 30, 2005; pp. 26, (Dept. of Electrical and Computer Engineering, Dept. of Physics and Astronomy, Northwester University, Evanston, IL 60208).
O. Hirota, et al., "Quantum Stream Cipher Based On Optical Communications", Quantum Communications Quantum Imaging II, Proc. Of SPIE, vol. 5551, dated 2004, pp. 206-219.

(Continued)

*Primary Examiner*—Taghi T Arani
*Assistant Examiner*—Madhuri Herzog
(74) *Attorney, Agent, or Firm*—Staas & Halsey LLP

(57) ABSTRACT

An encryption technique allowing use of classic Y-00 scheme performed using classic physical random numbers instead of quantum fluctuation in electrical communication and data storage in recording media, including a first modulation step for multilevel-modulating input data by associating with specific state pairs determined by physical random numbers, a second modulation step for outputting the output of the first step by irregularly associating with another signal by physical random numbers, and a channel coding step for channel-coding the output of the second step into desired codeword and outputting it as encrypted data, wherein the decoded signal obtained by channel-decoding the encrypted data can be discriminated which of specific state pairs the signal corresponds to and demodulated into the input data, and output by the first modulation by state pairs other than the specific state pairs and the second modulation by a physical random number different from the physical random number.

26 Claims, 37 Drawing Sheets

OTHER PUBLICATIONS

T. Tsuchimoto, et al. "Property of Optimum Quantum Detection for Mixed-States By DSR", The 27th Symposium on Information Theory and Its Applications (SITA2004), vol. 1, pp. 359-362 (with English Translation of the whole document).

Massey, et al., "Linear Ciphers and Random Sequence Generators with Multiple Clocks", Advances in Cryptology—Eurocrypt '84, LNCS 209, 1985, pp. 74-87.

Goudail et al., "Influence of a Perturbation in a Double Phase-Encoding System", Journal of the Optical Society of America, vol. 15, No. 10, Oct. 1998, pp. 2629-2638.

Rivest, et al., "Randomized Encryption Techniques", Advances in Cryptology, Proceedings of Crypto 82, Aug. 25, 1982, pp. 145-163.

European Search Report dated Jul. 14, 2009 for corresponding European Patent Application No. 06019374.5.

* cited by examiner

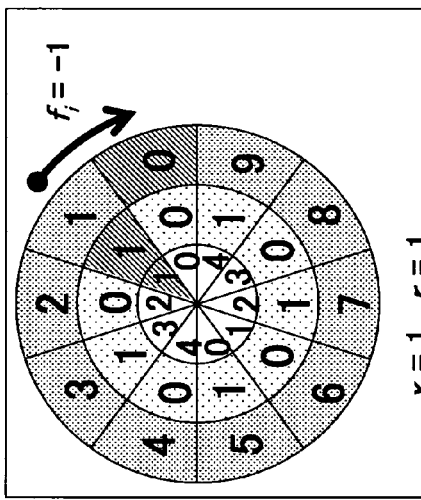
FIG. 11(A) CASE 1
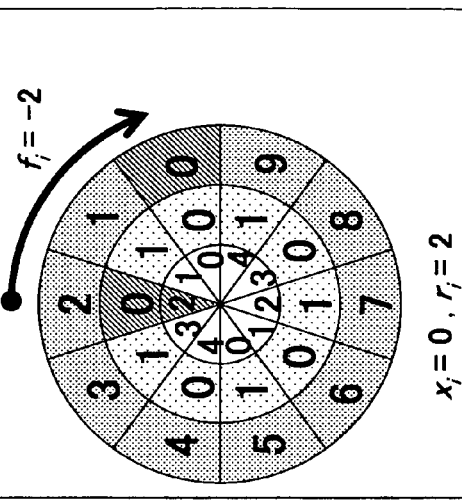
FIG. 11(B) CASE 2
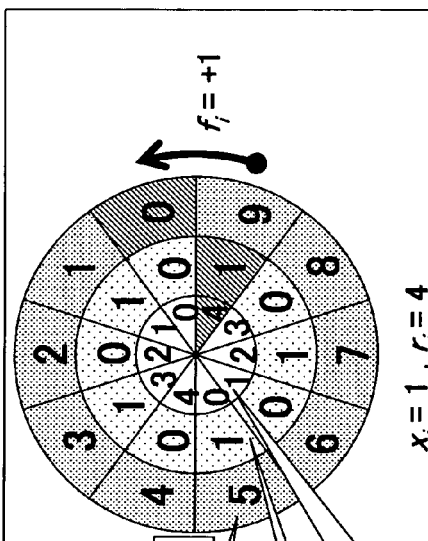
FIG. 11(C) CASE 3
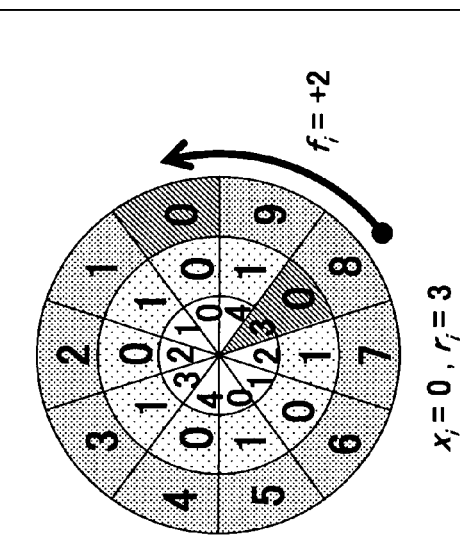
FIG. 11(D) CASE 4

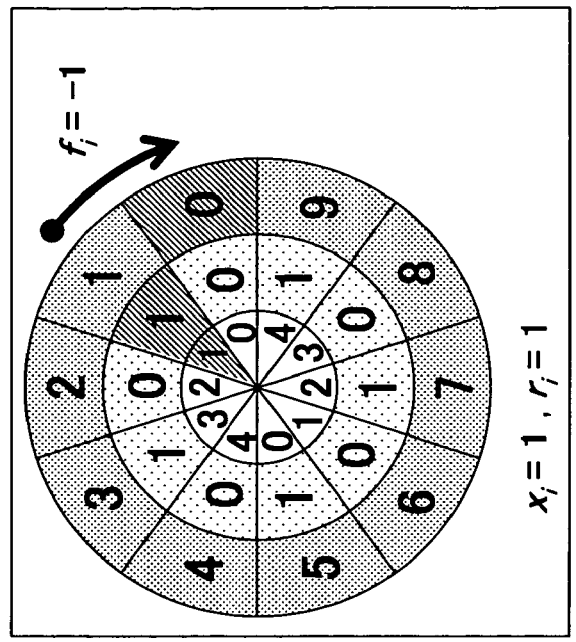
FIG. 12(B) CASE 2
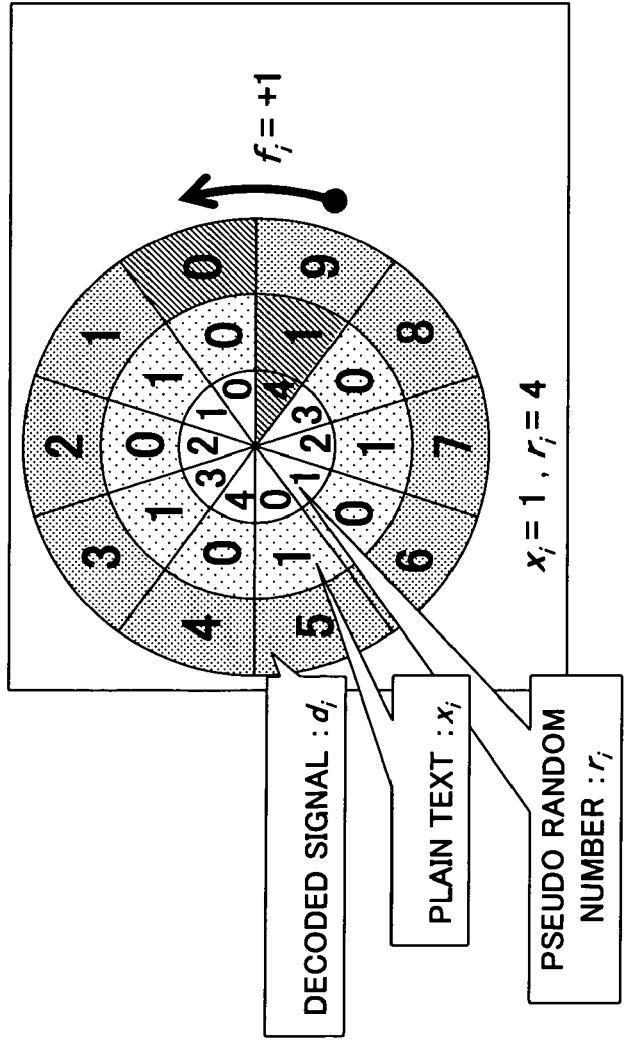
FIG. 12(A) CASE 1

$f_i \in \{-3, 0, 1, 4\}$
WHEN $r_i = 4$,
$A_i = \{1, 4, 5, 8\}$
$B_i = \{0, 3, 6, 9\}$

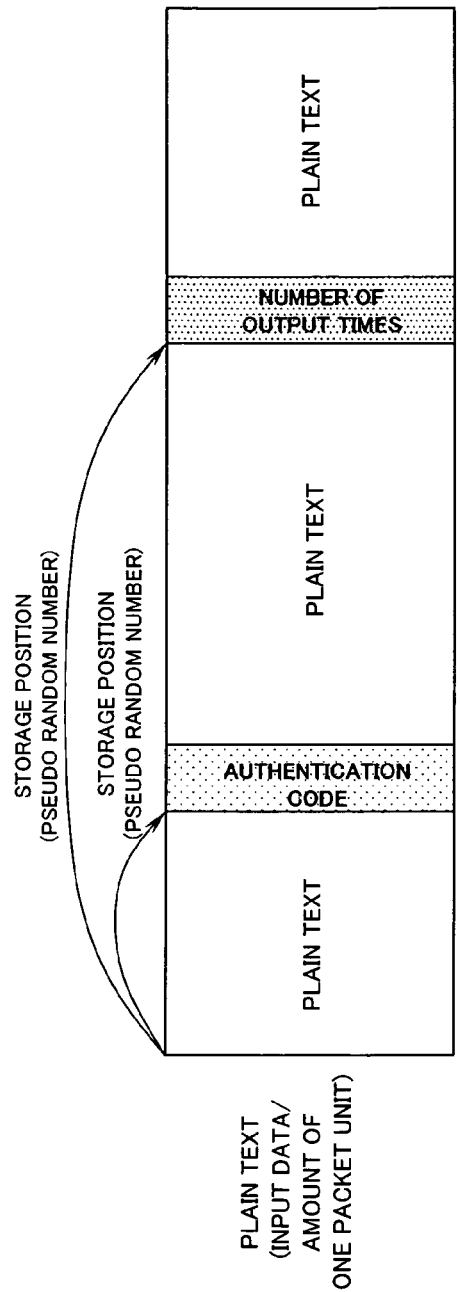
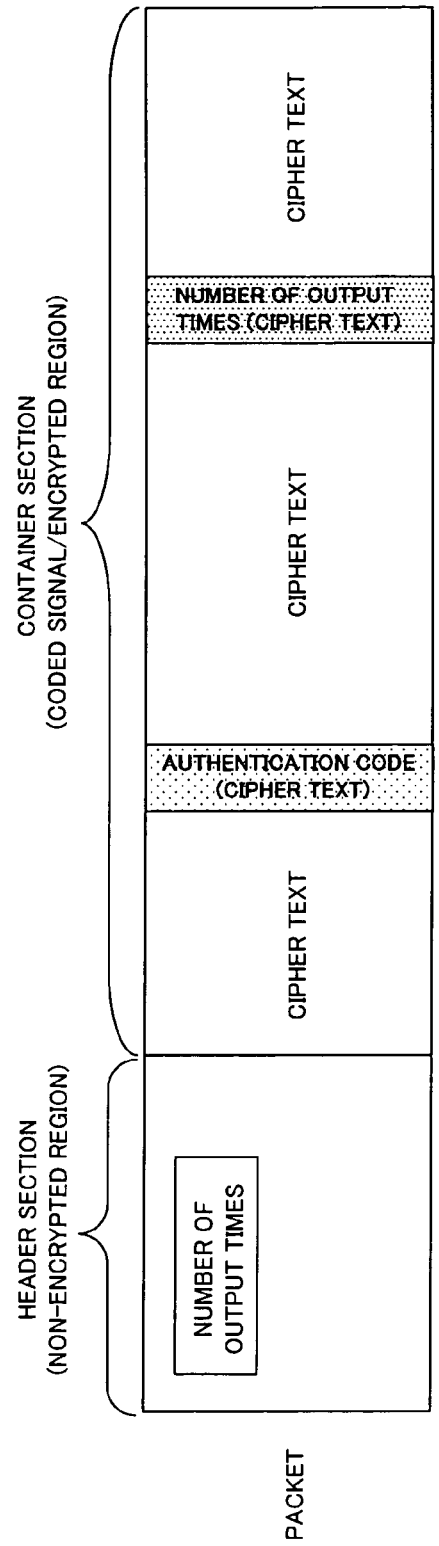
FIG. 25(A)
FIG. 25(B)

ENCRYPTION METHOD, CRYPTOGRAM DECODING METHOD, ENCRYPTOR, CRYPTOGRAM DECODER, TRANSMISSION/RECEPTION SYSTEM, AND COMMUNICATION SYSTEM

BACKGROUND OF THE INVENTION (1) Field of the Invention

The present invention relates to an encryption/cryptogram decoding technique used in a system in which information is encrypted for transmission and reception, and particularly to a technique that realizes classic Yuen encryption having a far greater encryption strength than conventional mathematical encryption by using the classic physical random number instead of quantum fluctuation in the Yuen quantum cryptography system and capable of being applied to a variety of media.

(2) Description of the Related Art

In a modern network, as an encryption method, mathematical encryption such as common-key cryptography is used. Typical examples include stream cipher (classic cipher). FIG. 17 is a block diagram showing the configuration of a general transmission/reception system to which the stream cipher is applied, and a transmission/reception system 100 shown in FIG. 17 is configured by including an encryptor 110 encrypting plain text on a legitimate transmitter side and a cryptogram decoder 120 decoding the cipher text transmitted via a network etc. on a legitimate receiver side.

Here, the encryptor 110 is configured by including a pseudo random number generator 111 and a modulation section (an exclusive OR arithmetic unit) 112. The pseudo random number generator 111 generates and outputs a pseudo random number $r_i$ based on an encryption key K set in advance and, for example, if the encryption key K is a binary number of 100 bits, as the pseudo random number $r_i$, a binary number of $(2^{100}-1)$ bits, that is, a pseudo random number with a period of $(2^{100}-1)$ bits is generated. The modulation section 112 calculates an exclusive OR (XOR) of plain text $x_i$ to be encrypted and the pseudo random number $r_i$ generated by the pseudo random number generator 111 and outputs it as cipher text $c_i$. In other words, the plain text $x_i$ is encrypted by the modulation section 112 based on the pseudo random number $r_i$ and output as the cipher text $c_i$.

In addition, the cryptogram decoder 120 is configured by including a pseudo random number generator 121 and a demodulation section (an exclusive OR arithmetic unit) 122. The pseudo random number generator 121 generates and outputs the pseudo random number $r_i$ in synchronization with the pseudo random number generator 111 based on the same encryption key K as that of the pseudo random number generator 111 of the encryptor 110. The demodulation section 122 calculates an exclusive OR (XOR) of the cipher text $c_i$ transmitted from the encryptor 110 and the pseudo random number $r_i$ generated by the pseudo random number generator 111 and outputs it as the plain text $x_i$. In other words, the cipher text $c_i$ is decoded by the demodulation section 122 based on the pseudo random number $r_i$ (the pseudo random number generated based on the same encryption key as the encryption key K used to generate the pseudo random number $r_i$ on the encryptor 110 side) in synchronization with the pseudo random number $r_i$ on the encryptor 110 side and output as the plain text $x_i$.

In the transmission/reception system 100 to which such stream cipher is applied, there is the possibility that the cipher text $c_i$ may be decoded by an attack method called a known plain text attack. The known plain text attack is an attack method by which an interceptor not only intercepts the cipher text $c_i$ but also acquires the plain text $x_i$ before encrypted into the cipher text $c_i$ and obtains a pseudo random number by collating the cipher text $c_i$ and the plain text $x_i$ and using the pseudo random number, decodes the cipher text other than the part the plain text of which has been acquired.

Since the pseudo random number generator 111 calculates and outputs a numerical sequence that appears to be a random number in a pseudo manner based on the encryption key K, if the pseudo random number sequence output from the pseudo random number generator 111 is acquired with a length equal to or greater than the number of digits of the encryption key K, the encryption key K is calculated inversely from the pseudo random number sequence and all of the pseudo random numbers are reproduced as a result. For example, if 100 bits of cipher text and 100 bits of plain text corresponding to the cipher text are acquired, the 100 bits of the encryption key are calculated inversely and other cipher text is also decoded.

In such a situation, recently, a quantum cipher technique considered as impossible to decode (unconditionally safe) against any attack method including the above-described known plain text attack is proposed. For example, in the following non-patent documents 1 and 2, a technique called Yuen cipher (Y-00 scheme quantum cryptography) or a technique called quantum stream cipher is proposed. The Y-00 scheme quantum cryptography is quantum cipher communication using a number of quantum states in a quantum-mechanically non-orthogonal state as a multilevel signal.

The case where the Y-00 scheme quantum cryptography is realized with a multilevel phase modulation scheme by using the phase of light beams in a coherent state as a quantum state is explained below with reference to FIG. 18.

Coherent light beams arranged with adjoining phase angles are assigned with plain text of one bit "0" and plain text of one bit "1" alternately. In an example shown in FIG. 18, the coherent light beams arranged at phase angles of $\phi_{i-1}, \phi_i, \phi_{i+1}, \phi_{i+2}, \ldots$, are assigned with plain text "0", "1", "0", "1", ..., respectively.

When the light intensity expressed by the number of photons is about 10,000, the interval of arrangement of phase multilevel signals is designed so that coherent light beams the phase angles of which are close cannot be discriminated from each other due to quantum fluctuation (coherent noise) by performing multilevel phase modulation of about 200 levels. In the example shown in FIG. 18, the interval of arrangement of phase multilevel signals is designed so that the two coherent light beams arranged at adjoining phase angles of $\phi_{i-i}$ and $\phi_{i+1}$, respectively, fall within quantum fluctuation by performing multilevel phase modulation of the coherent light beam with a phase angle of $\phi_i$.

On the other hand, coherent light beams having phase angles 180 degrees different from each other are assigned with plain texts with inverted bits. For example, when the coherent light beam at a phase angle of 0 degree is assigned with plain text of one bit "0", the coherent light beam at a phase angle of 180 degrees is assigned with plain text of one bit "1". With these coherent light beams having phase angles 180 degrees different from each other as a set, which one of sets is used to express plain text of one bit is determined using a pseudo random number with which a transmission side and a reception side are synchronized, and is switched to another for each communication of plain text of one bit.

In the example shown in FIG. 18, the respective coherent light beams at phase angles of $\phi_{1-1}, \phi_i, \phi_{i+1}, \phi_{i+2}, \ldots$, are assigned with plain text "0", "1", "0", "1", ..., and the coherent light beams having phase angles 180 degrees different from each other, that is, the respective coherent light beams at phase angles of $\phi_{i-1}+180°$, $\phi_i+180°$, $\phi_{i+1}+180°$, $\phi_{i+2}+180°$, ..., are assigned with plain text "1", "0", "1", "0", ..., as described above. At this time, when N (N is even) of the coherent light beams having different phase angles are set, N/2 of sets of coherent light beams having phase angles 180 degrees different from each other are set, as a result, and a value out of N/2 of integer values, for example, out of 0 to (N/2−1), is generated as a pseudo random number. Then, when plain text of one bit "1" is transmitted, if, for example, "i" is generated as a pseudo random number, the set of coherent light beams at phase angles of $\phi_i$ and $\phi_i+180°$ is selected and multilevel phase modulation of the coherent light beam at a phase angle of $\phi_i$ is performed so that the coherent light beams at a phase angle of $\phi_i$ and the adjoining coherent light beams at phase angles of $\phi_{i-1}$, and $\phi_{i+1}$ fall within quantum fluctuation, and thus a light signal after multilevel phase modulation is transmitted.

Since the reception side knows which set of coherent light beams is used using the pseudo random number synchronized with the transmission side, it is possible to judge whether the plain text is "1" or "0" by discriminating the two states 180 degrees different in phase angle.

At this time, since the quantum fluctuation is small, discrimination of coherent light beams at phase angles close to each other (discrimination distance is small) is impeded, however, when discrimination of which one of the two coherent light beams 180 degrees apart in phase angle is received is not impeded. However, an interceptor does not know the pseudo random number that the legitimate transmitter and receiver use, therefore, it is not possible for her/him to know which one of sets of coherent light beams is used in communication.

Because of this, in order to decode the intercepted cryptogram, it is necessary for the interceptor to correctly know the phase of the coherent light beam the transmitter has sent to demodulate the light signal having been subjected to multilevel phase modulation, however, it is not possible for the interceptor to discriminate the coherent light beam indicative of the state of plain text ("1" or "0") from the coherent light beam the phase angle of which is close to that of the coherent light beam in question for demodulation even if the interceptor has intercepted the coherent light beam flowing through the transmission channel because it is buried in the quantum fluctuation.

For example, if the reception side receives a light signal having been subjected to multilevel phase modulation so that the coherent light beam at a phase angle of $\phi_i$ and the coherent light beams at phase angles of $\phi_{i-1}$ and $\phi_{i+1}$ adjacent thereto fall within the quantum fluctuation, as described above, it is necessary for the interceptor to discriminate among the coherent light beams at phase angles of $\phi_{i-1}$, $\phi_i$, and $\phi_{i+1}$ (coherent light beams with small discrimination distance), therefore, decoding is impossible. In contrast to this, it is possible for the legitimate receiver to discriminate that the set of coherent light beams at phase angles of $\phi_i$ and $\phi_i+180°$ is used based on the pseudo random number synchronized with that of the transmission side, therefore, it is possible to discriminate between the two states of the phase angles 180 degrees different, to demodulate to know that the plain text is "1", and to decode the cryptogram.

As described above, according to the Y-00 scheme quantum cryptography, extremely high safety can be secured compared to the classic cryptography without quantum fluctuation because information is devised so that discrimination is impossible by means of quantum fluctuation. As a technique for further improving safety, the Deliberate Signal Randomization (DSR) theory that irregularly varies a multilevel signal to be transmitted has been developed. Refer to the non-patent documents 1 and 3.

On the other hand, the above-mentioned scheme cannot be used with electric signals or electromagnetic waves because it uses a quantum-mechanical communication medium. Although inferior to a quantum system with respect to safety, a scheme called classic Y-00 scheme that performs such cryptography in a classic physical system has been researched in Tamagawa University etc.

[Non-patent document 1] H. P. Yuen, "A New Approach to Quantum Cryptography", quant-ph/0311061 v6 (2004)

[Non-patent document 2] O. Hirota, K. Kato, M. Sohma, T. Usuda, K. Harasawa, "Quantum stream cipher based on optical communications", Proc. on Quantum communication and quantum imaging, SPIE, vol-5551, 2004

[Non-patent document 3] T. Tsuchimoto, T. Tomari, S. Usami, T. Usuda, I. Takumi, "Quantum optimum detection properties for mixed state by DSR", The 27th Information Theory and Applications Symposium, vol-1, pp. 359-362, December, 2004.

It is necessary to use a communication medium having quantum-mechanical properties in order to perform the above-described Y-00 scheme in the quantum system, therefore, its application range is limited. In such a situation, the applicants of the present invention have proposed a classic Y-00 scheme for performing the Y-00 scheme using pseudo random numbers in a classic physical system and noises in a physical system (for example, Japanese Patent Application No. 2004-260512 etc.). However, the embodiments of the classic Y-00 scheme so far apply analog DSR, therefore, its output is necessarily a multilevel signal and application of the encryption technique is not possible to a recording media such as an electric memory, a flexible disc, a CD (Compact Disc), and a DVD (Digital Versatile Disc), etc.

SUMMARY OF THE INVENTION

The present invention has been devised in view of the above-mentioned problems and an object thereof is to provide a classic Y-00 scheme encryption technique capable of being applied to a recording media such as an electric memory, a flexible disc, a CD (Compact Disc), and a DVD (Digital Versatile Disc), etc. and having a far greater encryption strength than conventional mathematical encryption.

In order to attain the above-mentioned object, an encryption method of the present invention is characterized in that encrypted data is generated by a first modulation step for multilevel-modulating input data by associating the data with a specific pair of states determined by a pseudo random number, a second modulation step for performing a discrete DSR technique that modulates the output in the first modulation step by associating the output with a discrete value determined by a physical random number, and a channel coding step for channel-coding the output into a desired codeword and the decoded signal obtained by channel-decoding the encrypted data is a signal that can be demodulated into the input data by discriminating which state of the specific pair of states the signal corresponds to by the pseudo random number and that can be output by the first modulation by a pair of states other than the specific pair of states and the second modulation by a physical random number different from the physical random number.

Further, when the discrete DSR technique is performed, preferably, the number of states selected by the physical random number is equal to or greater than four and is set so as not to exceed the number of sets of the pair of states, modulation is performed by adding/subtracting the physical random number to/from the output in the first modulation step in the second modulation step for the discrete DSR, the number of states selected by the physical random number is determined in accordance with a desired encryption strength, the number of the pairs of states is determined in accordance with the number of states, and the number of states of the pseudo random number is determined in accordance with the number of the pairs of states.

A cryptogram decoding method of the present invention is characterized by comprising a step for channel-decoding encrypted data into a decoded signal, the encrypted data being: obtained by performing a first modulation for multi-level-modulating input data by associating the data with a specific pair of states determined by a pseudo random number and by channel-coding the output of a second modulation, for performing a discrete DSR technique that modulates the output of the first modulation by associating the output with a discrete value determined by a physical random number, into a desired codeword; and encrypted in such a manner that the decoded signal obtained by channel-decoding the encrypted data is a signal that can be demodulated into the input data by discriminating which state of the specific pair of states the signal corresponds to by the pseudo random number and that can be output by the first modulation by a pair of states other than the specific pair of states and the second modulation by a physical random number different from the physical random number, wherein the decoded signal is demodulated into the input data by discriminating which state of the specific pair of states the signal corresponds to by a pseudo random number based on the same encryption key as the encryption key having generated the pseudo random number used in the first modulation.

An encryptor of the present invention is characterized by comprising a pseudo random number generation section for generating a pseudo random number based on an encryption key, a first modulation section for multilevel-modulating input data by associating the data with a specific pair of states determined by the pseudo random number generated by the pseudo random number generation section, a physical random number generation section for generating a physical random number based on a physical phenomenon, a second modulation section for modulating the output of the first modulation section by associating the output with a discrete value determined by a physical random number generated by the physical random number generation section, and a channel-coding section for channel-coding the output of the second modulation section into a desired codeword and outputting the codeword as encrypted data, wherein modulation is performed by the first modulation section and the second modulation section so that the decoded signal obtained by channel-decoding the encrypted data is a signal that can be demodulated into the input data by discriminating which state of the specific pair of states the signal corresponds to by the pseudo random number and that can be output by the first modulation by a pair of states other than the specific pair of states and the second modulation by a physical random number different from the physical random number.

In such an encryptor, the pseudo random number generation section, the first modulation section, the physical random number generation section, and the second modulation section may be arranged in a tamper-resistant region for suppressing the probability distribution variations due to physical disturbance in the physical random number generated by the physical random number generation section as well as suppressing the leakage of the encryption key and the pseudo random number, or the pseudo random number generation section may be configured so as to prohibit reset and repetition of the pseudo random number generation operation. Further, the encryptor of the present invention may comprise:

a nonvolatile first hold section for holding the number of input times of a clock signal for causing the pseudo random number generation section to perform the pseudo random number generation operation as the number of output times of pseudo random number and outputting the number of output times to the outside of the tamper-resistant region in response to a command from the outside of the tamper-resistant region; and a synchronization adjustment section for adjusting the number of output times of pseudo random number from the pseudo random number generation section based on the number of output times read from the first hold section in order to synchronize the pseudo random number generation operation by the pseudo random number generation section with a demodulation pseudo random number generation operation by a demodulation pseudo random number generation section of a cryptogram decoder in a destination communication device of the encrypted data. Furthermore, the encryptor of the present invention may comprise:

a nonvolatile second hold section for holding the same random number table as that of the destination communication device;

a cryptogram transmission section for encrypting the number of output times of pseudo random number read from the first hold section into encrypted synchronization information based on the random number table held in the second hold section and transmitting the encrypted synchronization information to the destination communication device; and a decoding reception section for decoding the encrypted synchronization information received from the destination communication device into the number of output times of demodulation pseudo random number based on the random number table held in the second hold section, wherein the synchronization adjustment section, when the number of output times of demodulation pseudo random number on the destination communication device side decoded by the decoding reception section is greater than that of pseudo random number read from the first hold section, may adjust the number of output times of pseudo random number from the pseudo random number generation section to the number of output times of demodulation pseudo random number on the destination communication device side.

A cryptogram decoder of the present invention is characterized by decoding encrypted data, the encrypted data being: obtained by performing a first modulation for multilevel-modulating input data by associating the data with a specific pair of states determined by a pseudo random number and by channel-coding the output of a second modulation, for performing a discrete DSR technique that modulates the output of the first modulation by associating the output with a discrete value determined by a physical random number, into a desired codeword; and encrypted in such a manner that the decoded signal obtained by channel-decoding the encrypted data is a signal that can be demodulated into the input data by discriminating which state of the specific pair of states the signal corresponds to by the pseudo random number and that can be output by the first modulation by a pair of states other than the specific pair of states and the second modulation by a physical random number different from the physical random number, and also characterized by a channel-decoding section for channel-decoding the encrypted data into a decoded signal, a demodulation pseudo random number generation section for generating a pseudo random number based on the same encryption key as the encryption key having generated the pseudo random number used in the first modulation, and a demodulation section for demodulating the decoded signal into the input data by discriminating which state of the specific pair of states the signal corresponds to by the pseudo random number generated by the pseudo random number generation section.

In such a cryptogram decoder, the demodulation pseudo random number generation section and the demodulation section may be arranged in a tamper-resistant region for suppressing the leakage of the encryption key and the demodulation pseudo random number, or the demodulation pseudo random number generation section may be configured so as to prohibit reset and repetition of the demodulation pseudo random number generation operation. Further, the cryptogram decoder of the present invention may comprise:

a nonvolatile first hold section for holding the number of input times of a clock signal for causing the demodulation pseudo random number generation section to perform the demodulation pseudo random number generation operation as the number of output times of demodulation pseudo random number and outputting the number of output times to the outside of the tamper-resistant region in response to a command from the outside of the tamper-resistant region; and a synchronization adjustment section for adjusting the number of output times of demodulation pseudo random number from the demodulation pseudo random number generation section based on the number of output times read from the first hold section in order to synchronize the demodulation pseudo random number generation operation by the demodulation pseudo random number generation section with a pseudo random number generation operation by a pseudo random number generation section of an encryptor in a sender communication device of the encrypted data. Furthermore, the cryptogram decoder of the present invention may comprise:

a nonvolatile second hold section for holding the same random number table as that of the sender communication device;

a cryptogram transmission section for encrypting the number of output times of demodulation pseudo random number read from the first hold section into encrypted synchronization information based on the random number table held in the second hold section and transmitting the encrypted synchronization information to the sender communication device; and a decoding reception section for decoding the encrypted synchronization information received from the sender communication device into the number of output times of pseudo random number based on the random number table held in the second hold section, wherein the synchronization adjustment section, when the number of output times of pseudo random number on the sender communication device side decoded by the decoding reception section is greater than that of demodulation pseudo random number read from the first hold section, adjusts the number of output times of demodulation pseudo random number from the demodulation pseudo random number generation section to the number of output times of pseudo random number on the sender communication device side.

A transmission/reception system of the present invention is characterized by comprising first and second transmission/reception devices communicably connected to each other, wherein:

the first transmission/reception device is configured by including a first encryptor for encrypting input data to be transmitted to the second transmission/reception device and a first cryptogram decoder for decoding encrypted data received from the second transmission/reception device;

the second transmission/reception device is configured so as to include a second encryptor for encrypting input data to be transmitted to the first transmission/reception device and a second cryptogram decoder for decoding encrypted data received from the first transmission/reception device;

each of the first and second encryptors comprises:

a modulation pseudo random number generation section for generating a modulation pseudo random number based on an encryption key;

a first modulation section for multilevel-modulating input data by associating the data with a specific pair of states determined by a modulation pseudo random number generated by the modulation pseudo random number generation section;

a physical random number generation section for generating a physical random number based on a physical phenomenon;

a second modulation section for modulating the output of the first modulation section by associating the output with a discrete value determined by a physical random number generated by the physical random number generation section; and a channel-coding section for channel-coding the output of the second modulation section into a desired codeword suited to a communication channel and outputting the codeword as encrypted data;

the first and second modulation sections are configured so that the decoded signal obtained by channel-decoding the encrypted data is a signal that can be demodulated into the input data by discriminating which state of the specific pair of states the signal corresponds to by the demodulation pseudo random number and that can be output by the first modulation by a pair of states other than the specific pair of states and the second modulation by a physical random number different from the physical random number; and the first and second cryptogram decoders are configured so as to respectively include:

a channel decoding section for channel-decoding the encrypted data into a decoded signal;

a demodulation pseudo random number generation section for generating a demodulation pseudo random number based on the same encryption key as the encryption key having generated the modulation pseudo random number; and a demodulation section for demodulating the decoded signal into the input data by discriminating which state of the specific pair of states the signal corresponds to by a demodulation pseudo random number generated by the demodulation pseudo random number generation section.

A communication system of the present invention is characterized by comprising:

the above-described encryptor provided in a sender communication device of the encrypted data and transmitting the encrypted data to a destination communication device as a plurality of packets; and the above-described cryptogram decoder provided in the destination communication device of the encrypted data and decoding the encrypted data in each packet received from the encryptor of the sender communication device, wherein:

a serial number about the plurality of packets or the number of output times of pseudo random number used in the first modulation section for the encrypted data in the container section of each packet is described in the header section of each packet to be transmitted from the encryptor to the cryptogram decoder; and the cryptogram decoder comprises a packet hold section for holding the plurality of packets from the encryptor and a permutation section for permutating the plurality of packets held in the packet hold section into an order in accordance with the serial number or the number of output times described in the header section of each packet and inputting it to the demodulation section.

In such a communication system, the serial number or the number of output times may be included in the encrypted data in the container section of each packet to be transmitted from the encryptor to the cryptogram decoder and the cryptogram decoder may comprise:

a first comparison section for comparing the serial number or the number of output times described in the header section of each packet with the serial number or the number of output times included in the demodulation result of the encrypted data by the demodulation section; and a packet discard section for discarding the packet when the result of comparison by the first comparison section is that the serial numbers or the numbers of output times do not coincide.

According to the present invention described above, by further performing the second modulation that performs the discrete DSR technique using a physical random number for the output subjected to multilevel modulation by a pseudo random number, a discrete signal output can be obtained, therefore, it is made possible to perform desired channel coding and because of this, it is possible to provide classic Y-00 scheme cryptography having a far greater encryption strength than the conventional mathematical encryption and capable of being stored as data in electric memories and a variety of recording media that can be used in radio communication and electrical communication and further of minimizing the influence on the communication speed without being influenced by noises.

BRIEF DESCRIPTION OF THE DRAWINGS

FIG. 11(A) to FIG. 11(D) are diagrams for explaining the encryption strength of cipher text against a cipher-text-only attack obtained by the encryption technique in the present embodiment.

FIG. 12(A) and FIG. 12(B) are diagrams for explaining the encryption strength of cipher text against a known plain-text attack obtained by the encryption technique in the present embodiment.

FIG. 25(A) is a diagram showing an example of incorporation of an authentication code and the number of output times into input data (plain text) in the second example of the communication system shown in FIG. 20, and FIG. 25(B) is a diagram showing an example of packeted input data (plain text) shown in FIG. 25(A).

DESCRIPTION OF THE PREFERRED EMBODIMENTS

Embodiments of the present invention will be explained below with reference to drawings.

[1] Configuration of the Encryptor in the Present Embodiment

Figure 1:
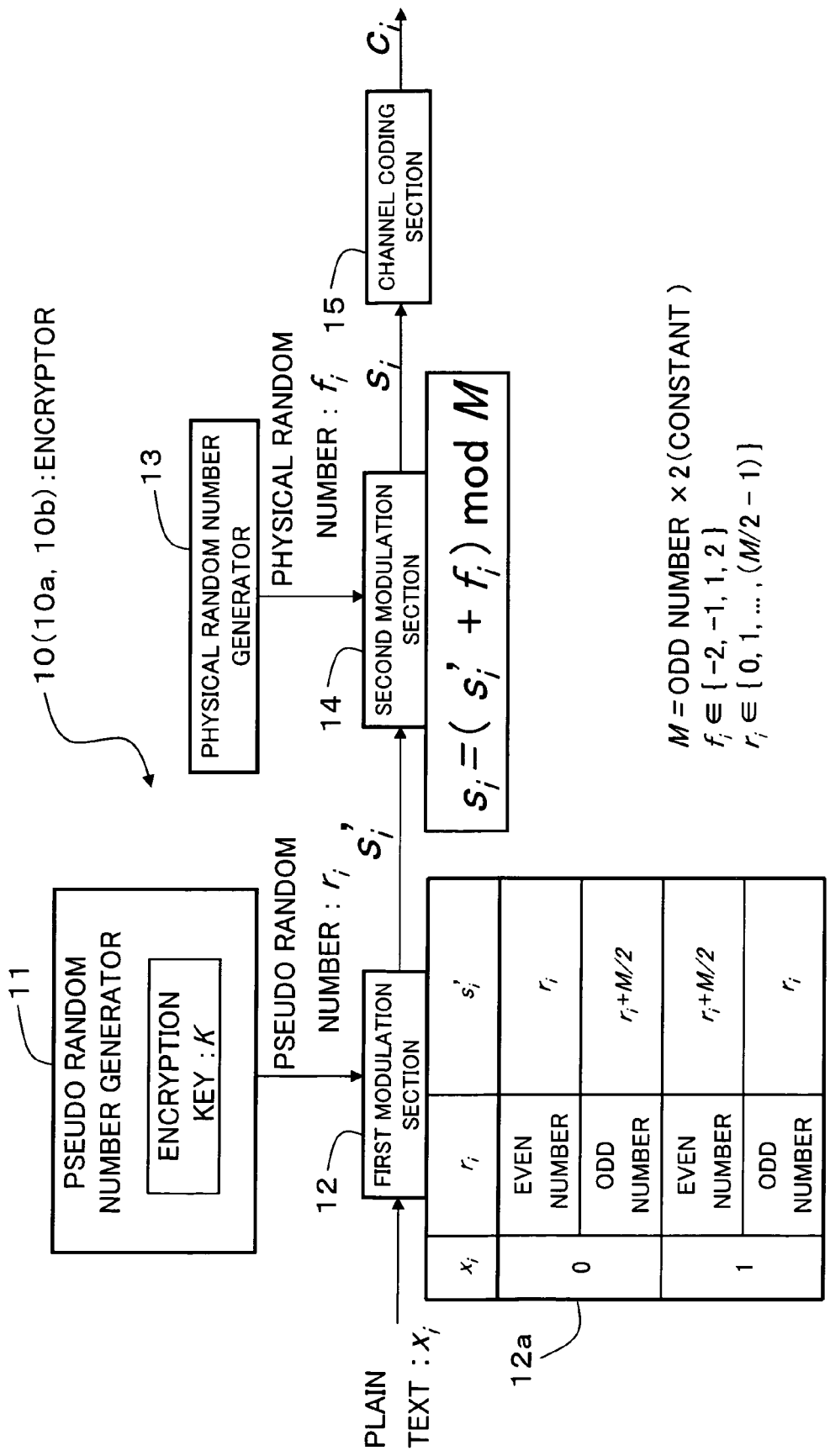
FIG. 1 is a block diagram for showing a configuration of an encryptor as an embodiment of the present invention.

FIG. 1 is a block diagram showing a configuration of an encryptor as an embodiment of the present invention and as shown in FIG. 1, an encryptor 10 in the present embodiment is configured so as to provide a pseudo random number generator 11, a first modulation section 12, a physical random number generator 13, a second modulation section 14, and a channel-coding section 15.

The pseudo random number generator (the pseudo random number generation section, the modulation pseudo random number generation section) 11 generates and outputs the modulation pseudo random number $r_i$ based on an encryption key K set in advance. For example, if the encryption key K is a 100-bit binary number, a $(2^{100}-1)$-bit binary number, that is, a pseudo random number with a period of $(2^{100}-1)$ bits is generated from the pseudo random number generator 11. The output from the pseudo random number generator 11 is dealt with as the pseudo random number $r_i$. In the present embodiment, the pseudo random number $r_i$ has M/2 of integers 0, 1, . . . , (M/2−1) as its state. In other words, $r_i \in \{0, 1, \ldots, (M/2-1)\}$. Here, M is an even (odd number×2) constant value and the number of states of the pseudo random number $r_i$ is M/2 (odd number).

The first modulation section 12 modulates the plain text $x_i$ as input data by associating the plain text $x_i$ with a specific pair of states determined by the modulation pseudo random number $r_i$ generated by the pseudo random number generator 11 and outputs as a first modulation output $s_i'$. In the present embodiment, M/2 sets of pairs of states (pair of state "0" and state "1") are set in advance, which can be selected as a specific pair of states for each bit of the plain text $x_i$ in the first modulation section 12. These M/2 sets of pairs of states are associated with the states 0, 1, . . . , (M/2−1) of the pseudo random number $r_i$, respectively, and further, all of the states 0 and 1 of M/2 sets of pairs of states are associated with different multilevel signals $0, 1, \ldots, (M-1)$ respectively in advance. Then, the first modulation section 12 selects one of M/2 sets of pairs of states by the pseudo random number $r_i$ as a specific pair of states and assigns the pair for each bit of the plain text $x_i$ and outputs the signal set for the state (0 or 1) of the one bit in the assigned specific pair of states as the modulation output $s_i'$ of the one bit.

As described above, the modulation performed by the first modulation section 12 can be generalized and represented as shown in a table 12a in FIG. 1. As shown in the table 12a, the first modulation section 12 outputs the pseudo random number $r_i$ as is as the modulation output $s_i'$ when the state of the plain text $x_i$ is "0" and if the pseudo random number $r_i$ is even, outputs the pseudo random number $r_i+M/2$ as the modulation output $s_i'$ when the state of the plain text $x_i$ is "0" and if the pseudo random number $r_i$ is odd, outputs the pseudo random number $r_i+M/2$ as the modulation output $s_i'$ when the state of the plain text $x_i$ is "1" and if the pseudo random number $r_i$ is even, and outputs the pseudo random number $r_i$ as is as the modulation output $s_i'$ when the state of the plain text $x_i$ is "1" and if the pseudo random number $r_i$ is odd. The specific operation of the first modulation section 12 (the first modulation step) will be described later with reference to FIG. 4 to FIG. 6.

The physical random number generator (the physical random number generation section) 13 generates a physical random number $f_i$ based on a physical phenomenon. As a physical phenomenon, an essentially random phenomenon such as noises in the natural world, cosmic rays, thermal fluctuation (thermal noises), and decay of radioactive isotopes is used and by using such a physical phenomenon, it is possible for the physical random number generator 13 to generate a random number sequence that requires no encryption key, having no reproductivity or periodicity, and which cannot be predicted. The output from the physical random number generator 13 is dealt with as the physical random number $f_i$. In the present embodiment, the physical random number $f_i$ has four integers $-2, -1, 1,$ and $2$ as its state. In other words, $f_i \in \{-2, -1, 1, 2\}$.

The second modulation section 14 modulates the output $s_i'$ of the first modulation section 12 by the physical random number $f_i$ generated by the physical random number generator 13 and outputs as a second modulation output $s_i$. In the present embodiment, the second modulation section 14 performs an operation for associating the first modulation output $s_i'$ irregularly with other signal by the physical random number $f_i$ using the discrete DSR represented by the following expression (1) and outputs as the output $s_i$ of second modulation section, as shown in FIG. 1.

$$s_i = (s_i' + f_i) \bmod M \qquad (1)$$

In other words, the physical random number $f_i$ generated by the physical random number generator 13 is added to the output $s_i'$ of the first modulation section 12, the residue when the sum is divided by the constant M is found, and the residue is regarded as the output $s_i$ of the second modulation section 14. By the way, the specific operation of the second modulation section 14 (the second modulation step) will be described later with reference to FIG. 7.

Note that, it is only required that the modulation by the first modulation section 12 and the second modulation section 14 be such one that the modulation output is a discrete multilevel signal with M levels, therefore, digital modulation such as intensity modulation, phase modulation, and PCM (Pulse Code Modulation) can be used regardless of its modulation scheme. An input signal of modulation and an output signal of modulation can also be used, provided they are a signal that can be expressed by a discrete value such as an intensity signal, a phase signal, a digital signal, a parallel signal using plural signal lines, and a serial signal to be time sequential data regardless of the type of the signal.

The channel-coding section 15 performs desired channel-coding suited to the communication channel of the output $s_i$ of the second modulation section 14 and outputs its output as the cipher text $c_i$. For example, in order to adapt the output $s_i$ of the second modulation section to a communication channel that expresses information with two states, that is, the ON state and the OFF state, the output $s_i$ of the second modulation section is converted into a binary number. Further, coding by error correction code is performed in order to add resistance to the errors in the communication channel and a series of coding processing such as processing to improve use efficiency of the code is performed as needed.

Examples of error correction code include hamming code, Reed-Solomon code, LDPC (Low Density Parity Check) code, turbo code, etc.

In addition, processing to improve use efficiency of the code is the processing described below.

For example, when M=10, the output $s_i$ of the second modulation section 14 for plain text of 1 bit is a multilevel signal of 0 to 9, that is, 0000 to 1001 if expressed by a binary number using BCD (Binary Coded Decimal), meaning that plain text of 1 bit requires 4 bits. In other words, if the output $s_i$ of the second modulation section 14 for plain text of 3 bits is expressed in BCD, 12 bits are required. On the other hand, if the output $s_i$ of the second modulation section 14 for the plain text of 3 bits is arranged as 000 to 999 and this decimal number is converted into a binary number, the result will be 0000000000 to 1111100111, that is, 10 bits are required for representation, therefore, the use efficiency of the code is improved by 2 bits compared to the case where BCD is used. In order to further improve the use efficiency of the code, it is effective to use a lossless compression algorithm such as the LZW algorithm and Huffman coding for the whole of the output $s_i$ of the second modulation section 14 for plain text of plural bits.

Note that, when the first modulation section 12 and the second modulation section 14 with which an optimum signal is already output to the communication channel as the output $s_i$ of the second modulation section is used, the operation of the channel-coding section 15 is expressed by identity mapping and at this time, the channel-coding section 15 can be omitted.

A decoded signal $d_i$, which is the channel-decoded cipher text $c_i$ obtained by performing modulation by the first modulation section 12 and the second modulation section 14 described above and further by channel coding by the channel coding section 15, will be a signal that can be demodulated into the input data (the plain text $x_i$) by discriminating which state of the specific pair of states the signal corresponds to by the pseudo random number $r_i$ and that can be output by the first modulation by a pair of states other than the specific pair of states and the second modulation by a physical random number different from the physical random number $f_i$ actually used in the second modulation.

In particular, by adding/subtracting the physical random number $f_i$ to/from the output $s_i'$ of the first modulation section 12 in the second modulation section 14, an irregular association is given to the output $s_i'$ of the first modulation section 12 for the output $s_i$ of the second modulation section 14, as a result. In the present embodiment, the state of the physical random number $f_i$ and the number of states are set so that a first range (refer to $A_i$ in FIG. 2, FIG. 9, and FIG. 10), which is an association destination of the irregular association to be given to a signal set for one state of each pair of states (for example, output "4" of the first modulation in FIG. 3) and a second range (refer to $B_i$ in FIG. 2, FIG. 9, and FIG. 10), which is an association destination of the irregular association to be given to a signal set for the other state of each pair of states (for example, output "9" of the first modulation in FIG. 3), do not overlap, that is, are exclusive to each other. Due to this, while maintaining a situation in which discrimination of the state ("1" or "0") of the plain text $x_i$ is possible on the legitimate receiver side using the physical random number $f_i$ for the output $s_i'$ of the first modulation section 12, the irregular association is given to the output $s_i$ of the second modulation section 14.

By the way, when the irregular association is given to the output $s_i$ of the second modulation section 14 by modulating the output $s_i'$ of the first modulation section 12 by the physical random number $f_i$ in the second modulation section 14, addition/subtraction in which carrying of a digit (bit) occurs as described above is used. If a bit operation such as an XOR operation of the physical random number $f_i$ and the output $s_i'$ of the first modulation section 12 is used instead of adding/subtraction, there is the possibility that a group is formed in the four states of the lower 2 bits of the physical random number $f_i$, association is biased, and the cipher text $c_i$ can be decoded by an interceptor. Because of this, it is not desirable to use a bit operation such as an XOR operation.

In addition, in the present embodiment, the pair of states and the physical random number $f_i$ described above are set so that the number of cases where the plain text $x_i$ is "1" corresponding to the output $s_i$ of the second modulation section 14 and the number of cases where the plain text $x_i$ is "0" are equal to each other, that is, if the physical random number $f_i$ and the pseudo random number $r_i$ are random, the states of the output $s_i$ of the second modulation also distribute randomly.

Further, in the present embodiment, the number of states of the physical random number $f_i$ is set so as to be an even number equal to or greater than 4 and so as not to exceed M/2, that is, the number of sets of the pair of states.

When the number of states of the physical random number $f_i$ is 2, the safety against a known plain-text attack cannot be secured any more. Further, if the number of states of the physical random number $f_i$ is odd, there is the possibility that the correspondence relationship between the state of the second modulation output $s_i$ and the state of the plain text $x_i$ is biased and extra information is given to an interceptor. For example, when the number of states of the physical random number $f_i$ is 5, the probability is biased so that the probability that the state of the plain text $x_i$ is "1" is 2/5 and the probability that it is "0" is 3/5 when the state of the second modulation output $s_i$ is "0". Because of this, the number of states of the physical random number $f_i$ is set to 4 or an even number greater than 4. By the way, the encryption strength against a known plain-text attack of the cipher text $c_i$ when the number of states of the physical random number $f_i$ is 4 will be described later with reference to FIG. 12.

Further, if the number of states of the physical random number $f_i$ exceeds M/2, that is, the number of sets of the pair of states, the destination of the irregular association for the state "1" of the pair of states and the destination of the irregular association for the state "0" of the same pair of states overlap (that is, the first range $A_i$ and the second range $B_i$ described above overlap) and for the side of a cryptogram decoder 20, which will be described later with FIG. 2, it is no longer possible to discriminate the states 0 and 1 even if a specific pair of states can be discriminated by the demodulation pseudo random number $r_i$ about the decoded signal $d_i$, that is, the channel-decoded cipher text $c_i$. Because of this, the number of states of the physical random number $f_i$ is set so as not to exceed M/2, that is, the number of sets of the pair of states.

Further, in the present embodiment, the number of states of the physical random number $f_i$ is set in accordance with the target encryption strength. In order to increase the encryption strength, the number of states of the physical random number $f_i$ is increased. Then, M/2, the number of sets of the pair of states is determined in accordance with the number of states of the physical random number $f_i$ determined in accordance with the target encryption strength, and the number of states of the pseudo random number $r_i$ is determined in accordance with M/2, the number of sets of the pair of states. For example, in a specific example to be described later with reference to FIG. 3 to FIG. 14, "4" is determined as the number of states of the physical random number $f_i$ and "5" is determined as M/2, the minimum number of sets of the pair of states in accordance with the number of states 4 (that is, M=10). In this way, M/2, the minimum number of sets of the pair of states in accordance with the target encryption strength, that is, M/2, the minimum number of states of the pseudo random number $r_i$ is determined. Generally, the more the number of states of the multilevel signal, the slower the operation speed (encryption processing speed) of the pseudo random number generator 11 and the overall communication speed is determined, however, as described above, by determining M/2, the minimum value of the number of states of the pseudo random number $r_i$, it is possible to obtain the maximum operation speed in accordance with the target encryption strength in the pseudo random number generator 11.

[2] Configuration of the Cryptogram Decoder in the Present Embodiment

Figure 2:
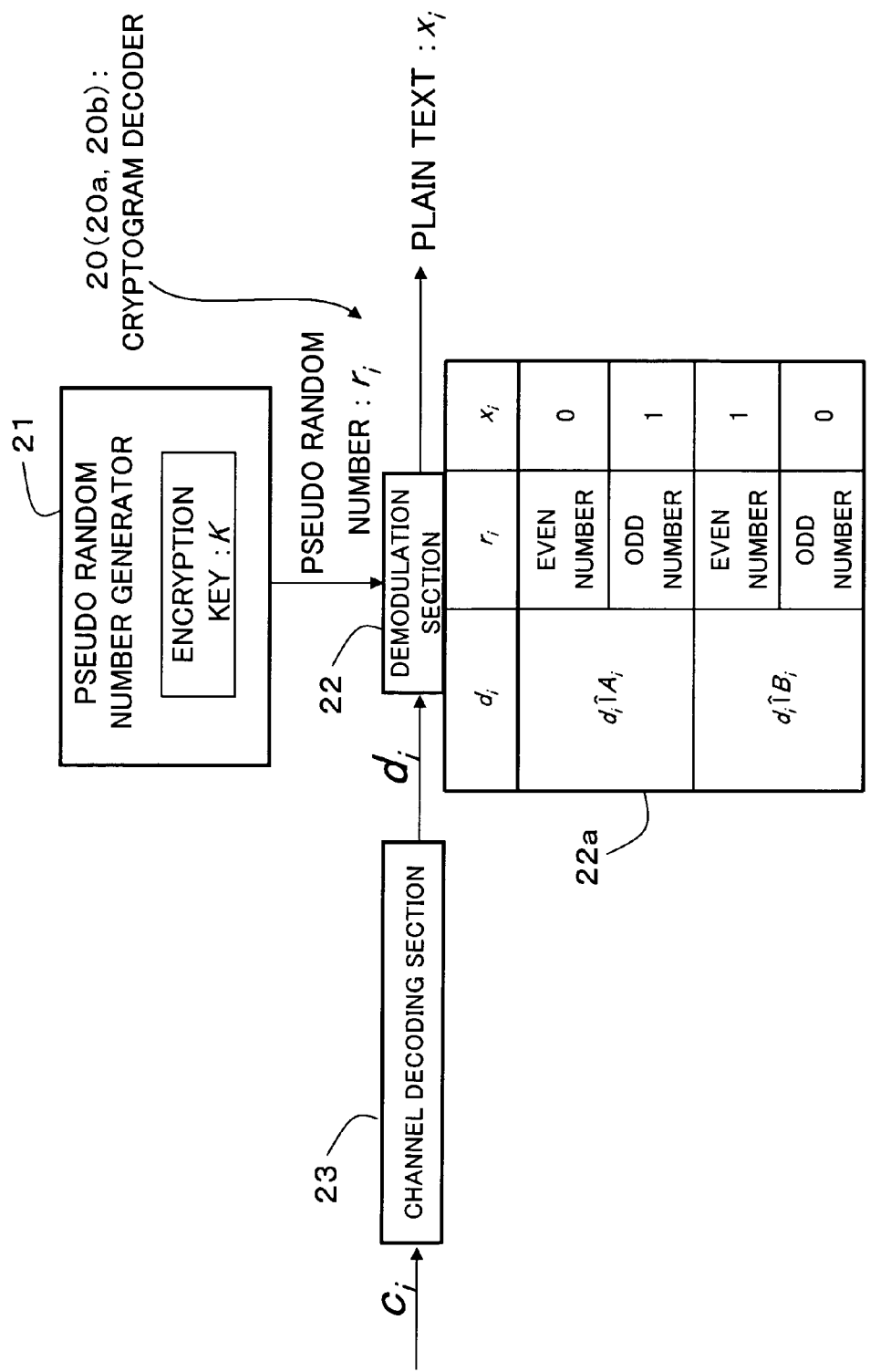
FIG. 2 is a block diagram for showing a configuration of a cryptogram decoder as an embodiment of the present invention.

FIG. 2 is a block diagram showing a configuration of a cryptogram decoder as an embodiment of the present invention and as shown in FIG. 1, the cryptogram decoder 20 in the present embodiment decodes the cipher text $c_i$ obtained by the encryptor 10 described above and is configured so as to include a pseudo random number generator 21, a demodulation section 22, and a channel-decoding section 23.

The channel-decoding section 23 channel-decodes the cipher text $c_i$ obtained by the encryptor 10 and obtains the decoded signal $d_i$.

The decoded signal $d_i$ and the output $s_i$ of the second modulation section 14 of the encryptor 10 corresponding to the same plain text $x_i$ are equal.

Further, the operation of the channel-decoding section 23 when using the demodulation section 22 capable of directly demodulating the cipher text $c_i$ is expressed by identity mapping and at this time, the channel-decoding section 23 can be omitted.

The pseudo random number generator (the pseudo random number generation section, the demodulation pseudo random number generation section) 21 generates and outputs, based on the same encryption key K as the encryption key K having generated the pseudo random number $r_i$ used in the modulation by the first modulation section 12 in the encryptor 10, the demodulation pseudo random number $r_i$ in synchronization with the modulation pseudo random number $r_i$ and has the same configuration as that of the pseudo random number generator 11 in the encryptor 10.

The demodulation section 22 demodulates the decoded signal $d_i$ obtained by the channel-decoding section 23 into the plain text $x_i$ by discriminating which state of the specific pair of states the signal corresponds to by the pseudo random number $r_i$ generated by the pseudo random number generator 21 and specifically, is designed so as to demodulate the decoded signal $d_i$ into the plain text $x_i$ by discriminating the specific pair of states assigned to the decoded signal $d_i$ and further discriminating which state of the specific pair of states (0 or 1) the plain text $x_i$ corresponds to based on the exclusive relationship between the first range $A_j$ and the second range $B_j$ described above.

Here, when the state of the physical random number $f_i$ is $-2, -1, 1,$ and $2$ as described above, as shown in FIG. 2, based on the pseudo random number $r_i$, the first range $A_j$ is calculated as $(r_i-2)$ mod M, $(r_i-1)$ mod M, $(r_i+1)$ mod M, and $(r_i+2)$ mod M and the second range $B_j$ is calculated as $(r_i+M/2-2)$ mod M, $(r_i+M/2-1)$ mod M, $(r_i+M/2+1)$ mod M, and $(r_i+M/2+2)$ mod M.

As described above, the demodulation performed by the demodulation section 22 can be generalized and represented as shown in a table 22a in FIG. 2. As shown in the table 22a, the demodulation section 22 outputs the state "0" as the plain text $x_i$ of the demodulation result when the decoded signal $d_i$ belongs to the first range $A_j$ and the pseudo random number $r_i$ is even and outputs the state "1" as the plain text $x_i$ of the demodulation result when the decoded signal $d_i$ belongs to the first range $A_j$ and the pseudo random number $r_i$ is odd and on the other hand, outputs the state "1" as the plain text $x_i$ of the demodulation result when the decoded signal $d_i$ belongs to the second range $B_j$ and the pseudo random number $r_i$ is even and outputs the state "0" as the plain text $x_i$ of the demodulation result when the decoded signal $d_i$ belongs to the second range $B_j$ and the pseudo random number $r_i$ is odd. By the way, the specific operation of the demodulation section 22 (the demodulation step) will be described later with reference to FIG. 8 to FIG. 10.

[3] Encryption Procedure in the Present Embodiment

Next, with reference to FIG. 3 to FIG. 7, the encryption procedure (the operation of the encryptor 10) in the present embodiment is explained specifically.

Figure 3:
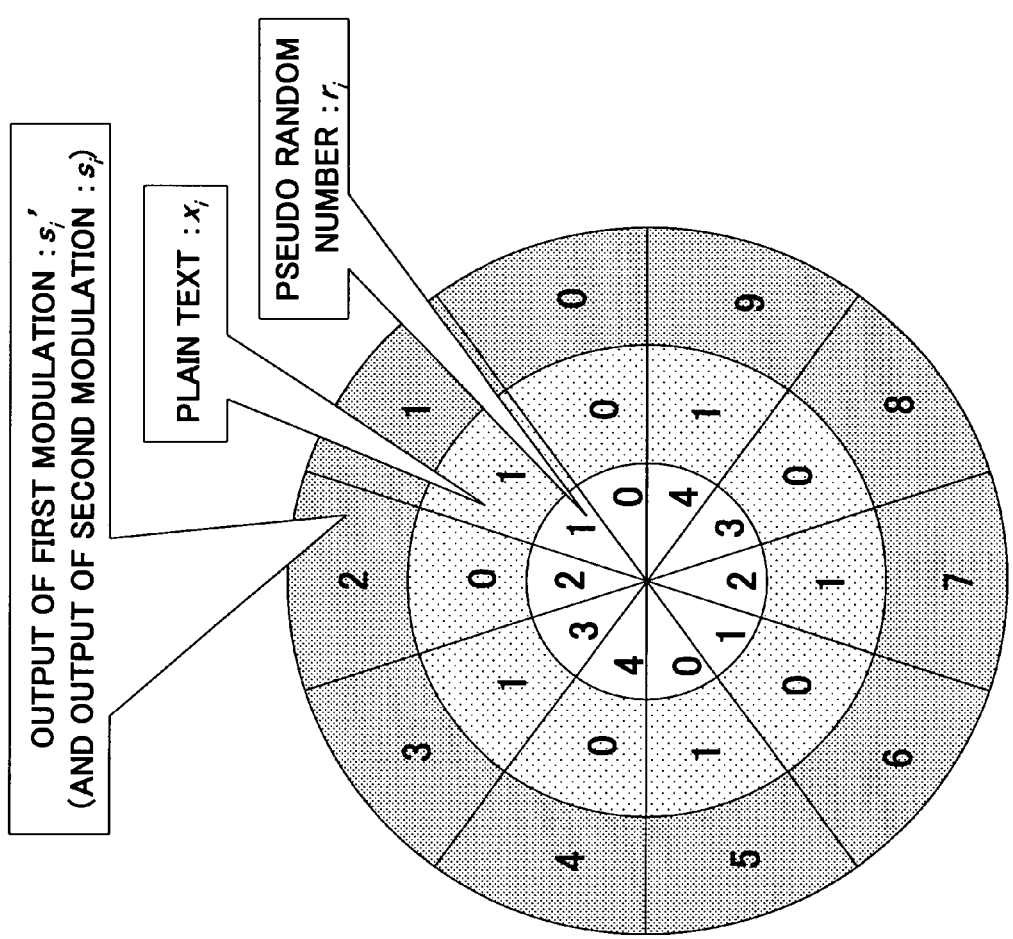
FIG. 3 is a diagram for explaining a correspondence relationship between a pseudo random number and plain text and cipher text in the present embodiment.

First, a correspondence relationship between respective variables in the first modulation by the first modulation section 12, that is, a correspondence relationship between the pseudo random number $r_i$, the plain text $x_i$, and the output $s_i$ of the first modulation section 12 is explained with FIG. 3. Here, a case is explained where the physical random number $f_i$ has four states of integers $-2, -1, 1,$ and $2$ and M/2, the number of sets of the pair of states is "5", that is, M=10, as described above.

As shown in FIG. 3, a pair of states (the plain text $x_i$) 0 and 1 in a positional relationship of point symmetry to each other with respect to the center of a concentric circle in the figure is dealt with as a pair of states and five sets of pairs of states are associated with the states 0, 1, 2, 3, and 4 of the pseudo random number $r_i$, respectively, and further, all of the states 0 and 1 (10 states) of the five sets of pairs of states are associated with different multilevel values 0, 1, 2, . . . 9, respectively. In other words, the states (the plain text $x_i$) 0 and 1 of the pair of states associated with the state 0 of the pseudo random number $r_i$ are associated with the multilevel signals 0 and 5, respectively, the states (the plain text $x_i$) 1 and 0 of the pair of states associated with the state 1 of the pseudo random number $r_i$ are associated with the multilevel signals 1 and 6, respectively, the states (the plain text $x_i$) 0 and 1 of the pair of states associated with the state 2 of the pseudo random number $r_i$ are associated with the multilevel signals 2 and 7, respectively, the states (the plain text $x_i$) 1 and 0 of the pair of states associated with the state 3 of the pseudo random number $r_i$ are associated with the multilevel signals 3 and 8, respectively, and the states (the plain text $x_i$) 0 and 1 of the pair of states associated with the state 4 of the pseudo random number $r_i$ are associated with the multilevel signals 4 and 9, respectively.

With FIG. 4 to FIG. 7, the encryption procedure when one bit of the plain text $x_i$ is transmitted is explained below.

Figure 4:
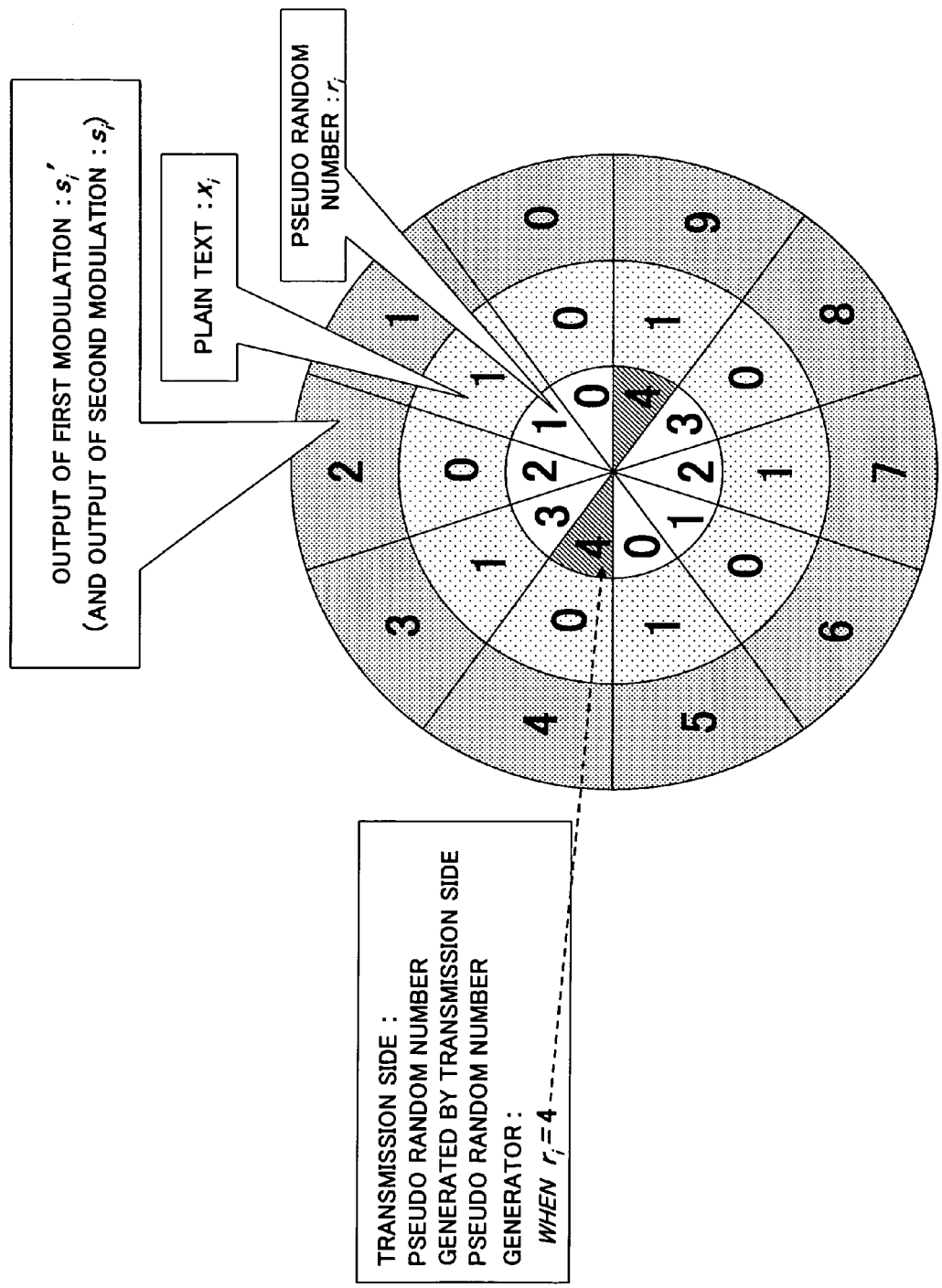
FIG. 4 to FIG. 7 are diagrams for explaining an encryption procedure in the present embodiment.

When one bit of the plain text $x_i$ is transmitted, if the pseudo random number $r_i$ generated by the pseudo random number generator 11 is "4", the pair of states in which the states 0 and 1 are set with the multilevel signals 4 and 9, respectively, is selected, as shown in FIG. 4, and as a specific pair of states, one bit of the plain text $x_i$ to be transmitted is assigned.

Figure 5:
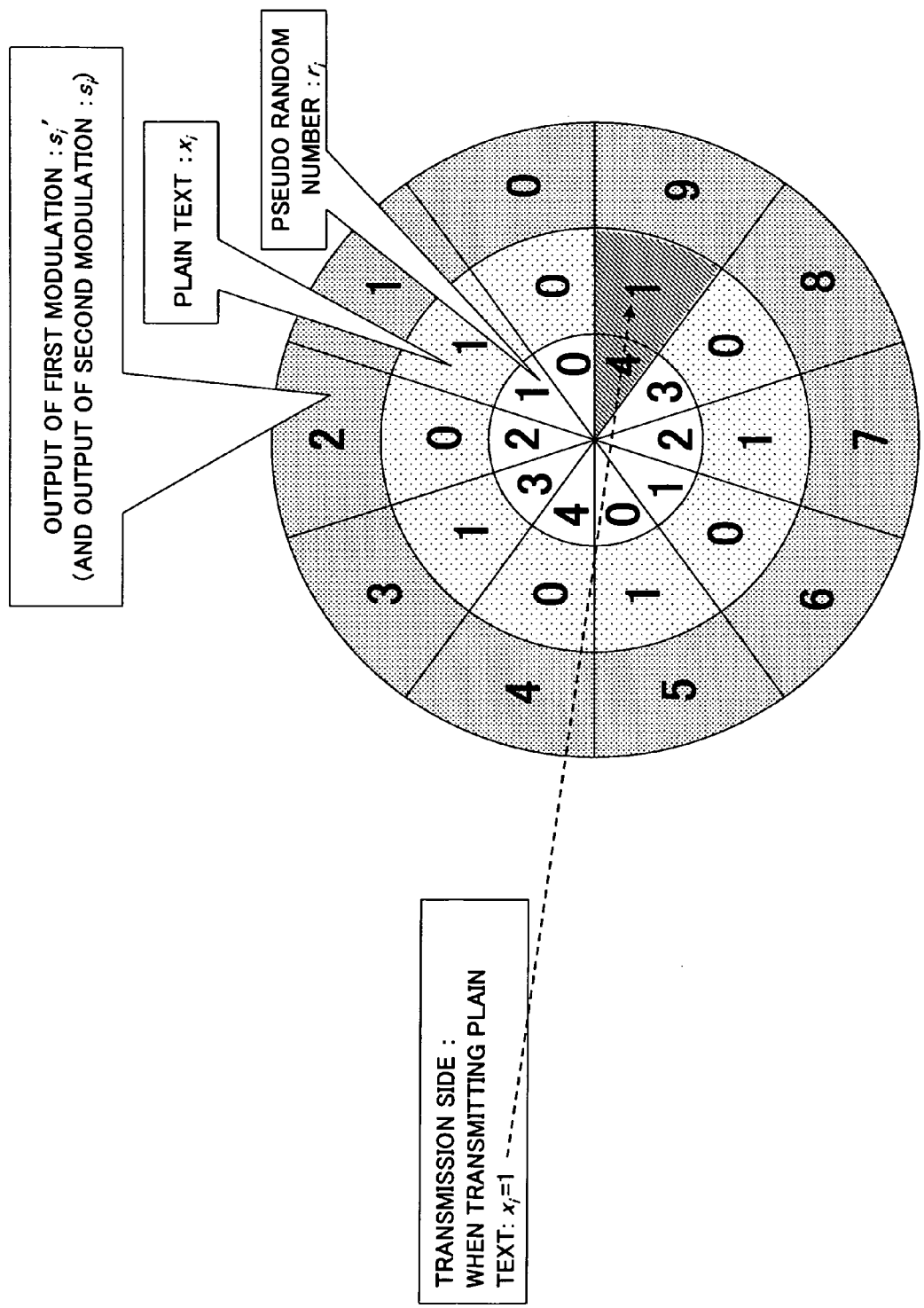
Figure 6:
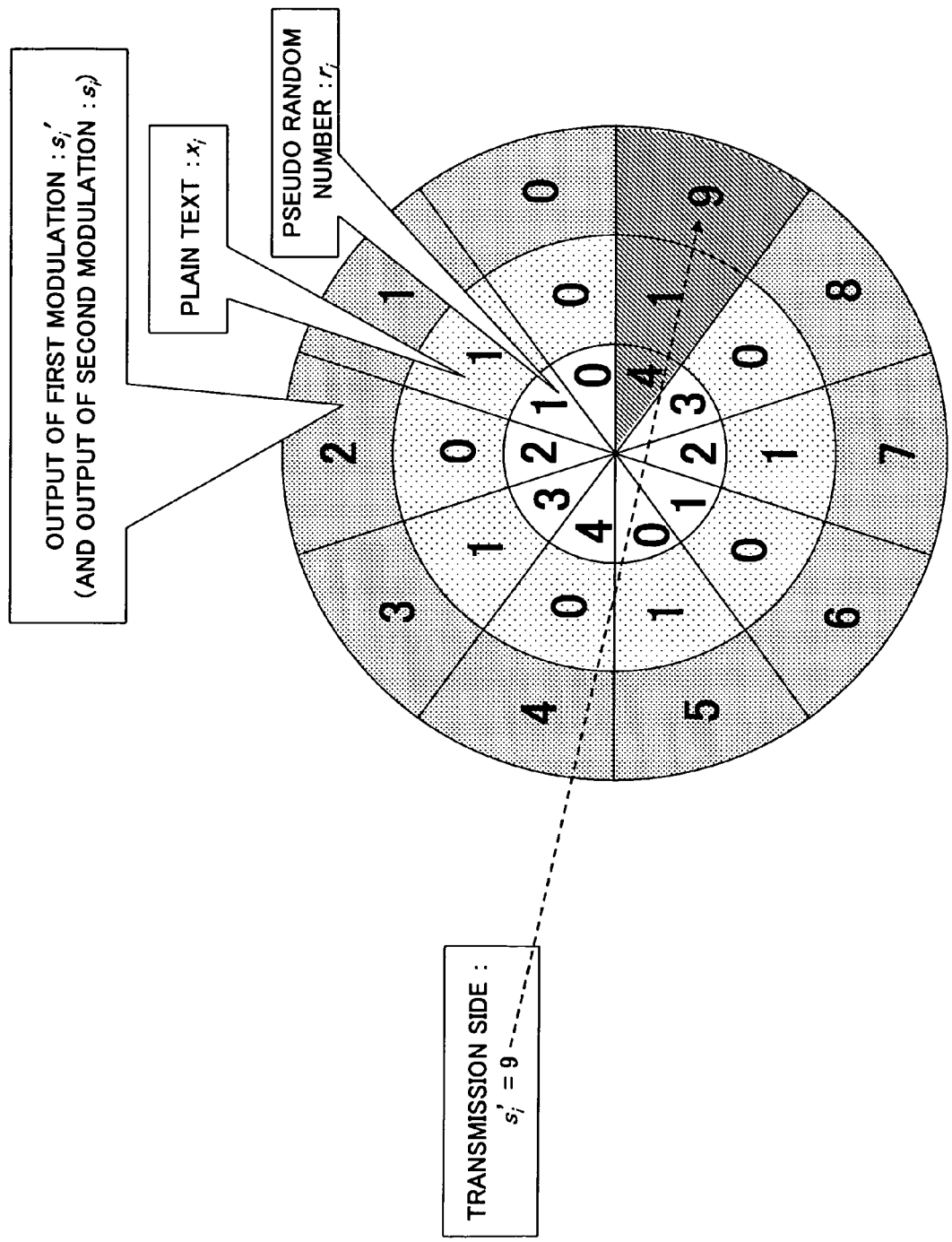

At this time, when the state of the plain text $x_i$ to be transmitted is "1", as shown in FIG. 5, the side of the state "1" of the specific pair of states assigned in FIG. 4 is selected and as shown in FIG. 6, the multilevel signal "9" associated with the state "1" is obtained as the output $s_i'$ of the first modulation section 12.

Figure 7:
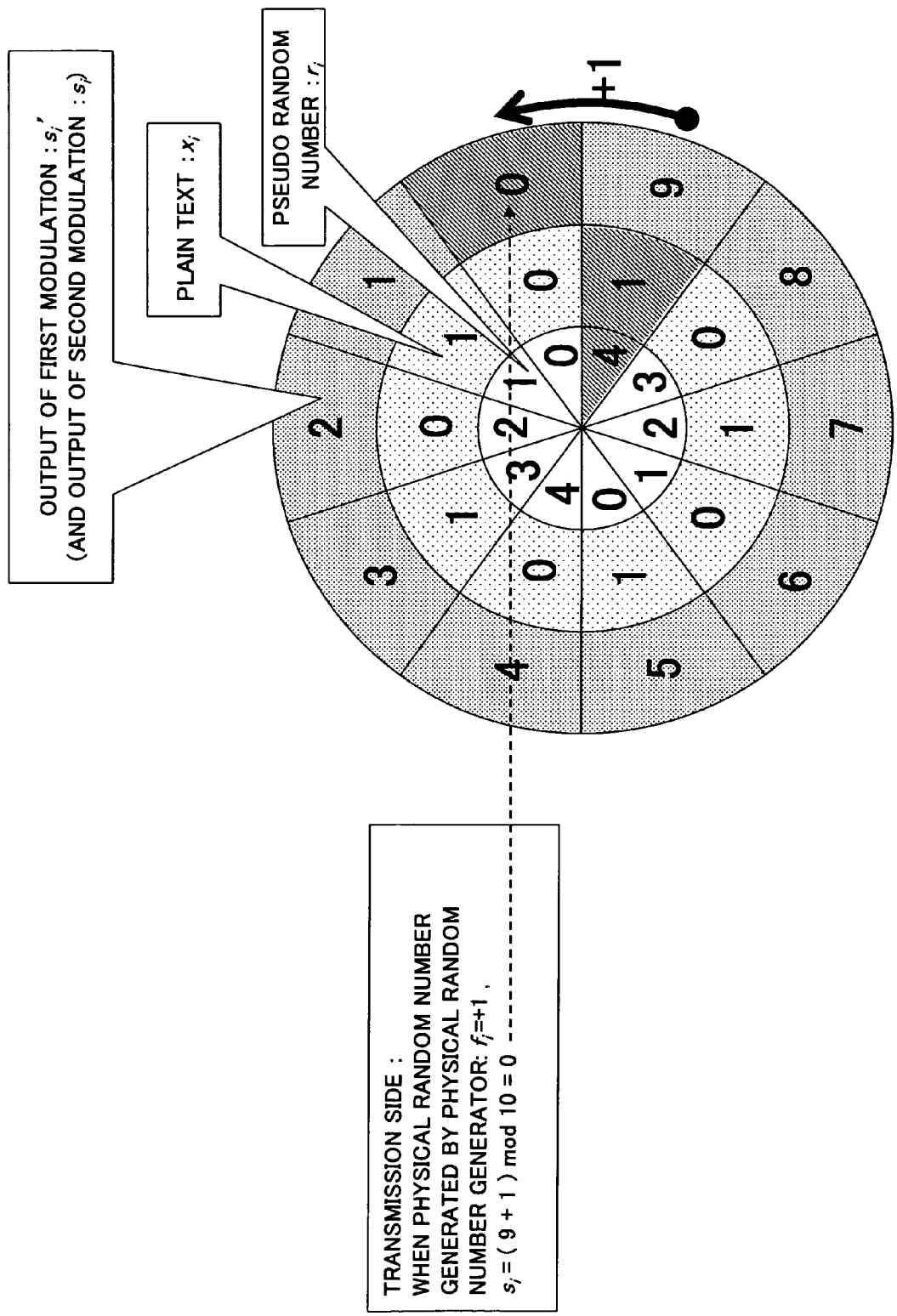

Further, when the physical random number $f_i$ generated by the physical random number generator 13 is "+1" for the output $s_i'$ (the multilevel signal "9") of the first modulation section 12, by the above-mentioned expression (1), $s_i=(9+1)$ mod 10=0, and an association is given, in which a signal shifted by "+1" with respect to the pair of states is output, and as shown in FIG. 7, the multilevel signal "0" set for the state "0" of the pair of states shifted by 1 counterclockwise is output as the output $s_i$ of the second modulation section 14.

The output $s_i$ of the second modulation section 14 obtained as described above is given an irregular association using the physical random number $f_i$ while maintaining a situation in which the state that the plain text $x_i$ can be discriminated on the side of a legitimate receiver and the output $s_i$ of the second modulation section 14 channel-coded by the channel-coding section 15 is the cipher text $c_i$. As will be described later, for the legitimate receiver side (the cryptogram decoder 20 side), it is possible to demodulate the decoded signal $d_i$ channel-decoded from the cipher text $c_i$ into the plain text $x_i$ by discriminating which state of the specific pair of states the signal corresponds to by the pseudo random number $r_i$ without using the physical random number $f_i$, and the decoded signal $d_i$ is data that can be output by the first modulation by a pair of states other than the specific pair of states and the second modulation by a physical random number different from the physical random number $f_i$ actually used in the second modulation.

Note that, the procedure described above with reference to FIG. 4 to FIG. 6 is the modulation operation (the first modulation step) performed by the first modulation section 12 and corresponds to the operation generalized and represented in the table 12a in FIG. 1. Further, the procedure described above with FIG. 7 is the modulation operation (the second modulation step) performed by the second modulation section 14 and corresponds to the operation based on the above-mentioned expression (1).

In the example shown in FIG. 7, the case where the physical random number $f_i$ is "+1" is explained, however, there is the possibility that the physical random number $f_i$ is −2, −1, or +2, in addition to "+1". In other words, the signal output as the output $s_i$ of the second modulation section 14 is designed to be irregularly associated with any of 7, 8, 0, and 1 from "9", which is the output $s_i'$ of the first modulation section 12. However, the range (refer to the second range $B_i$ in FIG. 9 and FIG. 10), which will be the destination of the irregular association, does not overlap with the range (refer to the first range $A_i$ in FIG. 9 and FIG. 10), which will be the destination of an irregular association that can be given to the multilevel signal "4" (the multilevel signal set into a state of being at a position of point symmetry with respect to the center of the concentric circle in FIG. 9 and FIG. 10) to be paired with the multilevel signal "9" when the physical random number $f_i$ is −2, −1, +1, and +2.

[4] Cryptogram Decoding Procedure in the Present Embodiment

Figure 8:
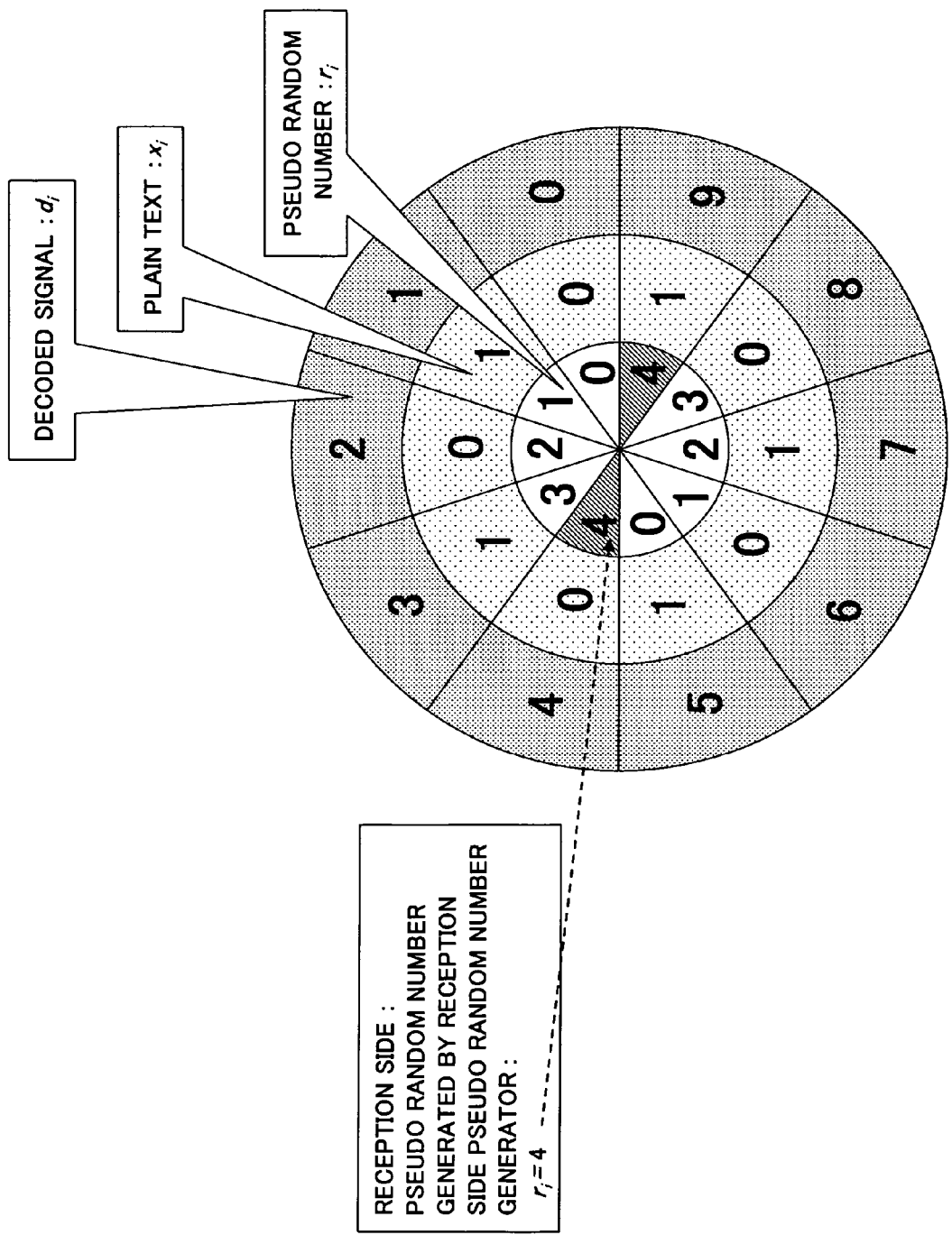
FIG. 8 to FIG. 10 are diagrams for explaining a cryptogram decoding procedure in the present embodiment.
Figure 9:
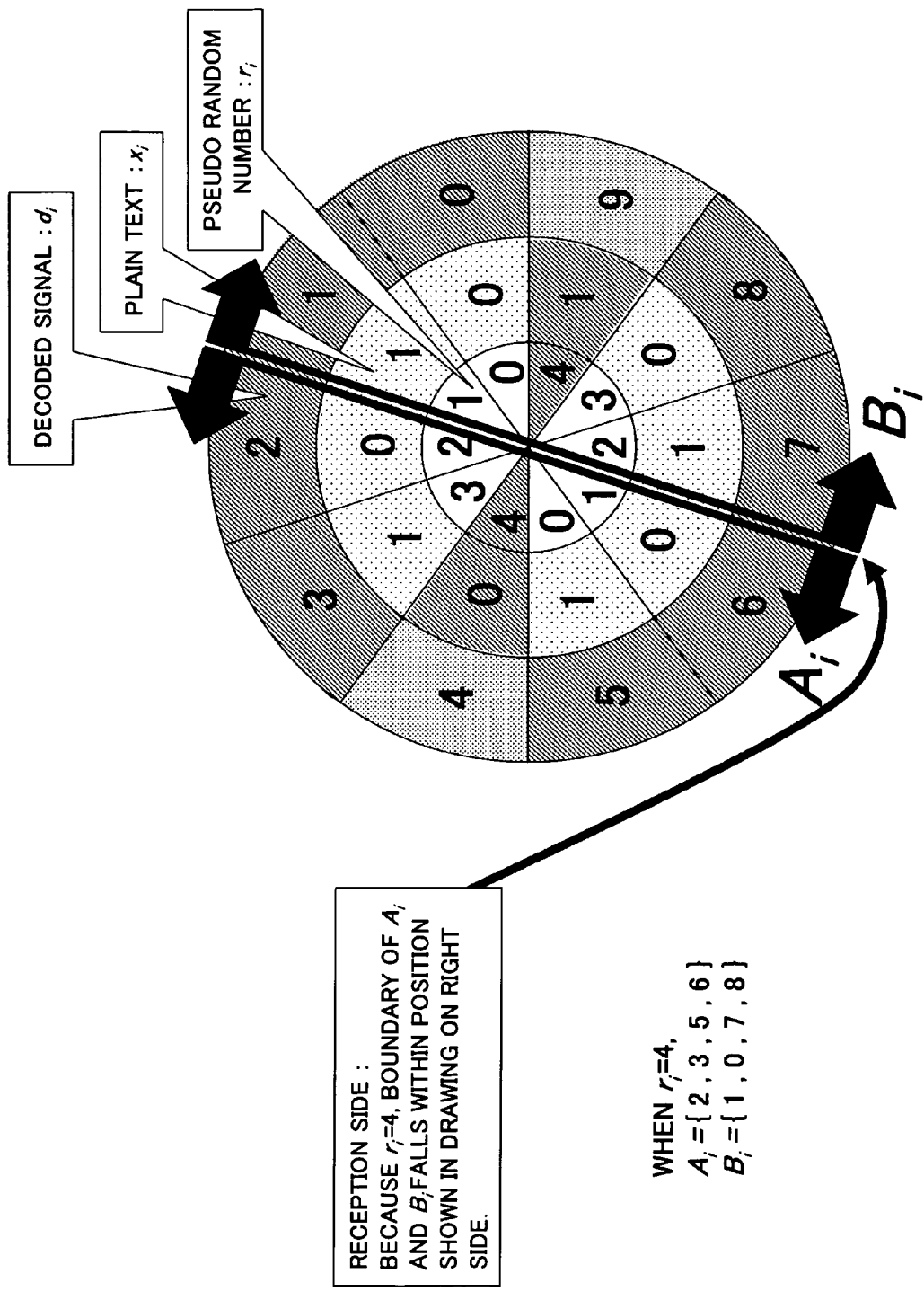
Figure 10:
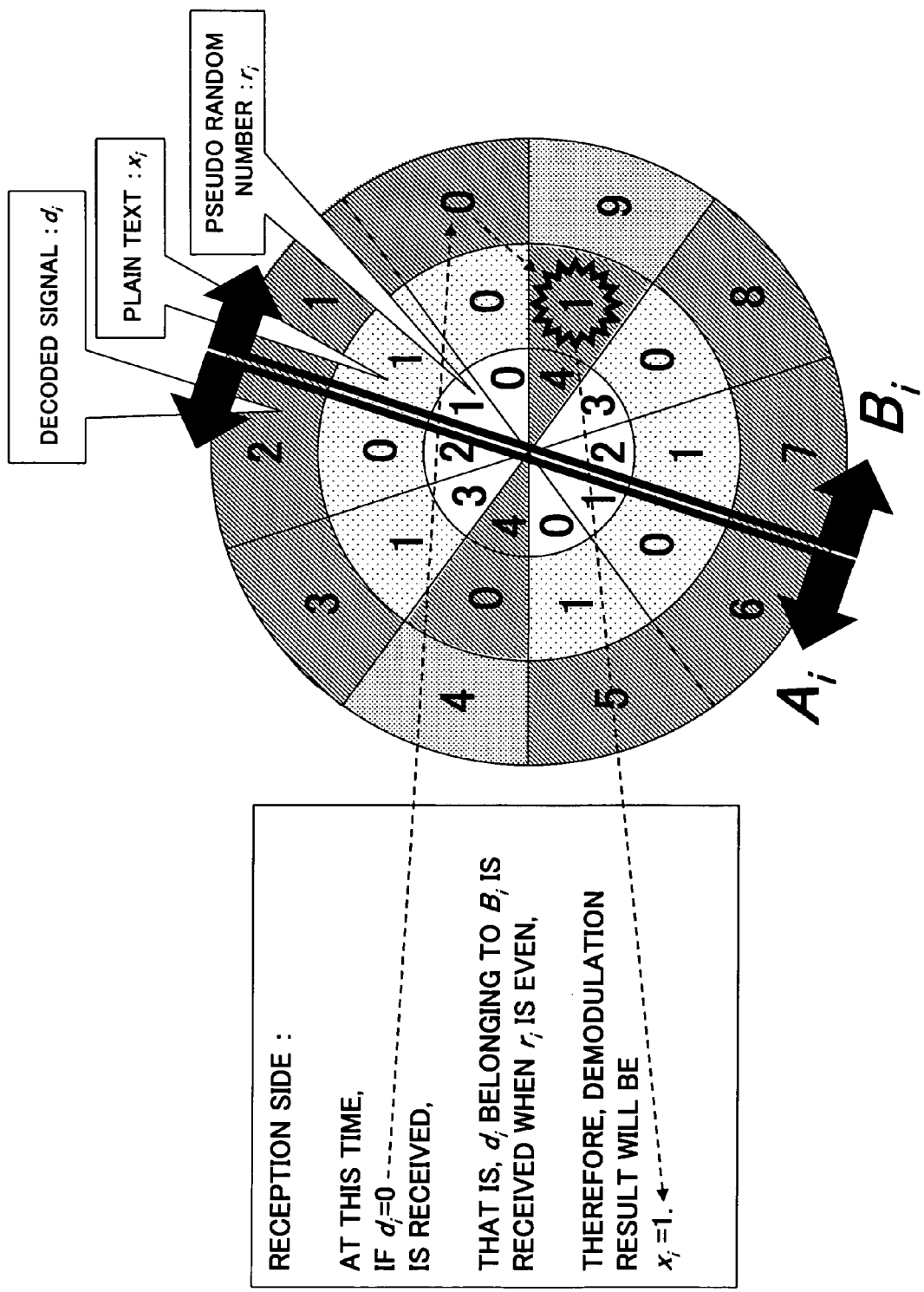

Next, the cryptogram decoding procedure (the operation of the cryptogram decoder 20) in the present embodiment is explained specifically with reference to FIG. 8 to FIG. 10. Here, a procedure is explained, for decoding the cipher text $c_i$ of one bit of the plain text $x_i$ obtained by the procedure explained with FIG. 4 to FIG. 7.

In the cryptogram decoder 20 on the legitimate receiver side of the cipher text $c_i$, as described above, the demodulation pseudo random number $r_i$ in synchronization with the modulation pseudo random number $r_i$ is output based on the same encryption key K as the encryption key K having generated the modulation pseudo random number $r_i$ in the encryptor 10 by the pseudo random number generator 21. Therefore, when receiving the cipher text $c_i$ corresponding to plain text one bit, the legitimate receiver side obtains a decoded signal $d_i$ (here, $d_i=0$) by channel-decoding the cipher text $c_i$ with the channel-decoding section 23 and at the same time, in synchronization with the reception timing, the demodulation pseudo random number $r_i$ (here, $r_i=4$) in the same state as that of the modulation pseudo random number $r_i$ used when the cipher text $c_i$ was encrypted is generated and output by the pseudo random number generator 21, and the specific pair of states assigned to the plain text one bit (decoded signal $d_i$) is discriminated by the pseudo random number $r_i=4$, as shown in FIG. 8.

At this time, the pseudo random number $r_i=4$, therefore, as shown in FIG. 9, the ranges $A_i$ and $B_i$, which will be the destinations of the two irregular associations with respect to the pair of states corresponding to the pseudo random number $r_i=4$ are {2, 3, 5, 6} and {1, 0, 7, 8}, respectively. Then, the state of the decoded signal $d_i$ is "0" and the pseudo random number $r_i$ is "4", that is even, therefore, the state "1" is demodulated as the plain text $x_i$ as shown in FIG. 10.

As described above, the decoded signal $d_i$ is demodulated into the plain text $x_i$ by discriminating which state (0 or 1) of the specific pair of states the signal corresponds to by the pseudo random number $r_i$ based on the exclusive relationship of $A_i$ and $B_i$, which will be the destinations of the two irregular associations, without using the physical random number $f_i$.

Here, the procedure described above with reference to FIG. 8 to FIG. 10 is the operation of the demodulating section 22 (demodulation step) and corresponds to the operation generalized and represented in table 22a in FIG. 2

[5] Encryption Strength in the Present Embodiment

Next, the encryption strength against a cipher-text-only attack of the cipher text $c_i$ obtained by the encryption technique (the encryption procedure explained with FIG. 4 to FIG. 7) in the first embodiment will be explained with reference to FIG. 11(A) to FIG. 11(D). Here, a cipher-text-only attack made in a state in which an interceptor has intercepted and channel-decoded the cipher text $c_i$ and has obtained the decoded signal $d_i=0$ is explained.

For the interceptor having obtained the decoded signal $d_i=0$ by interception of the cipher text $c_i$, it is not possible to know which one the interceptor views, that is, to distinguish out of the four cases shown in FIG. 11(A) to FIG. 11(D) because the interceptor does not know the pseudo random number $r_i$ used to obtain the cipher text $c_i$. Here, the case 1 shown in FIG. 11(A) corresponds to the case where the plain text $x_i=1$, the pseudo random number $r_i=4$, and the physical random number $f_i=+1$, then the decoded signal $d_i=0$, the case 2 shown in FIG. 11(B) corresponds to the case where the plain text $x_i=1$, the pseudo random number $r_i=1$, and the physical random number $f_i=-1$, then the decoded signal $d_i=0$, the case 3 shown in FIG. 11(C) corresponds to the case where the plain text $x_i=0$, the pseudo random number $r_i=3$, and the physical random number $f_i=+2$, then the decoded signal $d_i=0$, and the case 4 shown in FIG. 11(D) corresponds to the case where the plain text $x_i=0$, the pseudo random number $r_i=2$, and the physical random number $f_i=-2$, then the decoded signal $d_i=0$.

Because of this, it is made impossible for the interceptor to decode whether the state of the plain text $x_i$ corresponding to the cipher text $c_i$ (decoded signal $d_i=0$) transmitted by the legitimate transmitter is "0" or "1". Therefore, by using the encryption technique in the present embodiment, it is possible to secure sufficient encryption strength against the cipher-text-only attack.

Further, by referring to FIG. 12(A) and FIG. 12(B), the encryption strength against the known plain-text attack of the cipher text $c_i$ obtained by the encryption technique (the encryption procedure explained with FIG. 4 to FIG. 7) in the present embodiment is explained. Here, a known plain-text attack is explained, in which an interceptor has intercepted the cipher text $c_i$ and obtained the decoded signal $d_i=0$ and further, by obtaining the plain text $x_i=1$ corresponding to the cipher text $c_i$ by a certain means, predicts the corresponding pseudo random number $r_i$ and further tries to predict the encryption key K.

Even if the interceptor, having intercepted the cipher text $c_i$ and obtained the decoded signal $d_i=0$ by channel-decoding the cipher text $c_i$, obtains the plain text $x_i=1$ corresponding to the cipher text $c_i$, it is not possible to know which one the interceptor views, that is, to distinguish between the two cases shown in FIG. 12(A) and FIG. 12(B) because the interceptor does not know the pseudo random number $r_i$ used to obtain the cipher text $c_i$. Here, the two cases shown in FIG. 12(A) and FIG. 12(B) correspond to the cases shown in FIG. 11(A) and FIG. 11(B), respectively.

In other words, even if the interceptor learns that the plain text $x_i$ corresponding to the decoded signal $d_i=0$ channel-decoded from the cipher text $c_i$ is "1", it is not possible for the interceptor to know whether the pseudo random number $r_i$ used by the legitimate transmitter and receiver is "4" or "1". In other words, there exist two kinds of state of the pseudo random number for each one bit of the plain text predicted on the interceptor side, therefore, even if the interceptor makes a known plain-text attack by obtaining, for example, a 100-bit plain text, there are $2^{100}$ patterns of randomness for the pseudo random number sequence that can be predicted from the 100 bits of the plain-text and further it is necessary to perform operation for predicting an encryption key from the pseudo random number for each pattern, therefore, it can be said that it is practically impossible to decode the cipher text $c_i$ corresponding to other part of the plain-text $x_i$ already obtained by predicting the encryption key K by the known plain-text attack. Particularly, the randomness of the $2^{100}$ patterns is derived from the physical random number $f_i$ generated by the physical random number generator 13, therefore, there is no possibility that a mathematical shortcut is discovered and the cipher text $c_i$ is decoded.

As is obvious also from the examples shown in FIG. 11 and FIG. 12, it is possible to so configure that by setting the number of states of the physical random number $f_i$ to 4, the interceptor cannot discriminate which case the decoded signal $d_i$ corresponds to, between one where the plain-text is "0" and corresponding to the pair of states of two kinds of pseudo random numbers $r_i$ and the other where the plain text is "1" and corresponding to the pair of states of two kinds of pseudo random numbers $r_i$. Then, the number of cases that the interceptor trying to make the known plain-text attack must discriminate is 2, therefore, the encryption strength against the known plain-text attack is improved considerably compared to the conventional cryptogram. Therefore, by using the encryption technique in the present embodiment, it is possible to secure sufficient encryption strength against a known plain-text attack and guarantee a high safety. By the way, the number of states of the physical random number $f_i$ is set to four here, however, by setting it to an even number greater than four, the encryption strength can be improved because the number of cases the interceptor trying to make a known plain-text attack must discriminate is increased.

[6] Effect in the Present Embodiment

As described above, according to the encryption/cryptogram decoding technique as an embodiment of the present invention, the cipher text $c_i$ obtained by, after performing the first modulation of the plain text $x_i$ using the pseudo random number $r_i$ generated based on the encryption key K, channel-coding the signal having been subjected to the second modulation using the physical random number $f_i$ generated based on a physical phenomenon, is transmitted and on the side of the legitimate receiver having the same encryption key K as the encryption key K on the legitimate transmitter side, the plain text $x_i$ is obtained from the cipher text $c_i$ as decoded data without using the physical random number $f_i$ but using only the pseudo random number $r_i$ generated based on the encryption key K.

In this manner, by giving an irregular association by the physical random number $f_i$ to the output $s_i$ of the first modulation section 12, it is made possible for the legitimate receiver side to demodulate the decoded signal $d_i$ using only the pseudo random number $r_i$ without using the physical random number $f_i$ while guaranteeing a high safety capable of securing an extremely high encryption strength against not only the cipher-text-only attack but also the known plain-text attack, as described above.

At this time, the encryption technique in the present embodiment is realized by code (simple numerical values), different from the Y-00 scheme quantum cryptography, therefore, as with the case of the already existing classic encryption, it is possible to transfer cipher text by means of electromagnetic waves or electric line and to use cipher text in radio communication or electrical communication and, in addition, it is also made possible to store the cipher text $c_i$ in an electric memory or a variety of recording media (flexible disc, CD, DVD, etc.) Further, the cipher text $c_i$ can be stored in an electric memory, therefore, it is made possible to pass the cipher text $c_i$ through a router.

Further, as described above, the encryption technique in the present embodiment is realized by code (simple numerical values), therefore, it is not necessary to transmit and receive many physical states that are unstable as in the Y-00 scheme quantum cryptography and it is unlikely to receive the influence of noises, and when the present encryption technique is used in optical communication, an optical amplifier with low noise is no longer necessary and the number of relay stages is not restricted by the noise level of the optical amplifier and, in addition, the development of a light source with excellent linearity and a light receiving device is also no longer necessary.

Furthermore, according to the encryption technique in the present embodiment, even if the number of states of the multilevel signal, that is M, used in the first modulation is about 10, a sufficiently high safety can be guaranteed, therefore, the number of states can be reduced considerably compared to the Y-00 scheme quantum cryptography that requires about 200 of states of the multilevel signal and it is possible to minimize the influence of the operation speed of the pseudo random number generators 11 and 12 on the communication speed by suppressing the number of bits of the pseudo random number $r_i$.

By the way, the stream cipher is vulnerable to a known plain-text attack, therefore, it is necessary to frequently distribute and change the encryption key between the encryption side (the legitimate transmitter side) and the cryptogram decoding side (the legitimate receiver side) using the public key encryption. However, when the encryption key is distributed by the encryption with the public key encryption using the prime factorization, the safety of the public key encryption is based on only the fact that the algorithm for performing the prime factorization at high speed has not been discovered until now and once a calculation method for performing the prime factorization is discovered, the encryption key is decoded extremely easily. Because of this, it has been desired to obviate the need to perform distribution of the encryption key using the public key encryption.

In contrast to this, according to the encryption technique in the present embodiment, as described above, it is possible to secure an extremely high encryption strength against a known plain-text attack without changing the encryption key K used by the pseudo random number generators 11 and 21, that is, without the need to notify the user of the encryption key K by incorporating (embedding) the pseudo random number generators 11 and 21 in the encryptor 10 or the cryptogram decoder 20, therefore, it is no longer necessary to perform the above-described distribution of the encryption key using the public key encryption and it is also possible to eliminate the vulnerability of the public key encryption.

Note that, when the pseudo random number generator including the encryption key K is embedded, it is preferable to construct a structure having tamper-resistant properties by configuring at least a chip including a memory that stores the encryption key K into a state, in which the encryption key K cannot be read from the outside, in order to secure the safety of cipher text by preventing the encryption key K from being read by not only the user but also an illegitimate person who accesses (an interceptor). As a structure having tamper-resistant properties, for example, a memory chip the recorded contents of which become extinct when the chip surface is exposed to air or a circuit that functions no longer if a probe to read a signal is attached thereto is used.

Figure 13:
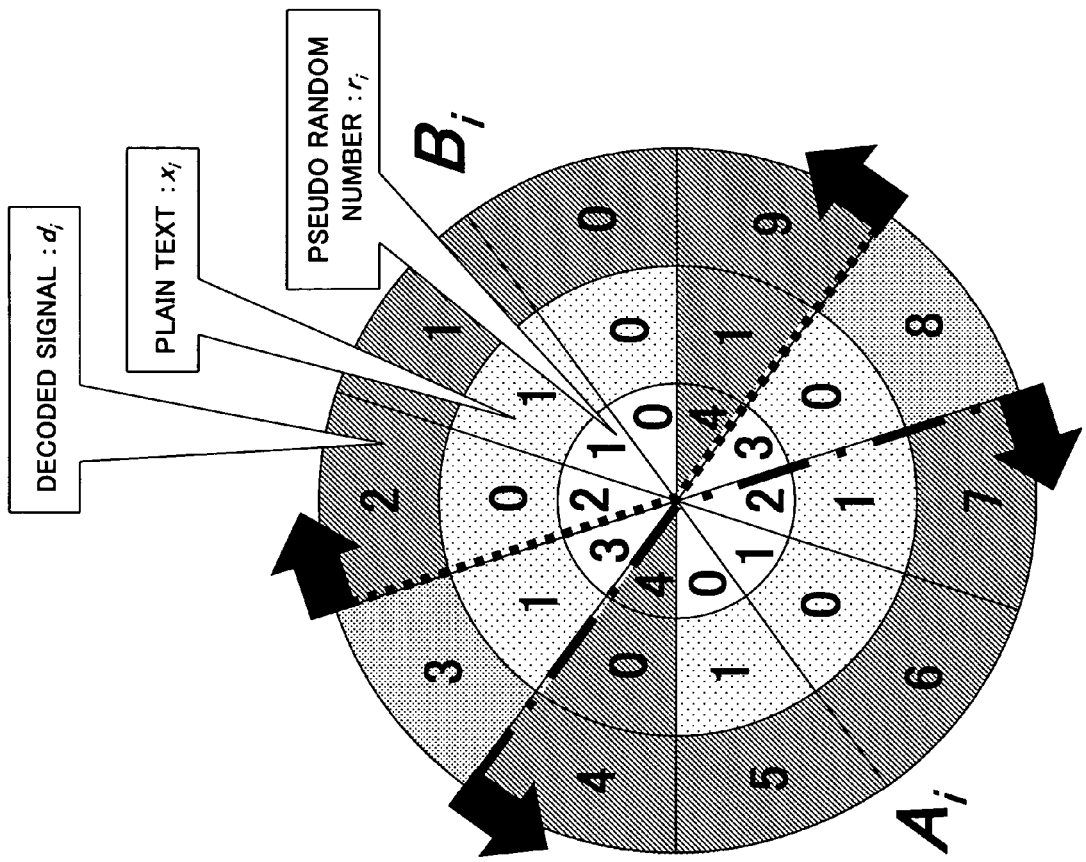
FIG. 13 is a diagram for explaining a first modification example of the encryption/cryptogram decoding procedures in the present embodiment.
Figure 14:
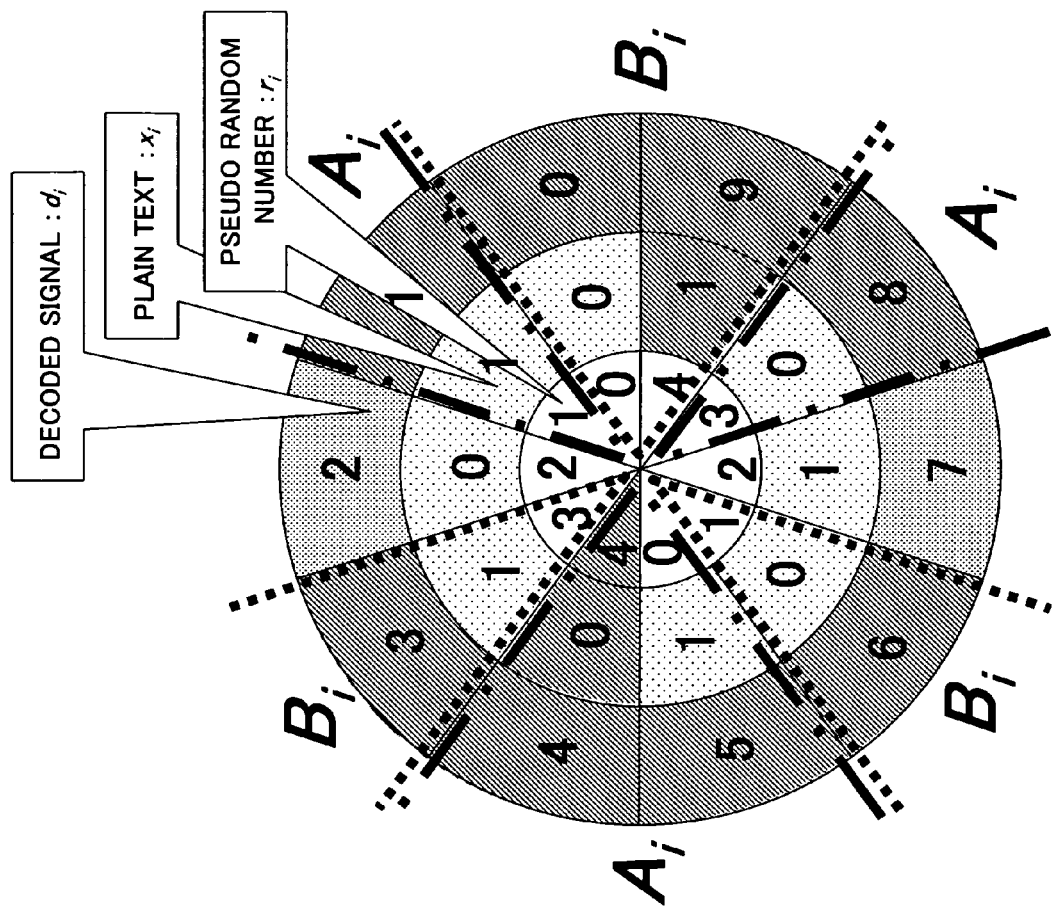
FIG. 14 is a diagram for explaining a second modification example of the encryption/cryptogram decoding procedures in the present embodiment.

[7] Modification Examples of the Encryption/Cryptogram Decoding Method in the Present Embodiment In the embodiments described above, the cases where the states of the physical random number $f_i$ generated by the physical random number generator 13 are four integers –2, –1, 1, and 2 and the irregular association is given symmetrically with respect to the specific pair of states, however, the present invention is not limited to this, and for example, as explained with reference to FIG. 13 and FIG. 14, the second modulation may be performed so that an irregular association is given asymmetrically with respect to the specific pair of states.

At this time, the four integers described above are selected so that it is not possible for the interceptor to discriminate which case the decoded signal $d_i$ obtained by the interceptor corresponds to between one where the plain text is "0" and corresponding to the pair of states of different two kinds of the pseudo random number $r_i$ or the other where the plain text is "1" and corresponding to the pair of states of different two kinds of the pseudo random numbers $r_i$, as described in the example shown in FIG. 11.

FIG. 13 is a diagram for explaining a first modification example of the encryption/cryptogram decoding procedure in the present embodiment and in the first modification example shown in FIG. 13, the states of the physical random number $f_i$ are four integers 0, 1, 2, and 3 and the ranges $A_i$ and $B_i$ are shown, which will be the destination of the two irregular associations with respect to the pair of states corresponding to the pseudo random number $r_i$=4, when M=10 and the pseudo random number $r_i$=4. At this time, the ranges $A_i$ and $B_i$ are {4, 5, 6, 7} and {0, 1, 2, 9}, respectively, that is, are set so as not to overlap each other. In this case also, the demodulation performed by the demodulation section 22 is performed in accordance with the rules shown in the table 22a in FIG. 2 and the same function and effect as those in the embodiments described above can be obtained.

Further, when a negative integer is included in the physical random number $f_i$, it is necessary to perform the complementary expression of two, resulting in reduction in processing speed because of the more complex structure and processing of the physical random number generator 13, however, as described above, when the physical random number $f_i$ {0, 1, 2, 3} including 0 or positive integers no negative integer is used, it is only required to cut out the output of a binary number from the physical random number generator 13 as the physical random number $f_i$ just by two bits and output it to the second modulation section 14 and the complementary expression of two is not needed to be performed, and an advantage in both encryption processing speed and communication speed is obtained.

FIG. 14 is a diagram for explaining a second modification example of the encryption/cryptogram decoding procedure in the present embodiment and in the second modification example shown in FIG. 14, the states of the physical random number $f_i$ are four integers –3, 0, 1, and 4, and the ranges $A_i$ and $B_i$ are shown, which will be the destination of the two irregular associations with respect to the pair of states corresponding to the pseudo random number $r_i$=4, when M=10 and the pseudo random number $r_i$=4. At this time, the ranges $A_i$ and $B_i$ are {1, 4, 5, 8} and {0, 3, 6, 9}, respectively, that is, are set so as not to overlap each other and so as to be arranged alternately. In this case also, the demodulation performed by the demodulation section 22 is performed in accordance with the rules shown in the table 22a in FIG. 2 and the same function and effect as those in the embodiments described above can be obtained.

[8] Transmission/Reception System in the Present Embodiment

Figure 15:
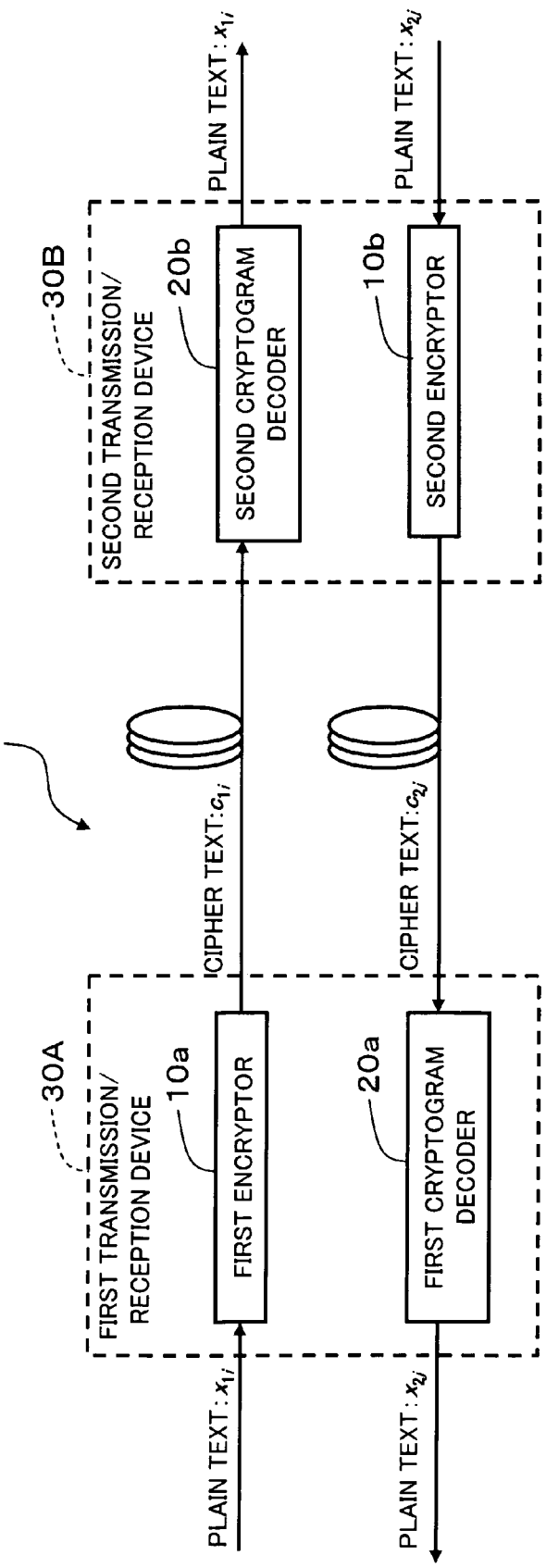
FIG. 15 is a block diagram showing a configuration example of a transmission/reception system to which the encryption/cryptogram decoding technique of the present invention is applied.

FIG. 15 is a block diagram showing a configuration example of a transmission/reception system to which the encryption/cryptogram decoding technique of the present invention has been applied and a transmission/reception system 1 shown in FIG. 15 is configured so as to include a first transmission/reception device 30A and a second transmission/reception device 30B communicably connected to each other via a communication network etc.

The first transmission/reception device 30A is configured so as to include a first encryptor 10a for encrypting input data (plain text $x_{1i}$) to be transmitted to the second transmission/reception device 30B and a first cryptogram decoder 20a for decoding encrypted data (cipher text $c_{2j}$) received from the second transmission/reception device 30B, and the second transmission/reception device 30B is configured so as to include a second encryptor 10b for encrypting input data (plain text $x_{2j}$) to be transmitted to the first transmission/reception device 30A and a second cryptogram decoder 20b for decoding encrypted data (cipher text $c_{1i}$) received from the first transmission/reception device 30A.

Here, the first encryptor 10a and the second encryptor 10b are both configured in the same manner as that of the encryptor 10 shown in FIG. 1 and the first cryptogram decoder 20a and the second cryptogram 20b are both configured in the same manner as that of the cryptogram decoder 20 shown in FIG. 2. Then, in the transmission/reception system 1 shown in FIG. 15, the first encryptor 10a and the second cryptogram decoder 20b are paired and the physical random number generators 11 and 21 in the devices 10a and 20b are configured so as to generate a pseudo random number $r_{1i}$ in synchronization based on an identical encryption key $K_1$ and the second encryptor 10b and the first cryptogram decoder 20a are paired and the physical random number generators 11 and 21 in the devices 10b and 20a are configured so as to generate a pseudo random number $r_{2j}$ in synchronization based on an identical encryption key $K_2$. Here, the encryption key $K_1$ of the physical random number generators 11 and 21 in the devices 10a and 20b and the encryption key $K_2$ of the physical random number generators 11 and 21 in the devices 10b and 20a are set differently.

With such a configuration, the transmission data from the first transmission/reception device 30A to the second transmission/reception device 30B is encrypted by the encryption procedure described above by the first encryptor 10a and transmitted to the second transmission/reception device 30B as cipher text and on the second transmission/reception device 30B side, the cipher text received from the first transmission/reception device 30A is decoded into plain text by the cryptogram decoding procedure described above by the second cryptogram decoder 20b. Similarly, the transmission data from the second transmission/reception device 30B to the first transmission/reception device 30A is encrypted by the encryption procedure described above by the second encryptor 10b and transmitted to the first transmission/reception device 30A as cipher text and on the first transmission/reception device 30A side, the cipher text received from the second transmission/reception device 30B is decoded into plain text by the cryptogram decoding procedure described above by the first cryptogram decoder 20a.

Due to this, cipher communication to which the encryption technique in the present embodiment is applied is realized between the first transmission/reception device 30A and the second transmission/reception device 30B and the same function and effect as those described above can be obtained.

Further, in the transmission/reception system 1 shown in FIG. 15, by applying the encryption technique in the present embodiment, it is possible to secure an extremely high encryption strength against a known plain-text attack as described above, therefore, it is no longer necessary to perform re-distribution of the complex encryption key using the public key encryption and it is possible to embed the fixed encryption keys $K_1$ and $K_2$ in a transmission/reception device for use. Further, by embedding encryption keys in a transmission/reception device, it is possible to operate a transmission/reception system until its end of life is reached in a state in which so high confidentiality is maintained that the encryption keys $K_1$ and $K_2$ are secret even to a user him/herself.

In this case, however, even the user him/herself does not know the encryption keys $K_1$ and $K_2$, therefore, it is made impossible for the first transmission/reception device 30A and the second transmission/reception device 30B to authenticate whether or not the other party is a legitimate transmitter or receiver (opposite party in communication) or to confirm whether or not the modulation pseudo random number $r_{1i}$ of the first encryptor 10a and the demodulation pseudo random number $r_{1i}$ of the second cryptogram decoder 20b are in synchronization and the modulation pseudo random number $r_{2j}$ of the second encryptor 10b and the demodulation pseudo random number $r_{2j}$ of the first cryptogram decoder 20a are in synchronization based on the encryption key K itself or information about the encryption key K.

Figure 19:
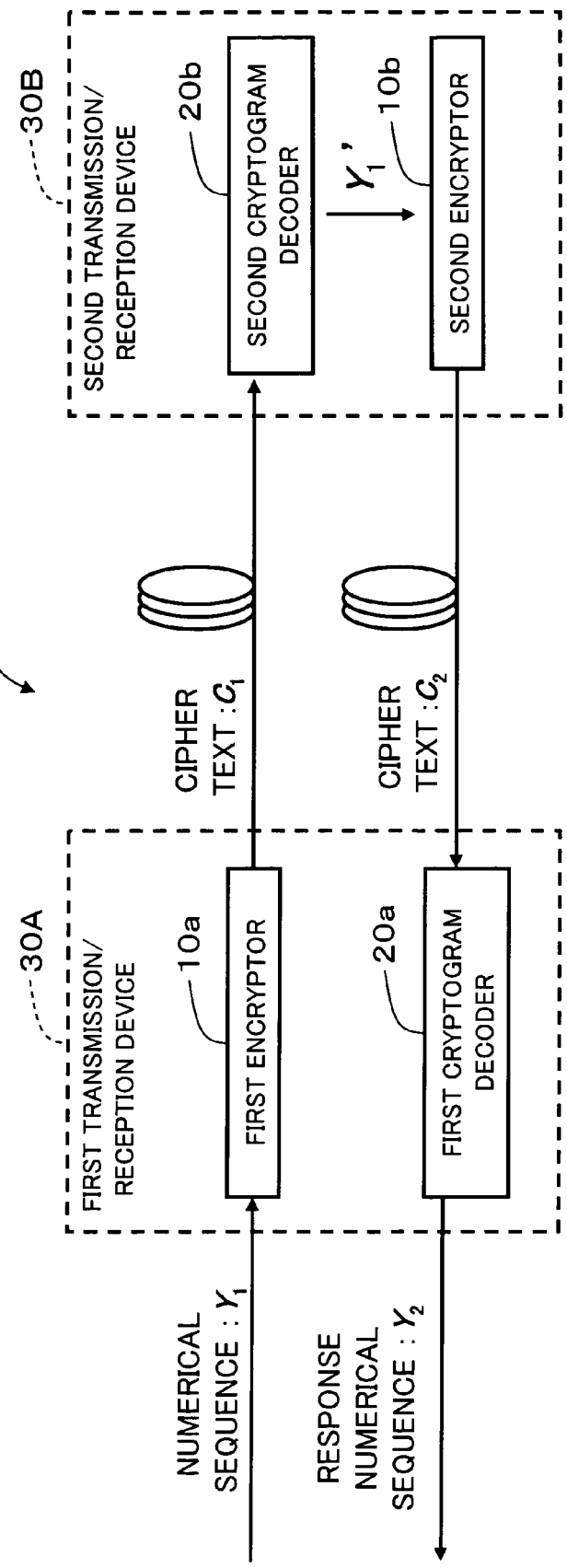
FIG. 19 is a diagram for explaining a method for authenticating legitimate transmitter and receiver and confirming synchronization of a pseudo random number in a transmission/reception system to which the encryption/cryptogram decoding technique of the present invention is applied.

Then, as shown in FIG. 19, a means as follows is provided in the transmission/reception system 1 in order to simultaneously perform the authentication of the legitimate transmitter and receiver and the confirmation of synchronization of the pseudo random numbers $r_{1i}$ and $r_{2j}$ described above.

With this means, in the first transmission/reception device 30A, as input data (plain text) of the first encryptor 10a, an authentication numerical sequence (a random sequence) $Y_1$ having a length equal to or greater than the length of the greater one in key length of the encryption keys $K_1$ and $K_2$ for generating the modulation pseudo random numbers $r_{1i}$ and $r_{2j}$ and the demodulation pseudo random numbers $r_{1i}$ and $r_{2j}$ is input and after the encrypted data (cipher text) $C_1$ of the authentication numerical sequence $Y_1$ is transmitted from the first encryptor 10a to the second transmission/reception device 20B, in the second transmission/reception device 20B, as input data of the second encryptor 10b, a decoded numerical sequence $Y_1'$ obtained by decoding the cipher text $C_1$ of the authentication numerical sequence $Y_1$ by the second cryptogram decoder 20b is input, the encrypted data (cipher text) $C_2$ of the decoded numerical sequence $Y_1'$ is transmitted from the second encryptor 10b to the first transmission/reception device 30A, and in the first transmission/reception device 30A, whether or not a response numerical sequence $Y_2$ obtained by decoding the cipher text $C_2$ of the decoded numerical sequence $Y_1'$ by the first cryptogram decoder 20a coincides with the original authentication numerical sequence $Y_1$ is judged.

When the response numerical sequence $Y_2$ and the original authentication numerical sequence $Y_1$ coincide with each other, that is, $Y_1 = Y_1' = Y_2$, it can be judged that the pseudo random number $r_{1i}$ in the first encryptor 10a and the second cryptogram decoder 20b, which will be a pair in transmission/reception, is generated in synchronization based on the same encryption key $K_1$ and the pseudo random number $r_{2j}$ in the second encryptor 10b and the first cryptogram decoder 20a, which will be a pair in transmission/reception, is also generated in synchronization based on the same encryption key $K_2$.

Due to this, when the response numerical sequence $Y_2$ and the original authentication numerical sequence $Y_1$ coincide with each other, even if a user does not know the encryption keys $K_1$ and $K_2$, it is possible to authenticate that the first transmission/reception device 30A and the second transmission/reception 30B are the legitimate transmitter and receiver (opposite party in communication) to each other and also that the modulation pseudo random number $r_{1i}$ in the first encryptor 10a and the demodulation pseudo random number $r_{1i}$ in the second cryptogram decoder 20b are synchronized with each other and the modulation pseudo random number $r_{2i}$ in the second encryptor 10b and the demodulation pseudo random number $r_{2j}$ in the first cryptogram decoder 20b are synchronized with each other.

[9] Public Line System in the Present Embodiment

In the transmission/reception system 1 shown in FIG. 15, the first transmission/reception device 30A and the second transmission/reception device 30B are communicably connected to each other and communication is performed in a one-to-one manner, however, if the encryption technique in the present embodiment described above is applied to the case where communication is performed simply using a public line, it is necessary for two terminal devices (for example, mobile phones) that perform communication to have without fail the same encryption key and generate a pseudo random number in synchronization based on the encryption key. However, if an encryption key is distributed to two arbitrary terminal devices using public key encryption, when performing communication via a public line (an exchange office), the vulnerability by the public key encryption described above cannot be eliminated and therefore it is not preferable.

Figure 16:
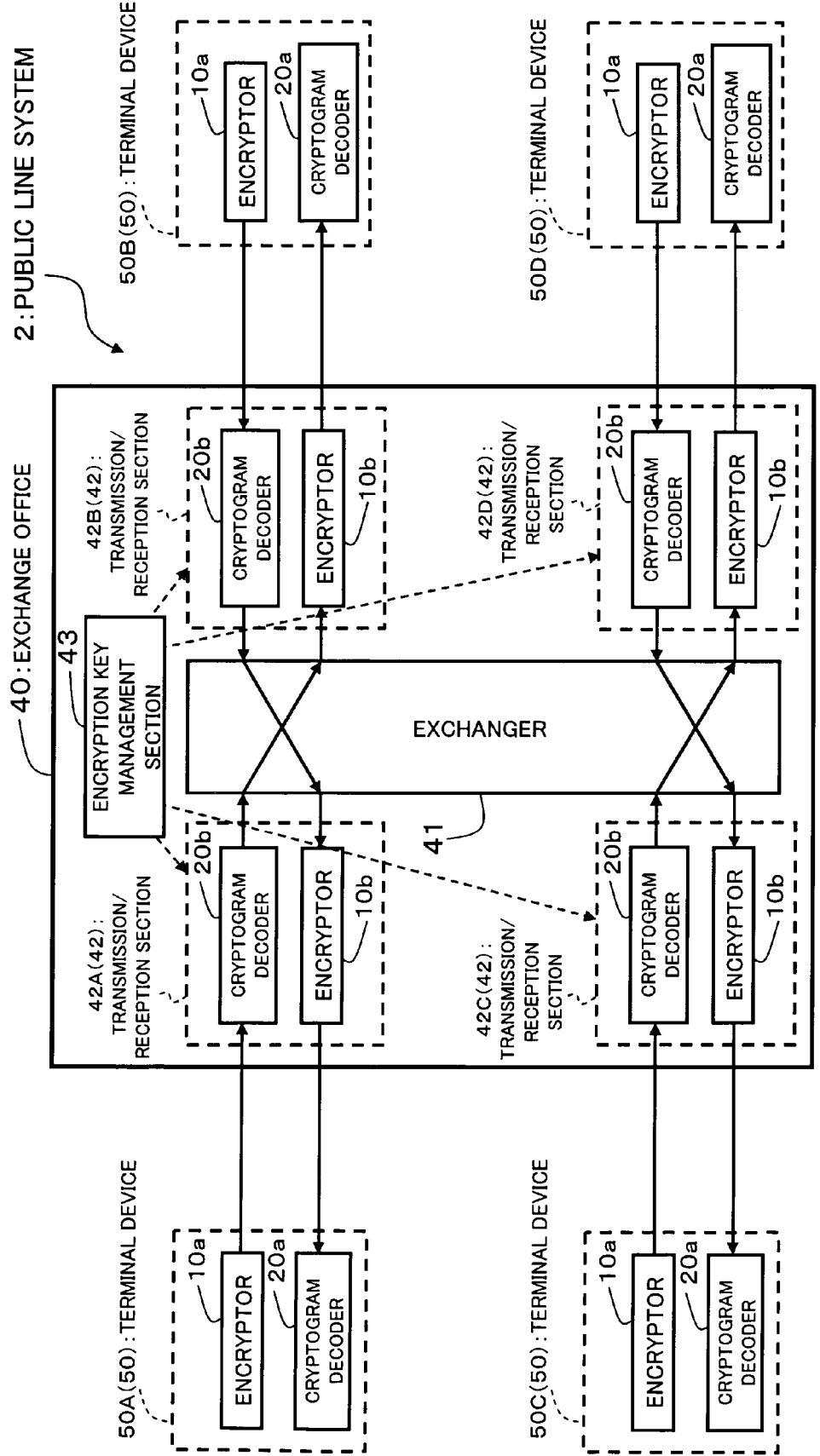
FIG. 16 is a block diagram showing a configuration example of a public line system to which the encryption/cryptogram decoding technique of the present invention is applied.
Figure 17:
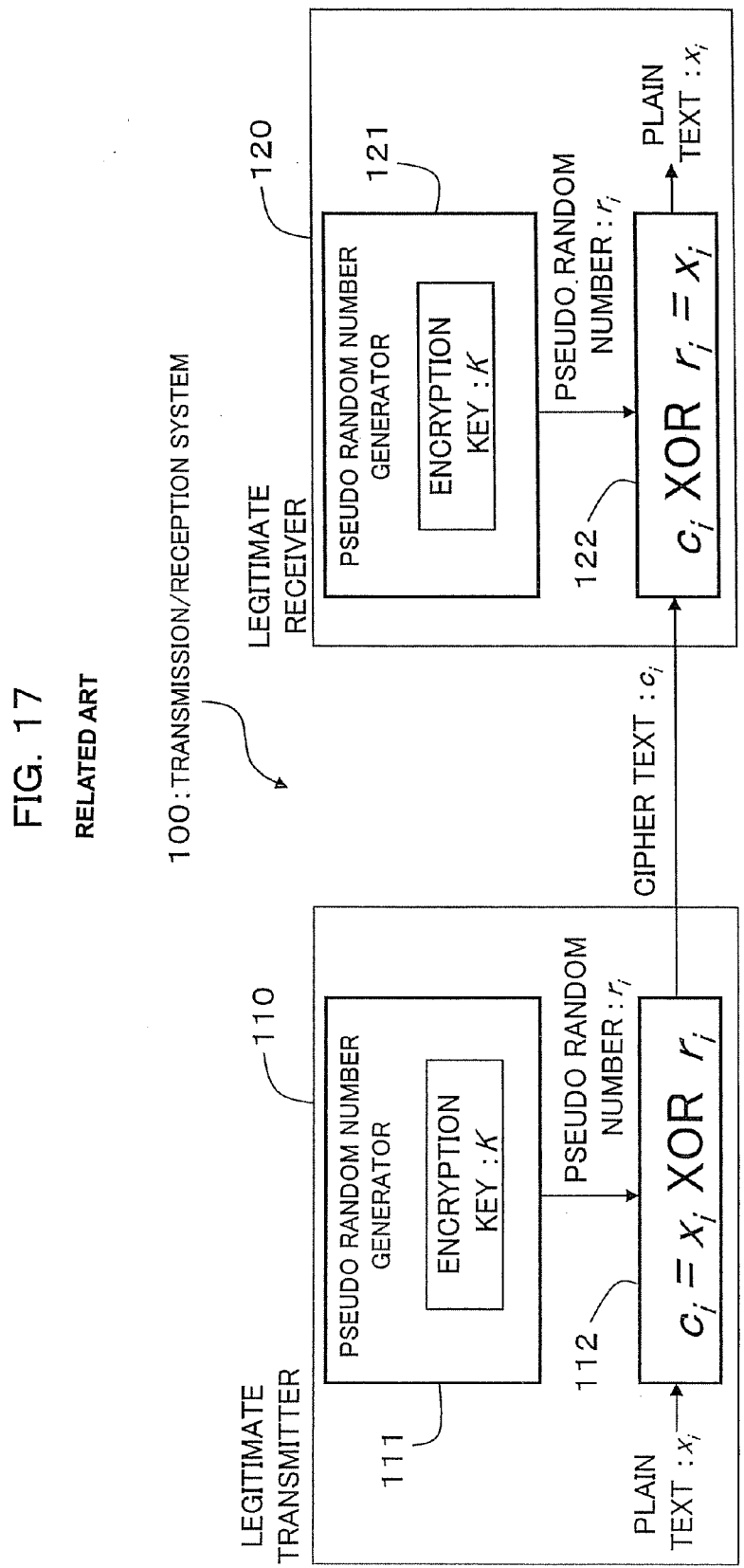
FIG. 17 is a block diagram showing a configuration of a general transmission/reception system to which stream cipher is applied.
Figure 18:
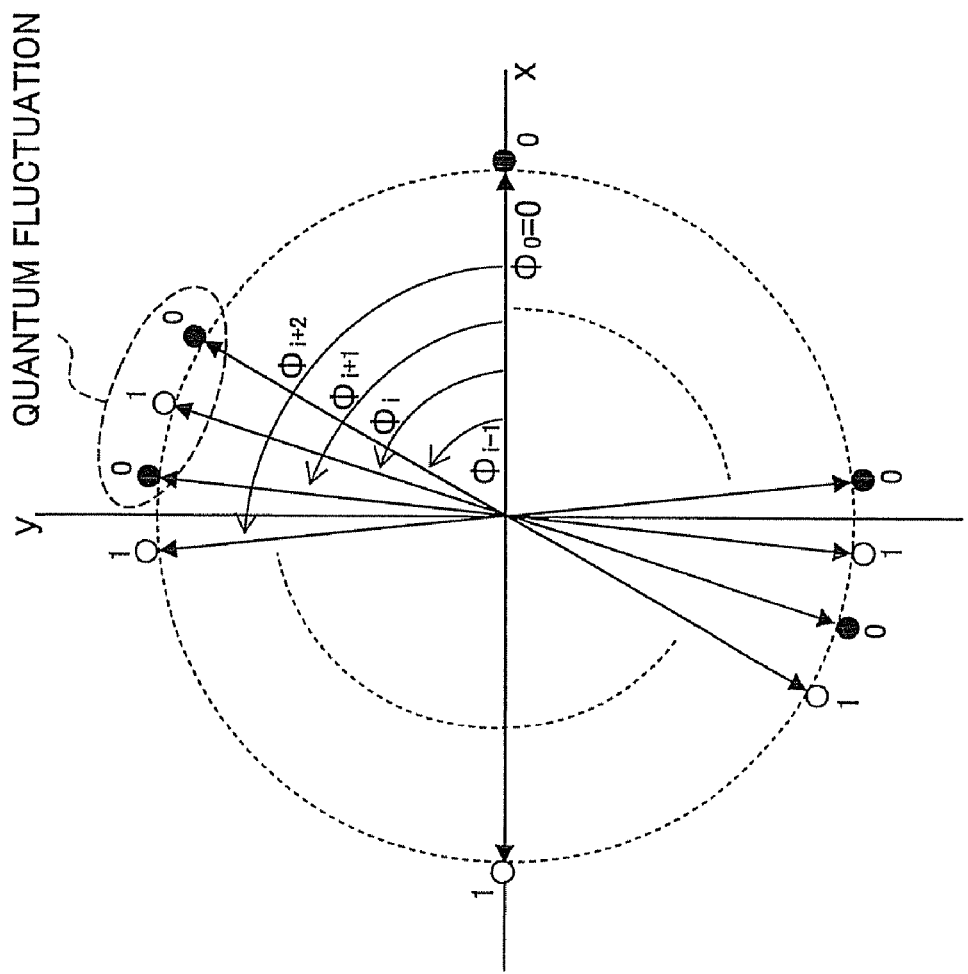
FIG. 18 is a diagram for explaining the Y-00 scheme quantum cryptography.

Therefore, a public line system is shown in FIG. 16, in which a pseudo random number generator including a predetermined encryption key is incorporated in each terminal device in a state in which tamper-resistant properties of the encryption key are secured and by using the function of an exchange office, it is made possible to perform communication to which the encryption technique in the present embodiment is applied between two arbitrary terminal devices without changing the encryption key on the side of each terminal device.

FIG. 16 is a block diagram showing a configuration example of a public line system to which the encryption/cryptogram decoding technique of the present invention is applied and a public line system 2 shown in FIG. 16 is configured so as to include an exchange office 40 having an exchange 41 and a plurality of terminal devices 50A, 50B, 50C, and 50D (four devices in FIG. 16) that can communicate with each other via the exchange office 40. Here, in the following description, when it is necessary to specify the individual terminal devices, symbols 50A, SOB, 50C, and 50D are used and when not, a symbol 50 is used.

Each terminal device 50 is a mobile phone, for example, and configured so as to include the first encryptor 10a for encrypting input data (plain text) to be transmitted to a specific terminal device via the exchange office 40 and the first cryptogram decoder 20a for decoding the encrypted data (cipher text) received from the specific terminal device via the exchange office 40.

Further, the exchange office 40 is configured so as to include the exchange for performing an exchange operation for connecting each terminal device 50 and the specific terminal device, transmission/reception sections 42A, 42B, 42C, and 42D interposed between the terminal devices 50A, SOB, 50C, and 50D and the exchange 41, and an encryption key management section 43 for performing management of an encryption key generating a pseudo random number. Here, in the following description, when it is necessary to specify the individual transmission/reception devices, symbols 42A, 42B, 42C, and 42D are used and when not, a symbol 42 is used.

Each transmission/reception 42 is configured so as to provide the second encryptor 10b for receiving via the exchanger 41 and encrypting input data (plain text) to be transmitted from the specific terminal device to each terminal device 50 and the second cryptogram decoder 20b for decoding once and inputting to the exchanger 41 the encrypted data (cipher text) to be transmitted from each terminal device 50 to the specific terminal device.

Here, the first encryptor 10a and the second encryptor 10b are both configured in the same manner as that of the encryptor 10 shown in FIG. 1 and the first cryptogram decoder 20a and the second cryptogram decoder 20b are both configured in the same manner as that of the cryptogram decoder 20 shown in FIG. 2. Then, also in the public line system shown in FIG. 16, the first encryptor 10a and the second cryptogram decoder 20b are paired and the pseudo random number generators 11 and 21 in the devices 10a and 20b are configured so as to generate a pseudo random number in synchronization based on an identical encryption key and the second encryptor 10b and the first cryptogram decoder 20a are paired and the pseudo random number generators 11 and 21 in the devices 10b and 20a are configured so as to generate a pseudo random number in synchronization based on an identical encryption key.

However, in each terminal device 50, as described above, the pseudo random number generators 11 and 21 (refer to FIG. 1 and FIG. 2) including an encryption key for generating a modulation pseudo random number of a modulation pseudo random number are incorporated in a state in which tamper-resistant properties of the encryption key are secured. Further, in each transmission/reception section 42, the encryption key for generating a pseudo random number used in the pseudo random number generators 11 and 21 (refer to FIG. 1 and FIG. 2) of the second encryptor 10b and the second cryptogram decoder 20b is configured so as to be capable of being distributed and set by the encryption key management section 43 in accordance with the terminal device 50 of the opposite party.

Note that, in the example shown in FIG. 16, the terminal devices 50A and 50B perform mutual communication via the exchange office 40 and similarly, the terminal devices 50C and 50D perform mutual communication via the exchange office 40. Further, the terminal devices 50A, 50B, 50C, and 50D are communicably connected to the transmission/reception sections 42A, 42B, 42C, and 42D in the exchange office 40, respectively. In other words, the terminal devices 50A and 50B are connected to each other via the transmission/reception section 42A, the exchanger 41, and the transmission/reception section 42B in the exchange office 40 and the terminal devices 50C and 50D are connected to each other via the transmission/reception section 42C, the exchanger 41, and the transmission/reception section 42D in the exchange office 40.

In addition, the encryption key management section 43 in the exchange office 40 manages the encryption key used in each of terminal device 50 and transmission/reception device 42 and, for example, manages the encryption key using a database in which the telephone number of each terminal device (mobile phone) 50 and the encryption key possessed by each terminal device 50 are associated with each other and stored. For example, the encryption key management section 43 is configured so as to, when the terminal device 50A originates a call to the terminal device SOB, receive the telephone number of the originating side terminal device 50A and the telephone number of the terminating side terminal device 50B specified by the terminal device 50A, read the encryption key corresponding to the telephone number of the originating side terminal device 50A from the database, and distribute and set the encryption key to the encryptor 10b (the pseudo random number generator 11) and the cryptogram decoder 20b (the pseudo random number generator 21) of the transmission/reception section 42A connected with the terminal device 50A and simultaneously, read the encryption key corresponding to the telephone number of the terminating side terminal device 50 from the database and distribute and set the encryption key to the encryptor 10b (the pseudo random number generator 11) and the cryptogram decoder 20b (the pseudo random number generator 21) of the transmission/reception 42B connected with the terminal device 50B. This also applies when the terminal device 50C originates a call to the terminal device 50D.

At this time, in the public line system 2, distribution and setting of an encryption key for the transmission/reception section 42 are performed in the exchange office 40, therefore, the exchange office 40 itself is caused to have a structure having tamper-resistant properties in order to secure the safety of cipher text by preventing the encryption key from being read by an illegitimate person who accesses (an interceptor) etc. As a method to improve tamper-resistant properties, for example, a method for improving confidentiality in order to make an attempt to read from the outside more difficult, a method for providing a mechanism with which programs and data are destroyed if an attempt to read from the outside is made, etc., are used.

In the public line system 2 thus configured, when communication is performed between the terminal device 50A and the terminal device 50B, first in the exchange office 40, the same encryption key as the encryption key used by the terminal device 50A is distributed and set to the transmission/reception 42A connected to the terminal device 50A and the same encryption key as the encryption key used by the terminal device 50B is distributed and set to the transmission/reception 42B connected to the terminal device 50B.

Then, the transmission data (plain text) from the terminal device 50A to the terminal device 50B is encrypted by the encryption procedure described above by the first encryptor 10a of the terminal device 50A and transmitted to the transmission/reception 42A of the exchange office 40 as cipher text. In the transmission/reception 42A, the cipher text received from the terminal device 50A is decoded once into plain text by the decoding procedure described above by the second cryptogram decoder 20b. The decoded plain text is input to the exchange 41 and transmitted to the transmission/reception section 42B connected to the destination terminal device 50B via the exchange 41. In the transmission/reception 42B, when the plain text to be transmitted from the exchange 41 to the terminal device 50B is received, the plain text is encrypted again by the encryption procedure described above by the second encryptor 10b and transmitted to the terminal device 50B as cipher text. In the terminal device SOB, the cipher text received from the transmission/reception 42B is decoded into plain text by the cryptogram decoding procedure described above by the first cryptogram decoder 20a. The data transmission from the terminal device 50B to the terminal device 50A is also performed in the same manner as that described above.

As described above, according to the public line system 2 shown in FIG. 16, the pseudo random number generators 11 and 12 including a predetermined encryption key are incorporated in each terminal device 50 in a state in which tamper-resistant properties are secured and by using the functions of the transmission/reception section 42 and the encryption key management section 43 in the exchange office 40, encryption communication to which the encryption technique in the present embodiment described above is applied is realized between two arbitrary terminal devices 50 and 50 without the need to change the encryption key on the side of each terminal device 50, and the same function and effect as those described above can be obtained.

Further, in the public line system 2 shown in FIG. 16, by applying the encryption technique in the present embodiment and causing the exchange office 40 itself to have a structure having tamper-resistant properties, it is possible to secure an extremely high encryption strength against a known plain-text attack without the need to notify a user of the encryption key used in the pseudo random number generators 11 and 21 and distribution of the encryption key using public key encryption can be eliminated.

[10] First Example of the Communication System in the Present Embodiment

Figure 20:
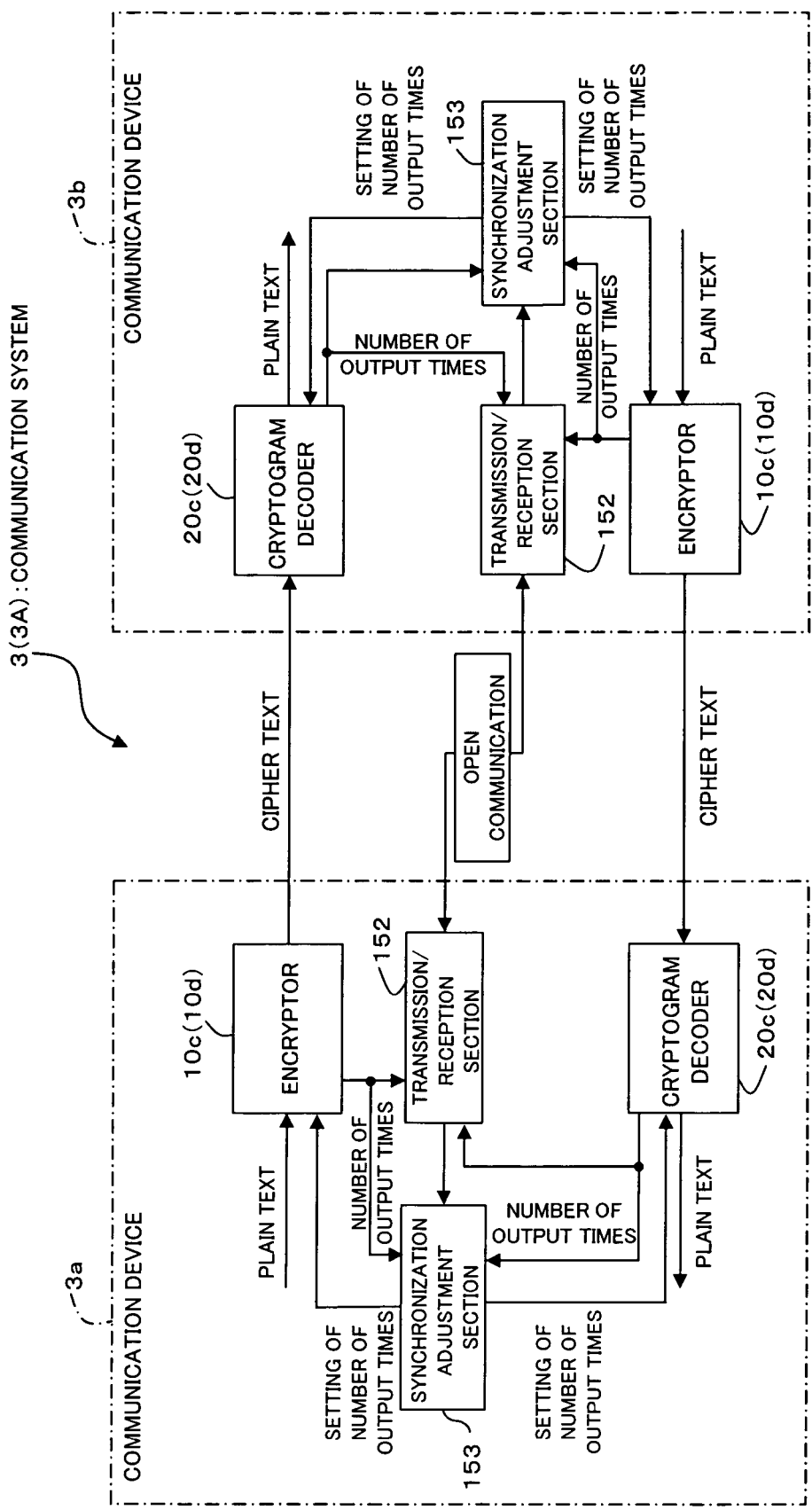
FIG. 20 is a block diagram showing the entire configuration of a first example and a second example of a communication system to which the encryption/cryptogram decoding technique of the present invention is applied.

FIG. 20 is a block diagram showing the entire configuration of the first example (refer to symbol 3) and the second example (refer to symbol 3A) of the communication system to which the encryption/cryptogram decoding technique of the present invention has been applied, and the communication system 3 in the first example shown in FIG. 20 is configured so as to include two communication devices 3a and 3b communicably connected to each other via a communication network etc. For the communication system 3 in the first example and the communication system 3A in the second example to be described later, the case is described where the two communication devices 3a and 3b are communicably connected via a communication channel (a signal line) without tampering and the two communication devices 3a and 3b perform synchronization processing by open communication via the communication channel.

The communication devices 3a and 3b have the same configuration and the communication device 3a is configured so as to include an encryptor 10c for encrypting input data (plain text $x_i$) to be transmitted to the communication device 3b by the method described above and a cryptogram decoder 20c for decoding the encrypted data ($c_i$ or $s_i$) received from the communication device 3b by the method described above, and a transmission/reception section 152 and a synchronization adjustment section 153 to be described later, and the communication device 3b is configured so as to include the encryptor 10c for encrypting input data (plain text $x_i$) to be transmitted to the communication device 3a by the method described above and the cryptogram decoder 20c for decoding the encrypted data (cipher text $c_i$ or $s_i$) received from the communication device 3a by the method described above, and the transmission/reception section 152 and the synchronization adjustment section 153 to be described later. By the way, the configuration of the encryptor 10c will be described later with reference to FIG. 21 and the configuration of the cryptogram decoder 20c will be described later with reference to FIG. 22.

Further, in the communication system 3 shown in FIG. 20, the encryptor 10c in the communication device 3a and the cryptogram decoder 20c in the communication device 3b are paired and the pseudo random number generators 11 and 21 (refer to FIG. 21 and FIG. 22) in the devices 10c and 20c are configured so as to synchronize and generate the pseudo random number $r_i$ based on the same encryption key. Similarly, the encryptor 10c in the communication device 3b and the cryptogram decoder 20c in the communication device 3a are paired and the pseudo random number generators 11 and 21 in the devices 10c and 20c are also configured so as to synchronize and generate the pseudo random number $r_i$ based on the same encryption key. However, as the encryption key used in each pair of devices described above, different keys are set.

With such a configuration, the transmission data from the communication device 3a to the communication device 3b is encrypted by the above-described encryption procedure by the encryptor 10c and transmitted to the communication device 3b as the cipher text and on the communication device 3b side, the cipher text received from the communication device 3a is decoded into plain text by the above-described cryptogram decoding procedure by the cryptogram decoder 20c. Similarly, the transmission data from the communication device 3b to the communication device 3a is encrypted by the above-described encryption procedure by the encryptor 10c and transmitted to the communication device 3a as the cipher text and on the communication device 3a side, the cipher text received from the communication device 3b is decoded into plain text by the above-described cryptogram decoding procedure by the cryptogram decoder 20c.

Here, the transmission/reception section 152 and the synchronization adjustment section 153 are used when synchronization shift occurs for some reason in the pseudo random number generation operation of the pseudo random number generators 11 and 21 and cipher communication between the encryptor 10c and the cryptogram decoder 20c becomes no longer possible.

The transmission/reception section 152 transmits the number of output times of the modulation pseudo random number or the demodulation pseudo random number read from a nonvolatile memory 134 (refer to FIG. 21) or a nonvolatile memory 144 (refer to FIG. 22) to be described later to the communication device 3a or 3b, which is the opposite party in communication, as synchronization information and at the same time, receives synchronization information from the communication device 3a or 3b, which is the opposite party in communication. As the transmission/reception section 152, a general transceiver etc. that performs open communication is used.

When synchronization shift occurs for some reason in the pseudo random number generation operation of the pseudo random number generators 11 and 21 and cipher communication between the encryptor 10c and the cryptogram decoder 20c becomes no longer possible, the above-described number of output times is transmitted and received as synchronization information between the communication devices 3a and 3b (between the transmission/reception sections 152 and 152) via a communication network etc. (here, a communication channel without tampering) using the transmission/reception sections 152 and 152 respectively provided to the communication devices 3a and 3b.

Figure 21:
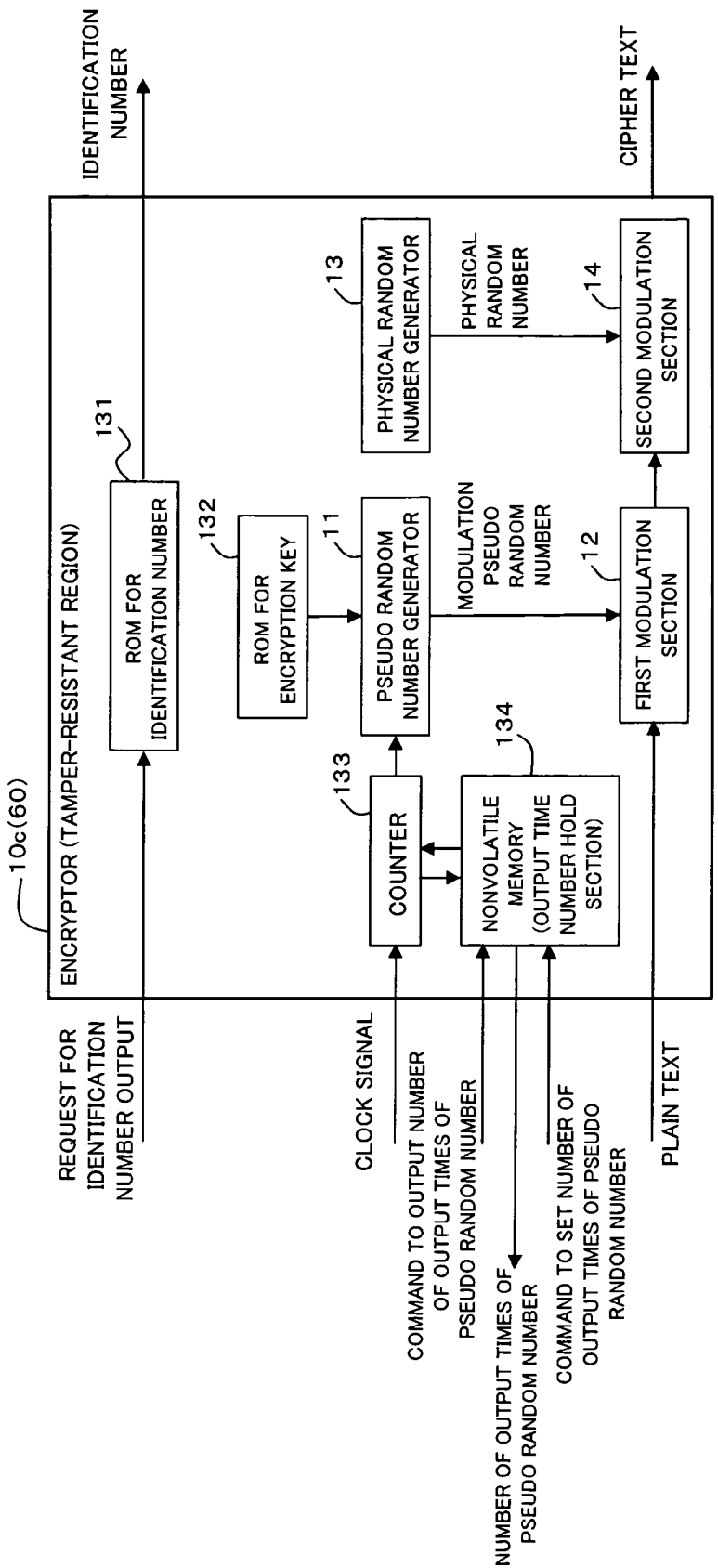
FIG. 21 is a block diagram showing a configuration of an encryptor in the first example of the communication system shown in FIG. 20.
Figure 22:
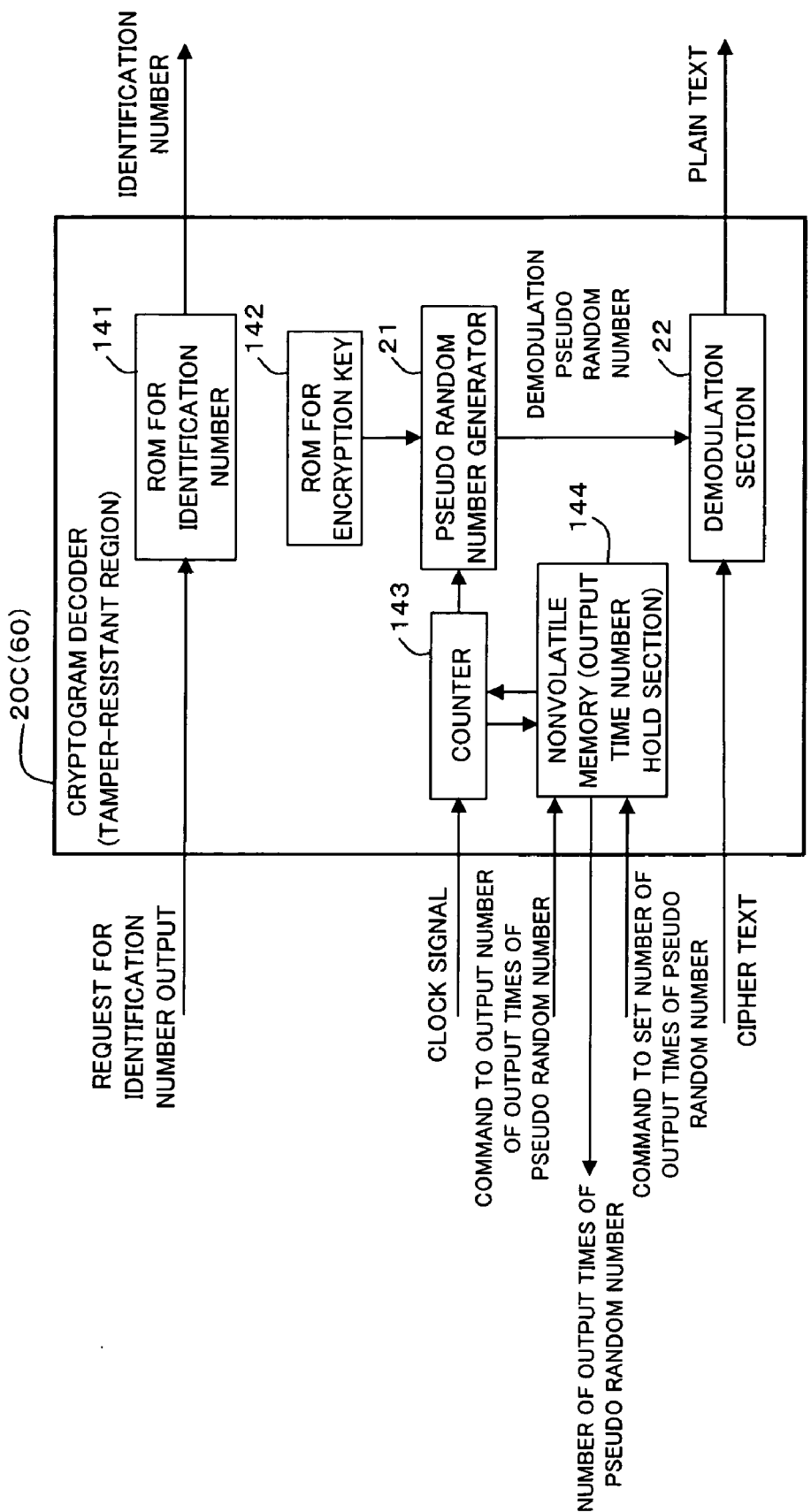
FIG. 22 is a block diagram showing a configuration of a cryptogram decoder in the first example of the communication system shown in FIG. 20.

The synchronization adjustment section 153 adjusts the numbers of output times of the pseudo random numbers from the pseudo random number generators 11 and 21 based on the numbers of output times read from the nonvolatile memory 134 or 144 in order to synchronize the pseudo random number generation operation by the modulation pseudo random number generator 11 of the communication device 3a (refer to FIG. 21) with the pseudo random number generation operation by the demodulation pseudo random number generator 21 of the communication device 3b (refer to FIG. 22) or in order to synchronize the pseudo random number generation operation by the modulation pseudo random number generator 11 of the communication device 3b (refer to FIG. 21) with the pseudo random number generation operation by the demodulation pseudo random number generator 21 of the communication device 3a (refer to FIG. 22).

Particularly, the synchronization adjustment section 153 in the communication system 3 adjusts to match the number of output times of the modulation pseudo random number from the pseudo random number generator 11 of the encryptor 10c (or the demodulation pseudo random number from the pseudo random number generator 21 of the cryptogram decoder 20c) with the number of output times of the demodulation pseudo random number (or the modulation pseudo random number) on the communication device 3a or 3b side of the opposite party in communication when the number of output times of the demodulation pseudo random number (or the modulation pseudo random number) on the communication device 3a or 3b side of the opposite party in communication, which is decoded by the transmission/reception section 152, is greater than the number of output times of the modulation pseudo random number (or the demodulation pseudo random number) read from the nonvolatile memory 134 (or 144).

At this time, as will be described later with reference to FIG. 21 or FIG. 22, the synchronization adjustment section 153 in the communication system 3 adjusts the number of output times from the pseudo random number generator 11 or 21 by setting the number of output times for the nonvolatile memory 134 of the encryptor 10c or the nonvolatile memory 144 of the cryptogram decoder 20c, or by performing dummy inputting of a clock signal for the pseudo random number generator 11 or 21. Here, dummy inputting of a clock signal refers to an operation to input a clock signal for causing the pseudo random number generator 11 or 21 to perform the pseudo random number generation operation only to adjust the number of output times of pseudo random number without encrypting plain text.

Next, the configuration of the encryptor 10c will be explained with reference to FIG. 21. FIG. 21 is a block diagram showing the configuration of the encryptor 10c in the communication system 3 shown in FIG. 20 and the encryptor 10c shown in FIG. 21 is configured so as to include the modulation pseudo random number generator 11, the first modulation section 12, the physical random number generator 13, and the second modulation section 14 as same as those in the above-described encryptor 10, and in addition, an identification number ROM (Read Only Memory) 131, an encryption key ROM (Read Only Memory) 132, a counter 133, and the nonvolatile memory 134.

In addition, the encryptor 10c in the present embodiment suppresses the leakage of the encryption key for pseudo random number generation or the pseudo random number $r_i$ from the pseudo random number generator 11, and is arranged in a tamper-resistant region 60 for suppressing probability distribution variations caused by physical disturbance in the physical random number $f_i$ generated by the physical random number generator 13. Here, the tamper-resistant region 60 in which the encryptor 10c is arranged provides such a structure like the following items (11) to (17). By the way, the encryptor 10c (the tamper-resistant region 60) shown in FIG. 21 is configured, for example, on a single chip (not shown).

(11) A structure with which the encryption key of the encryption key ROM 132 (that is, the "seed" of the pseudo random number $r_i$) cannot be read even if the chip is disassembled. For example, a wiring structure with which if the chip is disassembled in an attempt to read the encryption key in the ROM 132, the ROM 132 breaks.

(12) A structure with which the signal line of the pseudo random number $r_i$ (the signal line between the pseudo random number generator 11 and the first modulation section 12) cannot be tapped even if the chip is disassembled. For example, a wiring structure with which the chip does not work any longer if the chip is broken in an attempt to tap the signal line of the pseudo random number $r_i$.

(13) A structure with which the probability distribution variations do not occur in the physical random number $f_i$ from the physical random number generator 13 even if physical disturbance is applied from the outside of the chip. For example, a structure of a physical random number generator with which the probability distribution of the physical random number $f_i$ does not change even if the entire chip is cooled or an abnormal input voltage is applied. Or, a mechanism that stops the operation of the chip before the distribution of the physical random number $f_i$ is biased by detecting temperatures or an input voltage.

(14) A structure from which the identification number of the identification number ROM 131 can be read but cannot be tampered.

(15) A structure with which the signal line of the physical random number $f_i$ (the signal line between the physical random number generator 13 and the second modulation section 14) cannot be tapped even if the chip is disassembled. For example, a wiring structure with which if the chip is broken in an attempt to tap the signal line of the physical random number $f_i$ the chip does not work any longer.

(16) A structure with which information (for example, the number of output times counted by the counter 133, as will be described later) held in the nonvolatile memory 134 cannot be tampered.

(17) A structure that prevents the pseudo random number generator 11 from being accessed directly by avoiding the counter 133 and the pseudo random number generator 11 from generating the pseudo random number $r_i$ with an arbitrary number of order. For example, a wiring structure with which the signal line between the counter 133 and the pseudo random number generator 11 cannot be tapped even if the chip is disassembled and the chip does not work any longer if the chip is broken in an attempt to tap the signal line.

Note that, in the encryptor 10c shown in FIG. 21, the channel coding section 15 (refer to FIG. 1) is not shown schematically. The channel coding section 15 may be provided similar to the encryptor 10 shown in FIG. 1 or may not be provided. When the channel coding section 15 is provided, the channel coding section 15 may be arranged in the tamper-resistant region 60 or outside the tamper-resistant region 60.

Further, the modulation pseudo random number generator 11 in the communication system 3 is configured so as to prohibit reset and repetition of the generation operation of the modulation pseudo random number $r_i$. In other words, in the present embodiment, the pseudo random number generator 11 is configured so that "the reset (rewinding) of the pseudo random number output is possible in no case". Instead of this, in the present embodiment, the counter 133 and the nonvolatile memory 134 are so designed as to be capable of outputting "until what number pseudo random number has been output so far" if there is a request from the outside.

Furthermore, the modulation pseudo random number generator 11 in the communication system 3 is capable of advancing the modulation pseudo random number $r_i$ (that is, the number of output times) one by one by performing a dummy inputting of a clock signal and generating and outputting the modulation pseudo random number $r_i$ from a desired number of output times (N-th) ahead of the current number of output times by setting a desired number of output times (for example, N) in the nonvolatile memory 134, which will be described later. However, it is not possible to cause the modulation pseudo random number generator 11 to generate the modulation pseudo random number $r_i$ from the number of output times by setting a number of output times prior to the current number of output times (for example M) (N<M). Either way, the modulation pseudo random number generator 11 in the communication system 3 has the "specifications that the modulation pseudo random number $r_i$ to be generated can be advanced but cannot be retrograded".

The identification number ROM 131 holds the identification number (ID number) inherent to the encryptor 10c and the identification number is output to the outside from the ROM 131 at the request for the output of the identification number from the outside. The identification number has no numerical relationship with the encryption key (seed) held in the encryption key ROM 132, however, it corresponds to the encryption key (seed) in a one-to-one manner and with this identification number, it is made possible to identify the cryptogram decoder 20c to be synchronized with the encryptor 10c, that is, the cryptogram decoder 20c holding the same encryption key (seed) as the encryption key (seed) held in the encryption key ROM 132 of the encryptor 10c.

The encryption key ROM 132 holds the encryption key (seed) used in the modulation pseudo random number generator 11 and the modulation pseudo random number generator 11 in the communication system 3 generates the modulation pseudo random number $r_i$ based on the encryption key (seed) held in the ROM 132.

The counter 133 counts the number of input times of a clock signal input from the outside to cause the modulation pseudo random number generator 11 to perform the pseudo random number generation operation, that is, the number of output times of the modulation pseudo random number $r_i$ from the modulation pseudo random number generator 11.

The nonvolatile memory (first hold section) 134 holds the number of output times (the number of input times of the clock signal) counted by the counter 133 and also has the function of outputting the held number of output times to the outside (outside the encryptor 10c/outside the tamper-resistant region 60) in response to an output command from the outside (outside the encryptor 10c/outside the tamper-resistant region 60). Further, the nonvolatile memory 134 is configured so that a desired number of output times (for example, N) is set from the outside (outside the encryptor 10c/outside the tamper-resistant region 60) and when the number of output times is set in the nonvolatile memory 134, the number of output times is further set to the counter 133 from the nonvolatile memory 134. Then, the modulation pseudo random number generator 11 is configured so as to generate the modulation pseudo random number $r_i$ from the N-th number corresponding to the number of output times set to the counter 133 based on the encryption key (seed) held in the encryption key ROM 132.

Here, as described above, as the modulation pseudo random number generator 11 that generates the modulation pseudo random number $r_i$ from the N-th number corresponding to the number of output times set to the counter 133 based on the encryption key (seed) held in the encryption key ROM 132, for example, a BBS (Blum, Blum, and Shub) generator is used (for example, refer to L. Blum, M. Blum, and M. Shub, "A Simple Unpredictable Pseudo-Random Number Generator", SIAM Journal on Computing, v. 15, n.2, 1986, pp. 364-383). With this BBS generator, it is possible to calculate the N-th modulation pseudo random number $r_i$ directly from the "seed" (encryption key).

Therefore, in the communication system 3, the modulation pseudo random number generator 11 is capable of sequentially generating the modulation pseudo random number $r_i$ each time a clock signal is input and in addition, of generating the N-th modulation pseudo random number $r_i$ directly from the encryption key (seed) held in the encryption key ROM 132 only by setting the number of output times N to the counter 133 (the nonvolatile memory 134).

Further, in the communication system 3, the number of output times of the modulation pseudo random number $r_i$ (the number of input times of the clock signal) from the modulation pseudo random number generator 11 is counted by the counter 133 at all times and recorded in the nonvolatile memory 134, therefore, even if the power of the encryptor 10c is cut off, when the power is turned on the next time, the modulation pseudo random number generator 11 will start the output of the pseudo random number subsequent to the last output number before the power was cut off.

Note that, the dummy inputting of a clock signal for the modulation pseudo random number generator 11 or setting of the number of output times in the nonvolatile memory 134 is performed on request of a user at the time of initial setting and in addition, it is performed by the synchronization adjustment section 153 (refer to FIG. 20) in order to adjust the synchronization between the encryptor 10*c* and the cryptogram decoder 20*c* (to eliminate the synchronization shift that has occurred in the pseudo random number generation operation between the pseudo random number generators 11 and 21), as described above.

In the encryptor 10*c* configured as described above, as an interface between the inside and the outside of the tamper-resistant region 60, those corresponding to the following items (21) to (28) are required.

(21) Input of plain text (input $x_i$ to the first modulation section 12)

(22) Output of cipher text (output $s_i$ from the second modulation section 14)

(23) Input of an output command of a device identification number (an output command to the identification number ROM 131)

(24) Output of a device identification number (output from the identification number ROM 131 in accordance with the output command of (23))

(25) Input of a clock signal (input to the counter 133/modulation pseudo random number generator 11)

(26) Input of an output command of the number of output times of a pseudo random number (an output command to the nonvolatile memory 134)

(27) Output of the number of output times of a pseudo random number (output from the nonvolatile memory 134 in accordance with the output command of (26))

(28) Input of the setting of the number of output times of a pseudo random number (input to the nonvolatile memory 134).

At this time, as described above, the number of output times set in the nonvolatile memory 134 (the counter 133) by the input interface of the item (28) can be set always only in the direction of increment, however, it may also be configured so as to omit the input interface of the item (28) and perform the setting of the number of output times by performing dummy inputting of a clock signal for the counter 133/modulation pseudo random number generator 11.

Next, the configuration of the cryptogram decoder 20*c* will be explained with reference to FIG. 22. FIG. 22 is a block diagram showing the configuration of the cryptogram decoder 20*c* in the communication system 3 shown in FIG. 20 and the cryptogram decoder 20*c* shown in FIG. 22 is configured so as to include the demodulation pseudo random number generator 21 and the demodulation section 22 as same as those in the cryptogram decoder 20 described above and in addition, an identification number ROM (Read Only Memory) 141, an encryption key ROM (Read Only Memory) 142, a counter 143, and the nonvolatile memory 144.

In addition, the cryptogram decoder 20*c* in the communication system 3 is arranged in the tamper-resistant region 60 for suppressing the leakage of the encryption key for pseudo random number generation or of the pseudo random number $r_i$ from the pseudo random number generator 11. Here, the tamper-resistant region 60 in which the cryptogram decoder 20*c* in the communication system 3 is arranged provides such a structure like the following items (31) to (35). Incidentally, the cryptogram decoder 20*c* (the tamper-resistant region 60) shown in FIG. 22 is configured, for example, on a single chip (not shown).

(31) A structure with which the encryption key of the encryption key ROM 142 (that is, the "seed" of the pseudo random number $r_i$) cannot be read even if the chip is disassembled. For example, a wiring structure with which if the chip is disassembled in an attempt to read the encryption key in the ROM 142, the ROM 142 breaks.

(32) A structure with which the signal line of the pseudo random number $r_i$ (the signal line between the pseudo random number generator 21 and the demodulation section 22) cannot be tapped even if the chip is disassembled. For example, a wiring structure with which the chip does not work any longer if the chip is broken in an attempt to tap the signal line of the pseudo random number $r_i$.

(33) A structure from which the identification number of the identification number ROM 141 can be read but cannot be tampered.

(34) A structure with which information (for example, the number of output times counted by the counter 143, as will be described later) held in the nonvolatile memory 144 cannot be tampered.

(35) A structure that prevents the pseudo random number generator 21 from being accessed directly by avoiding the counter 143 and the pseudo random number generator 21 from generating the pseudo random number $r_i$ with an arbitrary number of order. For example, a wiring structure with which the signal line between the counter 143 and the pseudo random number generator 21 cannot be tapped even if the chip is disassembled and the chip does not work any longer if the chip is broken in an attempt to tap the signal line.

Note that, in the cryptogram decoder 20*c* shown in FIG. 22, although the channel-decoding section 23 (refer to FIG. 2) is not shown schematically, however, the channel-decoding section 23 is provided similar to the cryptogram decoder 20 shown in FIG. 2 if the channel-coding section 15 is provided on the encryptor 10*c* side. When the channel-decoding section 23 is provided, the channel-decoding section 23 may be arranged in the tamper-resistant region 60 or outside the tamper-resistant region 60.

Further, the demodulation pseudo random number generator 21 in the communication system 3 is also configured so as to prohibit reset and repetition of the generation operation of the demodulation pseudo random number $r_i$, like the modulation pseudo random number generator 11 in the above-described communication system 3. In other words, in the present embodiment, the pseudo random number generator 21 is configured so that "the reset (rewinding) of the pseudo random number output is possible in no case". Instead, in the present embodiment, if there is a request from the outside, "until what number pseudo random number has been output so far" is output by the function of the counter 143 and the nonvolatile memory 144, which will be described later.

Furthermore, the demodulation pseudo random number generator 21 in the communication system 3 is also capable of advancing the demodulation pseudo random number $r_i$ (that is, the number of output times) one by one by performing dummy inputting of a clock signal and of generating and outputting the demodulation pseudo random number $r_i$ from a desired number of output times (N-th) ahead of the current number of output times by setting a desired number of output times (for example, N) in the nonvolatile memory 144, which will be described later. However, it is designed such that the demodulation pseudo random number generator 21 can not generate the modulation pseudo random number $r_i$ from the number of output times by setting a number of output times prior to the current number of output times (for example M) (N<M). Either way, the demodulation pseudo random number generator 21 in the communication system 3 has the "specifications that the demodulation pseudo random number to be generated can be advanced but cannot be retrograded at all".

The identification number ROM 141 holds the identification number (ID number) inherent to the cryptogram decoder 20c and the identification number is output to the outside from the ROM 141 on request of the output of the identification number from the outside. The identification number has no numerical relationship with the encryption key (seed) held in the encryption key ROM 142, however, with this identification number, it is made possible to identify the encryptor 10c to be synchronized with the cryptogram decoder 20c, that is, the encryptor 10c holding the same encryption key (seed) as the encryption key (seed) held in the encryption key ROM 142 of the cryptogram decoder 20c.

The encryption key ROM 142 holds the encryption key (seed) used in the demodulation pseudo random number generator 21 and the demodulation pseudo random number generator 21 in the communication system 3 generates the demodulation pseudo random number $r_i$ based on the encryption key (seed) held in the ROM 142.

The counter 143 counts the number of input times of a clock signal input from the outside to cause the demodulation pseudo random number generator 21 to perform the pseudo random number generation operation, that is, the number of output times of the demodulation pseudo random number $r_i$ from the demodulation pseudo random number generator 21.

The nonvolatile memory (first hold section) 144 holds the number of output times (the number of input times of the clock signal) counted by the counter 143 and also has the function of outputting the held number of output times to the outside (outside the cryptogram decoder 20c/outside the tamper-resistant region 60) in response to an output command from the outside (outside the cryptogram decoder 20c/outside the tamper-resistant region 60). Further, the nonvolatile memory 144 is configured so that a desired number of output times (for example, N) is set from the outside (outside the cryptogram decoder 20c/outside the tamper-resistant region 60) and when the number of output times is set in the nonvolatile memory 144, the number of output times is further set to the counter 143 from the nonvolatile memory 144. In addition, the demodulation pseudo random number generator 21 is configured so as to generate the demodulation pseudo random number $r_i$ from the N-th number corresponding to the number of output times set to the counter 143 based on the encryption key (seed) held in the encryption key ROM 142. Here, as the demodulation pseudo random number generator 21, for example, the BBS generator can be used like the modulation pseudo random number generator 11 in the above-mentioned communication system 3.

Therefore, in the communication system 3, the demodulation pseudo random number generator 21 is capable of sequentially generating the demodulation pseudo random number $r_i$ each time a clock signal is input and in addition, of generating the N-th demodulation pseudo random number $r_i$ directly from the encryption key (seed) held in the encryption key ROM 142 only by setting the number of output times N to the counter 143 (the nonvolatile memory 144).

Further, in the communication system 3, the number of output times of the demodulation pseudo random number $r_i$ (the number of input times of the clock signal) from the demodulation pseudo random number generator 21 is counted by the counter 143 always and recorded in the nonvolatile memory 144, therefore, even if the power of the cryptogram decoder 20c is cut off, when the power is turned on the next time, the demodulation pseudo random number generator 21 will start the output of the pseudo random number from the pseudo random number subsequent to the last output number before the power was cut off.

Note that, the dummy inputting of a clock for the demodulation pseudo random number generator 21 or setting of the number of output times in the nonvolatile memory 144 is performed on request of a user at the time of initial setting etc. and in addition, it is performed by the synchronization adjustment section 153 (refer to FIG. 20) in order to adjust the synchronization between the encryptor 10c and the cryptogram decoder 20c (to eliminate the synchronization shift that has occurred in the pseudo random number generation operation between the pseudo random number generators 11 and 21), as described above.

In the cryptogram decoder 20c configured as described above, as an interface between the inside and the outside of the tamper-resistant region 60, those corresponding to the following items (41) to (48) are required.

(41) Input of cipher text (input $d_i$ to the demodulation section 22; when the channel-decoding section 23 is arranged n the tamper-resistant region, input $c_i$ to the channel-decoding section 23)

(42) Output of plain text (output $x_i$ from the demodulation section 22)

(43) Input of an output command of a device identification number (an output command to the identification number ROM 141)

(44) Output of a device identification number (output from the identification number ROM 141 in accordance with the output command of (43))

(45) Input of a clock signal (input to the counter 143/demodulation pseudo random number generator 21)

(46) Input of an output command of the number of output times of a pseudo random number (an output command to the nonvolatile memory 144)

(47) Output of the number of output times of a pseudo random number (output from the nonvolatile memory 144 in accordance with the output command of (46))

(48) Input of the setting of the number of output times of a pseudo random number (input to the nonvolatile memory 144).

At this time, as described above, the number of output times set in the nonvolatile memory 144 (the counter 143) by the input interface of the item (48) can be set always only in the direction of increment, however, it may also be possible to configure so as to omit the input interface of the item (48) and perform the setting of the number of output times by performing dummy inputting of a clock signal for the counter 143/demodulation pseudo random number generator 21.

According to the communication system 3 (the encryptor 10c and the cryptogram decoder 20c) thus configured, cipher communication to which the encryption technique in the present embodiment has been applied is realized between the communication device 3a and the communication device 3b and the same function and effect as those in the above-described embodiments can be obtained.

Further, for the communication system 3, it is possible to secure an extremely high encryption strength against a known plain-text attack by applying the encryption technique in the present embodiment, as described above, therefore, it is no longer necessary to perform re-distribution of the frequent encryption key using the public key encryption and it is possible to use the fixed encryption key by embedding it in the encryptor 10c and the cryptogram decoder 20c in the communication devices 3a and 3b, respectively. Furthermore, by embedding the encryption key in the encryptor 10c and the cryptogram decoder 20c in the communication devices 3a and 3b, respectively, it is possible to operate the communication system 3 until its life is reached in a state in which such high secrecy that the encryption key is secret even to the user is maintained.

Furthermore, in the communication system 3, the encryptor 10c and the cryptogram decoder 20c are arranged, respectively, in the tamper-resistant region 60 on the chip, therefore, the tamper-resistant properties are secured and the input/output between the tamper-resistant region 60 and the outside is limited to those shown in the above-mentioned items (21) to (28) and (41) to (48).

Due to this, it is absolutely impossible to read the pseudo random number $r_i$ generated by the pseudo random number generators 11 and 21 or the encryption key held in the ROMs 132 and 142 to the outside of the tamper-resistant region 60 through the interface in the above-mentioned items (21) to (28) and (41) to (48)

Further, by employing the tamper-resistant region 60 that provides the structure in the above-mentioned items (11) to (17) and the above-mentioned items (31) to (35), it is absolutely impossible to read the encryption key held in the ROMs 132 and 142, or to tap the signal line of the pseudo random number $r_i$, or to tap the signal line of the physical random number $f_i$ even by disassembling the chip and furthermore, even if physical disturbance (heat or voltage) is applied from the outside of the chip, the probability distribution of the physical random number $f_i$ from the physical random number generator 13 does not change any more.

Therefore, it is possible to prevent without fail an interceptor etc. from stealing the pseudo random number $r_i$, the encryption key, or the random number table to utilize them to decode cryptogram. Further, even if an interceptor etc. tries to make a chosen plain-text attack in a state in which the output of the physical random number generator 13 is biased by stealing the encryptor 10c itself and applying physical disturbance, the probability distribution of the physical random number $f_i$ from the physical random number generator 13 does not change (or the operation stops when physical disturbance is applied) therefore, even if a chosen plain-text attack is made, it becomes impossible to decode the output from the encryptor 10c because of the fluctuation of the physical random number $f_i$ (or because the output from the encryptor 10c cannot be obtained any more when the operation stops) and inverse calculation of the encryption key (seed) is not possible, therefore, it is possible to secure an extremely high encryption strength against a chosen plain-text attack also.

Furthermore, the pseudo random number generators 11 and 21 are configured so as to prohibit reset and repetition of generation operation of the pseudo random number $r_i$ and "the reset (rewinding) of the pseudo random number output is possible in no case", therefore, even if an interceptor etc. steals the encryptor 10c or the cryptogram decoder 20c, it is impossible to reset (rewind) the pseudo random number $r_i$ to repeatedly generate and output the same pseudo random number sequence for reuse. Therefore, it is unlikely that extra information that can be used to decode the encryption key (seed) is provided to an interceptor etc. and it is possible to secure an extremely high encryption strength against a chosen plain-text attack to the encryptor 10c and a chosen cipher-text attack to the cryptogram decoder 20c also by suppressing without fail the interceptor from decoding or inversely calculating the encryption key.

Incidentally, here, a chosen plain-text attack is an attack in which an interceptor etc. steals the encryptor 10c and inversely calculates an encryption key (seed) from cipher-text obtained by inputting plain-text consisting of "0" or "1" only to the encryptor 10c (black box test). A chosen cipher-text attack is an attack in which an interceptor etc. steals the cryptogram decoder 20c and inversely calculates an encryption key (seed) by conducting a black box test to the cryptogram decoder 20c.

If the reset and repetition of the generation operation of the pseudo random number $r_i$ by the pseudo random number generators 11 and 21 are allowed, the pseudo random number sequence can be predicted by, for example, a method described below by using the stolen encryptor 10c or cryptogram decoder 20c.

In the encryptor 10c, when the value of a pseudo random number output for the first time from the pseudo random number generator 11 after the reset of the pseudo random number generator 11 is predicted, processing that "plain text "0" is input to the encryptor 10c and after cipher-text output from the encryptor 10c is recorded, the pseudo random number generator 11 is reset" is repeated and a frequency distribution of the cipher-text output is acquired. The disturbance by a physical random number in the present embodiment is ±2, therefore, the center of fluctuation of ±2 can be predicted as a corresponding pseudo random number value (first random number value). By performing the similar operation, the value of n-th pseudo random number can be predicted. For example, in the encryptor 10 in the present embodiment explained with reference to FIG. 1 to FIG. 12, for the input of plain text "0", one of "0", "1", "3", and "4" is output as a cipher-text output, therefore, "2" can be predicted as the corresponding pseudo random number value (the first pseudo random number value).

Further, in the cryptogram decoder 20c, when the value of a pseudo random number output for the first time from the pseudo random number generator 21 after the reset of the pseudo random number generator 21 is predicted, if processing that "(1) cipher text "0" is input to the cryptogram decoder 20c and after plain-text output from the cryptogram decoder 20c is recorded, the pseudo random number generator 21 is reset, (2) cipher text "1" is input to the cryptogram decoder 20c and after plain-text output from the cryptogram decoder 20c is recorded, the pseudo random number generator 21 is reset, . . . (omitted) . . . , (9) cipher text "9" is input to the cryptogram decoder 20c and after plain text output from the cryptogram decoder 20c is recorded, the pseudo random number generator 21 is reset" is performed, it is possible to predict the value of the first pseudo random number based on a correspondence relationship between cipher-text input 0 to 9 and plain-text output 0 and 1. By performing the similar operation, it is possible to predict the value of the n-th pseudo random number.

For example, in the cryptogram decoder 20 in the present embodiment explained with reference to FIG. 1 to FIG. 12, the plain-text output for the cipher-text input "0" is "0", the plain-text output for the cipher-text input "1" is "0", the plain-text output for the cipher-text input "2" is "error", the plain-text output for the cipher-text input "3" is "0", the plain-text output for the cipher-text input "4" is "0", the plain-text output for the cipher-text input "5" is "1", the plain-text output for the cipher-text input "6" is "1", the plain-text output for the cipher-text input "7" is "error", the plain-text output for the cipher-text input "8" is "1", and the plain-text output for the cipher-text input "9" is "1". From such a correspondence relationship, "2" can be predicted as the corresponding pseudo random number value (the first pseudo random number value).

In contrast to this, in the communication system 3, as described above, the reset and repetition of the generation operation of the pseudo random number $r_i$ by the pseudo random number generators 11 and 21 in the encryptor 10c and the cryptogram decoder 20c are prohibited, therefore, it is absolutely impossible for an interceptor to reset the pseudo random number $r_i$ and generate and output the same pseudo random number sequence repeatedly to reuse even if the interceptor steals the encryptor 10c or the cryptogram decoder 20c.

On the other hand, in the communication system 3, when the need arises to synchronize the pseudo random number generation operation in the communication device 3a with the pseudo random number generation operation in the communication device 3b, for example, at the time of restoration after an abnormal stop caused by power failure etc., the transmission/reception section 152 in the communication device 3a and the transmission/reception section 152 in the communication device 3b perform open communication therebetween and the number of output times of the modulation pseudo random number $r_i$ and that of the demodulation pseudo random number $r_i$ (read from the nonvolatile memories 134 and 144, respectively) are exchanged as synchronization information.

Then, when performing synchronization processing of the pseudo random numbers $r_i$ in the communication devices 3a and 3b, the synchronization adjustment section 153 in each of the communication devices 3a and 3b increments the number of output times with less value of the number of output times by setting the number of output times for the nonvolatile memory 134 of the encryptor 10c or the nonvolatile memory 144 of the cryptogram decoder 20c, or by performing dummy inputting of a clock signal to the pseudo random number generator 11 or 12, and matches the number of output times of the pseudo random number generator 11 in the encryptor 10c with the number of output times of the pseudo random number generator 21 in the cryptogram decoder 20c, and synchronizes the pseudo random number generation operation of the pseudo random number generator 11 in the encryptor 10c with the pseudo random number generation operation of the pseudo random number generator 21 in the cryptogram decoder 20c.

[11] Second Example of the Communication System in the Present Embodiment

As shown in FIG. 20, the communication system 3A in the second example is also configured so as to include the two communication devices 3a and 3b communicably connected to each other via a communication network etc., as in the communication system 3 in the first example. As described above, in the communication system 3A in the second example, the case where the two communication devices 3a and 3b are communicably connected by a communication channel (a signal line) without tampering and the two communication devices 3a and 3b perform synchronization processing via the communication channel by open communication is explained.

Both the communication devices 3a and 3b in the communication system 3A have the same configuration and in the communication system 3A, the communication device 3a is configured so as to include an encryptor 10d for encrypting input data (plain text $x_i$) to be transmitted to the communication device 3b by the method described above, a cryptogram decoder 20d for decoding the encrypted data ($c_i$ or $s_i$) received from the communication device 3b by the method described above, and the transmission/reception section 152 and the synchronization adjustment section 153 described above, and the communication device 3b is configured so as to include the encryptor 10d for encrypting input data (plain text $x_i$) to be transmitted to the communication device 3a by the method described above, the cryptogram decoder 20d for decoding the encrypted data (cipher text $c_i$ or $s_i$) received from the communication device 3a by the method described above, and the transmission/reception section 152 and the synchronization adjustment section 153 described above. Here, the configuration of the encryptor 10d is to be described later with reference to FIG. 23 and the configuration of the cryptogram decoder 20d is to be described later with reference to FIG. 24.

However, as described later with reference to FIG. 23 and FIG. 24, the encryptor 10d in the communication system 3A is configured so as to transmit the encrypted data ($s_i$) obtained by the second modulation section 14 to the destination communication device 3a or 3b as a plurality of packets and the cryptogram decoder 20d in the communication system 3A is configured so as to demodulate the encrypted data ($s_i$) in each packet received from the encryptor 10d of the sender communication device 3a or 3b into input data (plain text $x_i$).

In particular, the communication system 3A (the encryptor 10d and the cryptogram decoder 20d) aims at communication using a communication channel in which the arrival order of packets may be changed or a packet may become extinct such as an IP (Internet Protocol) network and a system that needs to recognize whether or not the individual packets are transmitted from a legitimate transmitter (specifically, a communication system of IP telephone).

Further, also in the communication system 3A, the encryptor 10d in the communication device 3a and the cryptogram decoder 20d in the communication device 3b are paired and the pseudo random number generators 11 and 21 in the devices 10d and 20d (refer to FIG. 23 and FIG. 24) are configured so as to synchronize and generate the pseudo random number $r_i$ based on the same encryption key. Similarly, the encryptor 10d in the communication device 3b and the cryptogram decoder 20d in the communication device 3a are paired and the pseudo random number generators 11 and 21 in the devices 10d and 20d are also configured so as to synchronize and generate the pseudo random number $r_i$ based on the same encryption key. However, as the encryption key used in each pair of devices described above, different keys are set.

With such a configuration, the transmission data from the communication device 3a to the communication device 3b is encrypted by the above-described encryption procedure by the encryptor 10d and transmitted to the communication device 3b as the cipher text and on the communication device 3b side, the cipher text received from the communication device 3a is decoded into plain text by the above-described cryptogram decoding procedure by the cryptogram decoder 20d. Similarly, the transmission data from the communication device 3b to the communication device 3a is encrypted by the above-described encryption procedure by the encryptor 10d and transmitted to the communication device 3a as the cipher text and on the communication device 3a side, the cipher text received from the communication device 3b is decoded into plain text by the above-described cryptogram decoding procedure by the cryptogram decoder 20d. Incidentally, in the communication system 3A, the transmission/reception section 152 and the synchronization adjustment section 153 are the same as those explained in the communication system 3, therefore, their explanation is omitted.

Next, the configuration of the encryptor 10d will be explained with reference to FIG. 23. FIG. 23 is a block diagram showing the configuration of the encryptor 10d in the communication system 3A shown in FIG. 20 and the encryptor 10d shown in FIG. 23 is configured so as to include the modulation pseudo random number generator 11, the first modulation section 12, the physical random number generator 13, the second modulation section 14, the identification number ROM 131, the encryption key ROM 132, the counter 133, and the nonvolatile memory 134, as same as the above-described encryptor 10c, and in addition, an incorporation section 135 and a packet section 136.

In addition, the encryptor 10d in the present embodiment is also arranged in the tamper-resistant region 60 (what provides the structure like those of the above-mentioned items (11) to (17)) on a chip (not shown) as same as the encryptor 10c in the communication system 3. However, the packet section 136 may be arranged outside the tamper-resistant region 60. Incidentally, in FIG. 23, the same symbols as those already described denote the same or substantially the same portions, therefore, their explanation is omitted.

Figure 23:
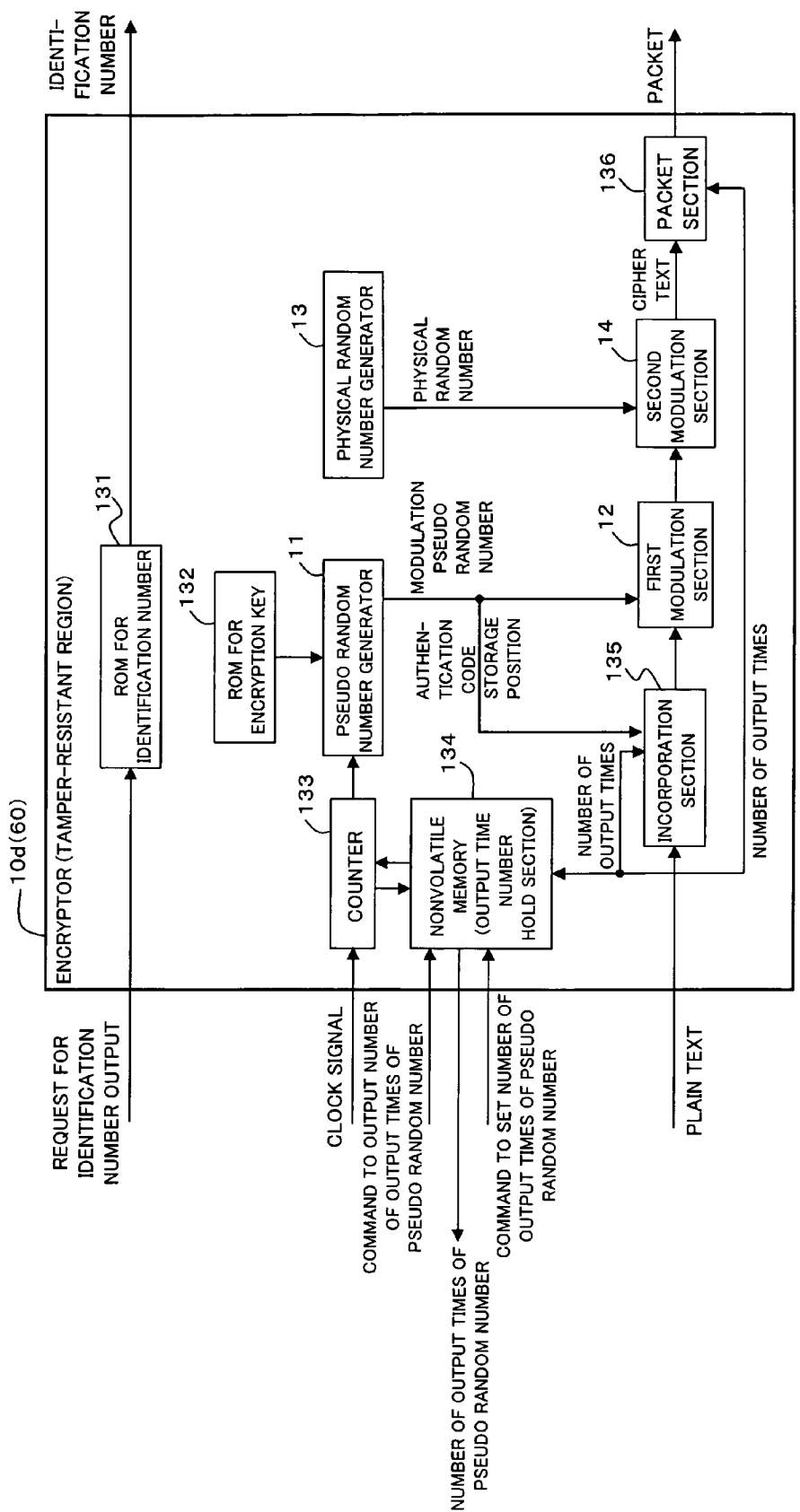
FIG. 23 is a block diagram showing a configuration of an encryptor in the second example of the communication system shown in FIG. 20.

Further, as with the encryptor 10c in the communication system 3, the encryptor 10d shown in FIG. 23 may be provided with the channel-coding section 15 (refer to FIG. 1), although not shown here, as with the encryptor 10 shown in FIG. 1, or may not be provided therewith. When the channel-coding section 15 is provided, the channel-coding section 15 may be arranged in the tamper-resistant region 60 or outside the tamper-resistant region 60.

The incorporation section 135 divides input data $x_i$ into packet units [data units of a certain amount to be stored in a container section of a packet as shown in FIG. 25 (B)] to be dealt with as a container section of a packet by the packet section 136, which will be described later, and obtains the number of output times (the value indicating what number pseudo random number) from the pseudo random number generator 11 of the modulation pseudo random number $r_i$ used when modulating the first data $x_i$ in the packet unit in the first modulation section 12 based on the current count value counted by the counter 133 (the nonvolatile memory 134) for each packet unit, and incorporates the obtained number of output times in the packet units (within input data of a certain amount) and at the same time, incorporates a predetermined pseudo random number sequence from the pseudo random number generator 11 in the packet units (within input data of a certain amount) as the authentication code inherent to the packet units. Due to this, the encrypted data in the container section of each packet to be transmitted from the encryptor 10d to the cryptogram decoder 20d is caused to include the number of output times and the authentication code.

At this time, the incorporation section 135 determines the storage position of the number of output times and the authentication code in the packet unit (incorporation/embedment position, that is, the storage position in the container section of each packet) based on the pseudo random number from the pseudo random number generator 11 and incorporates the number of output times and the authentication code so that the number of output times and the authentication code are arranged at the determined position as shown in FIG. 25(A). In other words, in the present embodiment, the incorporation position/embedment position of the number of output times and the authentication code are scrambled with a pseudo random number from the pseudo random number generator 11.

As shown in FIG. 25(B), a packet section 136 stores the packet unit divided in the incorporation section 135 and modulated in the modulation sections 12 and 14 in the container section and, by creating and attaching a header section not modulated or encrypted to the container section, creates a packet (performs packetization of the modulation result) and transmits it to the communication device 3a or 3b of the opposite party (destination) in communication. At this time, as shown in FIG. 25(B), the packet section 136 describes the same number of output times as is incorporated in each packet unit in the header section without modulation. The packet section 136 may describe the identification number of the encryption key used in the encryptor 10d (ID number; the device identification number held in the ROM 131) as is in the head section without modulation as needed.

Note that, FIG. 25(A) is a diagram showing an example of incorporation of the authentication code and the number of output times into input data (plain text) performed by the incorporation section 135 in the communication system 3A, and FIG. 25(B) is a diagram showing an example in which the input data (plain text) shown in FIG. 25 (A) is packetized by the packet section 136, which will be described later. Further, instead of the number of output times, a serial number indicating the transmission order of the packet may be incorporated in the packet unit. Furthermore, the encryptor 10d is also provided with one corresponding to those in the above-mentioned items (21) to (28) as an interface between the inside and the outside of the tamper-resistant region 60.

Next, the configuration of the cryptogram decoder 20d will be explained with reference to FIG. 24. FIG. 24 is a block diagram showing the configuration of the cryptogram decoder 20d in the communication system 3A shown in FIG. 20 and the cryptogram decoder 20d shown in FIG. 24 is configured so as to include the demodulation pseudo random number generator 21, the demodulation section 22, the identification number ROM 141, the encryption key ROM 142, the counter 143, and the nonvolatile memory 144, as with the cryptogram decoder 20c described above, and in addition, a FIFO memory 145, a permutation section 146, a take-out section 147, a comparison section (a first comparison section, a second comparison section) 148, a packet extinction judgment section 149, a packet discard section 150, and a number of output times adjustment section 154.

In addition, the cryptogram decoder 20d in the communication system 3A is also arranged in the tamper-resistant region 60 (that provides the structure corresponding to those in the above-mentioned items (31) to (35)) on a chip (not shown) as with the cryptogram decoder 20c in the communication system 3. Here, in FIG. 24, the same symbols as those already described denote the same or substantially the same portions, therefore, their explanation is omitted.

Figure 24:
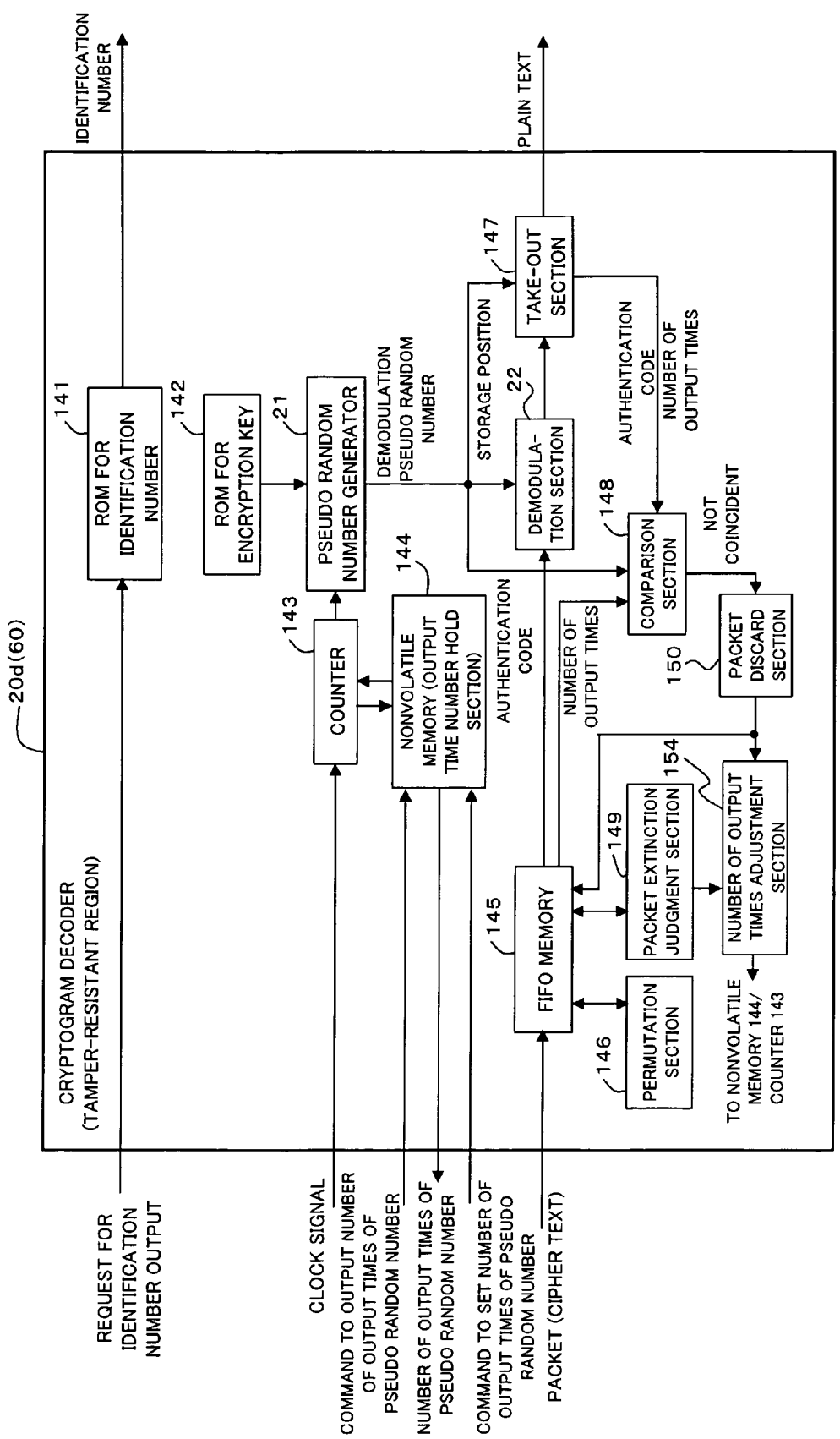
FIG. 24 is a block diagram showing a configuration of a cryptogram decoder in the second example of the communication system shown in FIG. 20.

Further, as with the cryptogram decoder 20c in the communication system 3, the cryptogram decoder 20d shown in FIG. 24 is provided with the channel-decoding section 23 (refer to FIG. 2), although not shown here, as with the cryptogram decoder 20 shown in FIG. 2, when the channel-coding section 15 is provided on the encryptor 10d side. When the channel-decoding section 23 is provided, the channel-decoding section 23 may be arranged in the tamper-resistant region 60 or outside the tamper-resistant region 60.

The FIFO (First In First Out) memory 145 is a sufficiently long reception memory and functions as a packet hold section for holding a plurality of packets received from the encryptor 10d of the communication device 3a or 3b of the opposite party in communication (the sender).

The permutation section 146 permutates the plurality of packets held in the FIFO memory 145 into a sequence in accordance with the number of output times (or the serial number) described in the header section of each packet in the FIFO memory 145 and inputs the encrypted data in the container section of the packet from the FIFO memory 145 into the demodulation section 22 in the sequence in accordance with the number of output times.

The take-out section 147 takes out the number of output times and the authentication code incorporated by the incorporation section 135 from the demodulation result by the demodulation section 22 based on the demodulation pseudo random number (the same as the modulation pseudo random number used at the time of incorporation by the incorporation section 135) generated by the demodulation pseudo random number generator 21 and outputs the demodulation result from which the number of output times and the authentication code have been taken out as a formal demodulation result to the outside of the cryptogram decoder 20d.

The comparison section (the first comparison section, the second comparison section) 148 compares the number of output times described in the header section of each packet and the number of output times taken out by the take-out section 147 from the demodulation result by the demodulation section 22 and at the same time, compares the authentication code taken out by the take-out section 147 from the demodulation result by the demodulation section 22 and the demodulation pseudo random number sequence corresponding to the authentication code generated by the demodulation pseudo random number generator 21.

The packet extinction judgment section 149 judges, when, after receiving one of the plurality of packets from the encryptor 10d, the packet to be received next in accordance with the number of output times (or the serial number) described in the header section of the packet is not received within a predetermined time, that the packet has become extinct.

The packet discard section 150 discards the packet when the result of comparison by the comparison section 148 is that the numbers of output times (or the serial numbers) do not coincide or the authentication codes do not coincide.

The number of output times adjustment section 154 adjusts so as to match, when the packet discard section 150 has discarded the packet or when the packet extinction judgment section 149 has judged that the packet has become extinct, the number of output times of the demodulation pseudo random number $r_i$ output from the demodulation pseudo random number generator 21 with the demodulation section 22 to the number of output times (the number of output times of the modulation pseudo random number $r_i$ used when modulating the first data $x_i$ in the packet unit included in the container section of the packet) of the packet normally received after the discarded packet or the packet judged to have become extinct. On this occasion, the number of output times adjustment section 154 is designed so as to perform adjustment of the number of output times from the pseudo random number generator 21 by performing the setting of the number of output times for the nonvolatile memory 144 of the cryptogram decoder 20d or performing dummy inputting of a clock signal for the pseudo random number generator 21, as with the synchronization adjustment section 153 in the communication system 3.

Note that, the cryptogram decoder 20d is also provided with one corresponding to those in the above-mentioned items (41) to (48) as an interface between the inside and the outside of the tamper-resistant region 60.

In addition, in the communication system 3A, the FIFO memory 145, the permutation section 146, the packet extinction judgment section 149, the packet discard section 150, and the number of output times adjustment section 154 are arranged within the tamper-resistant region 60, however, each of these components does not utilize the pseudo random number directly, therefore, they can be arranged outside the tamper-resistant region 60.

According to the communication system 3A (the encryptor 10d and the cryptogram decoder 20d) thus configured, cipher communication to which the encryption technique in the present embodiment is applied is realized between the communication device 3a and the communication device 3b, therefore, the same function and effect as those in the embodiments described above can be obtained and in addition, the same function and effect as those of the communication system 3 (the encryptor 10c and the cryptogram decoder 20c) in the first example described above can also be obtained.

Further, also in each of the communication devices 3a and 3b of the communication system 3A, the encryptor 10d and the cryptogram decoder 20d are respectively arranged within the tamper-resistant region 60, therefore, it is not possible to tap not only the signal line between the pseudo random number generators 11 and 21 and the modulation section 12 or the demodulation section 22 but also the signal line between the pseudo random number generators 11 and 21 and each component and even if the chip is disassembled, as with the case of the communication system 3, it is absolutely impossible to read the encryption key held in the ROMs 132 and 142, to tap the signal line of the pseudo random number $r_i$, or to tap the signal line of the physical random number $f_i$ and further, even if physical disturbance is applied from the outside of the chip, the probability distribution of the physical random number $f_i$ from the physical random number generator 12 does not change any more. Consequently, also in the communication system 3A in the second example, the same function and effect as those in the communication system 3 in the first example can be obtained.

By the way, when packet communication is performed between the communication devices 3a and 3b, if the sequence of the packets is permutated, there exists no longer correspondence between the modulation pseudo random number and the demodulation pseudo random number and it is not possible for the cryptogram decoder 20d to correctly decode the cipher text (the encrypted data) in the packets, the sequence of which has been permutated, and garbled letters etc. may occur.

Therefore, in the communication system 3A, in order for the cryptogram decoder 20d side to recognize whether or not the sequence of the packet arrival is permutated, the raw number of output times (or serial number) not modulated or encrypted is described in the header section of the packet.

Due to this, even if the sequence of a plurality of packets is permutated during transmission and the sequence when received by the communication device 3a or 3b is different from that when transmitted, it is possible for the permutation section 146 to permutate the received packets into the correct sequence after packet reception by referring to the number of output times (serial number) described in the header section of each packet in the FIFO memory 145 and permutating the packet holding sequence in the FIFO memory 145. In other words, it is possible to permutate the packets in the correct sequence by referring to the number of output times (serial number) described in the header section of each packet, before sending them to the demodulation section 22. Consequently, in the communication system 3A, even when packet communication is performed between the communication devices 3a and 3b and if the sequence of the packets is permutated during transmission, it is possible for the reception side to permutate the packets into the correct sequence, therefore, it is made possible to correctly decode the cipher text (encrypted data) while maintaining the correspondence relationship between the modulation pseudo random number and the demodulation pseudo random number always.

In addition, in the communication system 3A, the number of output times (or serial number) of pseudo random number $r_i$ is embedded also in the encrypted data (cipher text) held in the container section of each packet, and on the cryptogram decoder 20d side, the comparison section 148 compares the number of output times taken out from the container section by the take-out section 147 with the number of output times described in the header section, and if the numbers of output times do not coincide, it means that some bits have been reversed due to the tampering of the packet or noises in the communication channel, therefore, the packet discard section 150 discards the packet.

Further, in the communication system 3A, the authentication code (the pseudo random number sequence generated by the modulation pseudo random number generator 11) is embedded within an encrypted packet (cipher text in the container section) in order for the cryptogram decoder 20d side to recognize whether or not the packet is transmitted from a legitimate transmitter, and on the cryptogram decoder 20d side, the comparison section 148 compares the authentication code taken out from the container section by the taken-out section 147 with the demodulation pseudo random number sequence corresponding to the authentication code generated by the demodulation pseudo random number generator 21, and if the authentication codes do not coincide, it also means that some bits have been reversed due to the tampering of the packet or noises in the communication channel, therefore, the packet discard section 150 discards the packet. Incidentally, after the packet is discarded, even if a packet arrives from a legitimate transmitter whose authentication code coincides therewith, the packet is discarded by the packet discard section 150.

Furthermore, in the communication system 3A, the packet extinction judgment section 149 monitors the header section (number of output times/serial number) of the packet held in the FIFO memory 145 and if a packet to be received is not received within a predetermined time, the packet is judged to have become extinct.

Then, as described above, when the packet discard section 150 has discarded the packet or when the packet extinction judgment section 149 has judged that the packet has become extinct, the number of output times adjustment section 154 adjusts the number of output times of the demodulation pseudo random number $r_i$ output from the demodulation pseudo random number generator 21 to the demodulation section 22 to the number of output times of the packet normally received after the discarded packet or the packet judged to have become extinct, by performing the setting of the number of output times for the nonvolatile memory 144 of the cryptogram decoder 20d or performing dummy inputting of a clock signal for the pseudo random number generator 21. Due to this, even if a packet is discarded or extinction of a packet occurs, it is made possible to correctly decode the cipher text (encrypted data) while maintaining the correspondence relationship between the modulation pseudo random number and demodulation pseudo random number always.

In the communication system 3A, the number of output times of pseudo random number, the authentication code, and a message (input data) are stored in the container section of each packet and if the storage position is fixed, an interceptor may be able to predict the storage position, create a forged packet the message of which is exchanged by duplicating the part of the number of output times of pseudo random number and the authentication code, and pretend to be legitimate. In order to prevent this, in the communication system 3A, the incorporation section 135 scrambles the positions of embedment when embedding the number of output times and the authentication code using the pseudo random number from the pseudo random number generator 11 as shown in FIG. 25 (A) and FIG. 25(B). Due to this, it is made impossible for an interceptor etc. to pretend to be legitimate.

Note that, in the communication system 3A, the number of output times and the authentication code are scrambled with pseudo random numbers and embedded in input data before being modulated by the modulation section 12 and the number of output times and the authentication code themselves are also modulated by the incorporation section 135, however, it may also be possible to scramble the number of output times and the authentication code not modulated by the modulation sections 12 and 14 with pseudo random numbers and embed them in cipher text (packet unit) after modulated by the modulation sections 12 and 14. In this case, in the encryptor 10d, the incorporation section 135 is provided between the modulation section 14 and the packet section 136 and packetizes the cipher text in which the number of output times and the authentication code are embedded, while in the cryptogram decoder 20d, the take-out section 147 is provided between the FIFO memory 145 and the demodulation section 22 and inputs the cipher text within the packet from which the number of output times and the authentication code have been taken out to the demodulation section 22. With such a configuration, it is also possible to obtain the same function and effect as those in the above-described embodiments.

[12] Third Example of the Communication System in the Present Embodiment

Figure 26:
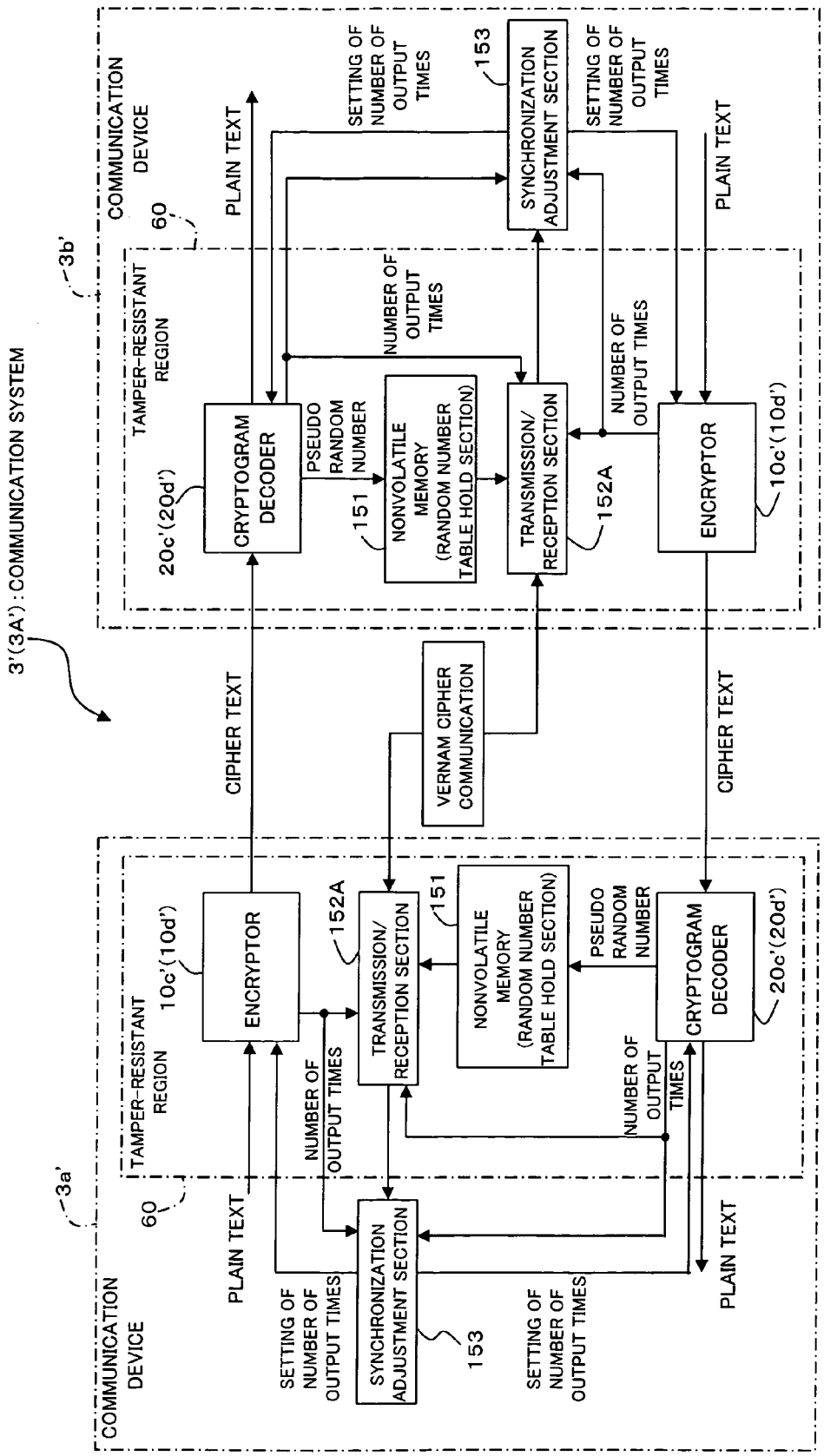
FIG. 26 is a block diagram showing the entire configuration of a third example and a fourth example of a communication system to which the encryption/cryptogram decoding technique of the present invention is applied.

FIG. 26 is a block diagram showing the entire configuration of the third example (refer to symbol 3') and the fourth example (refer to symbol 3A') of the communication systems to which the encryption/cryptogram decoding technique of the present invention is applied and a communication system 3' in the third example shown in FIG. 26 is configured so as to include two communication devices 3a' and 3b' communicably connected to each other via a communication network etc. For the communication system 3' in the third example and a communication system 3A' in the fourth example to be described later, the case will be explained where the two communication devices 3a' and 3b' are communicably connected to each other via a communication channel (signal line) in which tampering may occur and the two communication devices 3a' and 3b' perform synchronization processing by Vernam cipher communication to be described later.

The communication devices 3a' and 3b' have the same configuration and the communication device 3a' is configured so as to include an encryptor 10c' for encrypting input data (plain text $x_i$) to be transmitted to the communication device 3b' by the method described above and a cryptogram decoder 20c' for decoding encrypted data ($c_i$, or $s_i$) received from the communication device 3b' by the method described above, and a nonvolatile memory 151, a transmission/reception section 152A, and the synchronization adjustment section 153 to be described later, and the communication device 3b' is configured so as to include the encryptor 10c' for encrypting input data (plain text $x_i$) to be transmitted to the communication device 3a' by the method described above and the cryptogram decoder 20c' for decoding encrypted data (cipher text $c_i$, or $s_i$) received from the communication device 3a' by the method described above, and the nonvolatile memory 151, the transmission/reception section 152A, and the synchronization adjustment section 153 to be described later. The configuration of the encryptor 10c' will be described later with reference to FIG. 27 and the configuration of the cryptogram decoder 20c' will be described later with reference to FIG. 28.

Further, in the communication system 3' shown in FIG. 26, the encryptor 10c' in the communication device 3a' and the cryptogram decoder 20c' in the communication device 3b' are paired and the pseudo random number generators 11 and 21 in the devices 10c' and 20c' (refer to FIG. 27 and FIG. 28) are configured so as to synchronize and generate the pseudo random number $r_i$ based on the same encryption key. Similarly, the encryptor 10c' in the communication device 3b' and the cryptogram decoder $20c'$ in the communication device $3a'$ are paired and the pseudo random number generators 11 and 21 in the devices $10c'$ and $20c'$ are also configured so as to synchronize and generate the pseudo random number $r_i$ based on the same encryption key. However, as the encryption key used in each pair of devices described above, different keys are set.

With such a configuration, the transmission data from the communication device $3a'$ to the communication device $3b'$ is encrypted by the above-described encryption procedure by the encryptor $10c'$ and transmitted to the communication device $3b'$ as cipher text, and on the communication device $3b'$ side, the cipher text received from the communication device $3a'$ is decoded into plain text by the above-described cryptogram decoding procedure by the cryptogram decoder $20c'$. Similarly, the transmission data from the communication device $3b'$ to the communication device $3a'$ is encrypted by the above-described encryption procedure by the encryptor $10c'$ and transmitted to the communication device $3a'$ as cipher text, and on the communication device $3a'$ side, the cipher text received from the communication device $3b$ is decoded into plain text by the above-described cryptogram decoding procedure by the cryptogram decoder $20c'$.

Here, the nonvolatile memory 151, the transmission/reception section 152A, and the synchronization adjustment section 153 are used when synchronization shift occurs for some reason in the pseudo random number generation operation of the pseudo random number generators 11 and 21 and cipher communication between the encryptor $10c'$ and the cryptogram decoder $20c'$ becomes no longer possible.

The nonvolatile memory (the second hold section) 151 holds a random number table used for encryption/cryptogram decoding by the transmission/reception section 152A, which will be described later. In the nonvolatile memories 151 and 151 of the communication devices $3a'$ and $3b'$, during the period of normal cipher communication between the encryptor $10c'$ and the cryptogram decoder $20c'$, the same random number table is accumulated and held by exchanging random number sequences in the above-mentioned random number table by cipher communication during periods of exchange of encrypted data.

The transmission/reception section (cryptogram transmission section/decoding and reception section) 152A encrypts the number of output times of the modulation pseudo random number or demodulation pseudo random number read from the nonvolatile memory 134 (refer to FIG. 27) or the nonvolatile memory 144 (refer to FIG. 28) based on the random number table held in the nonvolatile memory 151 and transmits it to the communication device $3a'$ or $3b'$, which is the opposite party in communication, as encrypted synchronization information and at the same time, decodes the encrypted synchronization information received from the communication device $3a'$ or $3b'$, which is the other party of communication, into the number of output times of the modulation pseudo random number or the demodulation pseudo random number based on the random number table held in the nonvolatile memory 151. As an encryption scheme by the transmission/reception section 152A, for example, the Vernam cipher is employed. The Vernam cipher is a cipher scheme that calculates an exclusive OR (XOR) of plain text (here, the number of output times) and the encryption key as cipher text using a random number with a length longer than that of the plain text as the encryption key.

When synchronization shift occurs for some reason in the pseudo random number generation operation of the pseudo random number generators 11 and 21 and cipher communication between the encryptor $10c'$ and the cryptogram decoder $20c'$ becomes no longer possible, the transmission/reception sections 152A and 152A provided in the communication devices $3a'$ and $3b'$, respectively, are used and the encryption/cryptogram decoding operation is performed in synchronization in accordance with the same random number table held in the nonvolatile memories 151 and 151, respectively, and thus the above-mentioned number of output times is exchanged as encrypted synchronization information via a communication network etc. (a signal line in which not only interception but also tampering may occur) between the communication devices $3a'$ and $3b'$ (between the transmission/reception sections 152A and 152A).

The synchronization adjustment section 153 is the same as that explained in the communication systems 3 and 3A, therefore, its details are not explained here. When the above-mentioned synchronization shift occurs, the synchronization adjustment section 153 in the communication system 3' also adjusts the number of output times of the pseudo random number from the pseudo random number generators 11 and 21 based on the number of output times read from the nonvolatile memory 134 or 144 in order to synchronize the pseudo random number generation operation by the modulation pseudo random number generator 11 (refer to FIG. 27) of the communication device $3a'$ with the pseudo random number generation operation by the demodulation pseudo random number generator 21 (refer to FIG. 28) of the communication device $3b'$, or to synchronize the pseudo random number generation operation by the modulation pseudo random number generator 11 (refer to FIG. 27) of the communication device $3b'$ with the pseudo random number generation operation by the demodulation pseudo random number generator 21 (refer to FIG. 28) of the communication device $3a'$.

Figure 27:
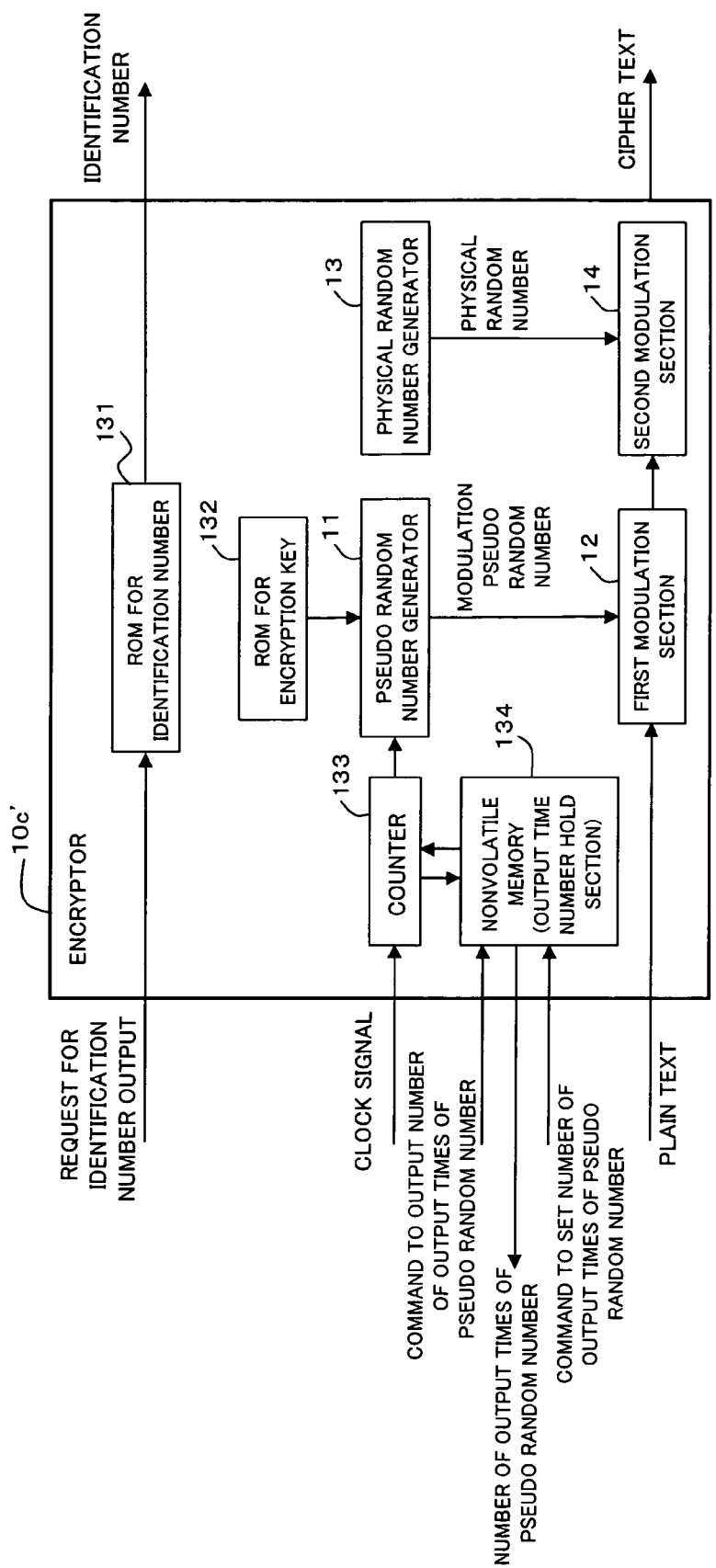
FIG. 27 is a block diagram showing a configuration of an encryptor in the third example of the communication system shown in FIG. 26.

In addition, in the communication devices $3a'$ and $3b'$ in the communication system 3', the encryptor $10c'$, the cryptogram decoder $20c'$, the nonvolatile memory 151, and the transmission/reception section 152A described above suppress the leakage of the encryption key for generating a pseudo random number and the pseudo random number $r_i$ from the pseudo random number generators 11 and 21 and at the same time, are arranged in the tamper-resistant region 60 for suppressing the probability distribution variations caused by physical disturbance of the physical random number $f_i$ generated by the physical random number generator 13 (refer to FIG. 27). Specifically, the tamper-resistant region 60 in the communication system 3' provides the structure corresponding to those in the following items (51) to (59). Incidentally, each of the communication devices $3a'$ and $3b'$ shown in FIG. 26 is configured, for example, on one chip and the tamper-resistant region 60 is provided on the chip.

(51) A structure with which the encryption key (that is, the "seed" of the pseudo random number $r_i$) of the encryption key ROMs 132 and 142 (refer to FIG. 27 and FIG. 28) cannot be read even if the chip is disassembled. For example, a wiring structure with which, if the chip is disassembled in an attempt to read the encryption key in the ROMs 132 and 142, the ROMs 132 and 142 break.

Figure 28:
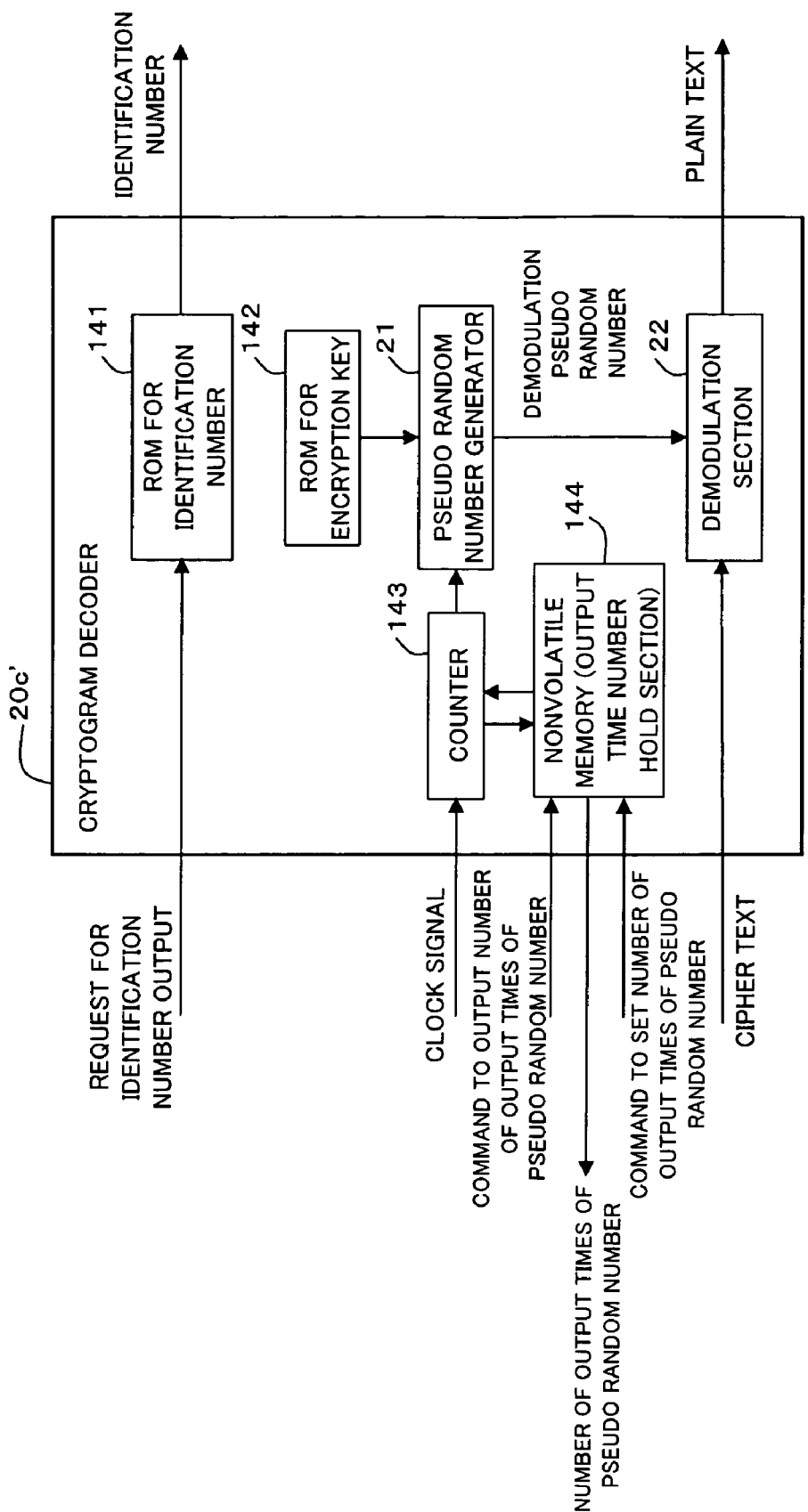
FIG. 28 is a block diagram showing a configuration of a cryptogram decoder in the third example of the communication system shown in FIG. 26.

(52) A structure with which the signal line of the pseudo random number $r_i$ (the signal line between the pseudo random number generator 11 and the first modulation section 12 or the signal line between the pseudo random number generator 21 and the demodulation section 22; refer to FIG. 27 and FIG. 28) cannot be tapped even if the chip is disassembled. For example, a wiring structure with which, if the chip is broken in an attempt to tap the signal line of the pseudo random number $r_i$, the chip does not work any longer.

(53) A structure that does not change probability distribution variations in physical random number $f_i$ from the physical random number generator 13 even if physical disturbance is applied from the outside of the chip. For example, a structure of a physical random number generator with which the probability distribution of physical random number $f_i$ does not change even if the entire chip is cooled or an abnormal input voltage is applied. Or, a mechanism for stopping the operation of the chip before the distribution of physical random number $f_i$ is biased by detecting temperatures or input voltages.

(54) A structure with which the random number table of the nonvolatile memory 151 cannot be read even if the chip is disassembled. For example, a wiring structure with which, if the chip is disassembled in an attempt to read the random number table in the nonvolatile memory 151, the nonvolatile memory 151 breaks.

(55) A structure with which the signal line between the nonvolatile memory 151 and the transmission/reception section 152A cannot be tapped even if the chip is disassembled. For example, a wiring structure with which, if the chip is disassembled in an attempt to read the random number table in the nonvolatile memory 151, the nonvolatile memory 151 breaks.

(56) A structure from which the identification number of the identification number ROMs 131 and 141 (refer to FIG. 27 and FIG. 28) can be read but cannot be tampered.

(57) A structure with which the signal line of the physical random number $f_i$ (the signal line between the physical random number generator 13 and the second modulation section 14; refer to FIG. 27) cannot be tapped even if the chip is disassembled. For example, a wiring structure with which, if the chip is broken in an attempt to tap the signal line of the physical random number $f_i$, the chip does not work any longer

(58) A structure with which information (for example, the number of output times counted by the counters 133 and 143 (refer to FIG. 27 and FIG. 28), as will be described later) held in the nonvolatile memories 134 and 144 (refer to FIG. 27 and FIG. 28) cannot be tampered.

(59) A structure that prevents the pseudo random number generators 11 and 21 from being accessed directly by avoiding the counters 133 and 143 and the pseudo random number generators 11 and 21 from generating the pseudo random number $r_i$ with an arbitrary number of order. For example, a structure with which the signal line (refer to FIG. 27) between the counter 133 and the pseudo random number generator 11 or the signal line (refer to FIG. 28) between the counter 143 and the pseudo random number generator 21 cannot be tapped even if the chip is disassembled, and a wiring structure with which, if the chip is broken in an attempt to tap the signal line, the chip does not work any longer.

Next, the configuration of the encryptor 10c' will be explained with reference to FIG. 27. FIG. 27 is a block diagram showing the configuration of the encryptor 10c' in the communication system 3' shown in FIG. 26 and in FIG. 27, the same symbols as the symbols already described denote the same or substantially the same portions. As shown in FIG. 27, the encryptor 10c' has the same configuration as that of the encryptor 10c except in that the encryptor 10c shown in FIG. 21 is arranged alone in the tamper-resistant region 60, therefore, its explanation is omitted. The encryptor 10c' is arranged in the tamper-resistant region 60 along with the cryptogram decoder 20c', the nonvolatile memory 151, and the transmission/reception section 152A in the communication devices 3a' and 3b' as explained above with reference to FIG. 26.

Note that, although the channel-coding section 15 (refer to FIG. 1) is not shown schematically also in the encryptor 10c' shown in FIG. 27, the channel-coding section 15 may be provided, as with the encryptor 10 shown in FIG. 1, or may not be provided. When the channel-coding section 15 is provided, the channel-coding section 15 may be arranged in the tamper-resistant region 60 or outside the tamper-resistant region 60. Further, the encryptor 10c' also requires one corresponding to those in the above-mentioned items (21) to (28) as an interface between the inside and the outside of the tamper-resistant region 60.

Next, the configuration of the cryptogram decoder 20c' will be explained with reference to FIG. 28. FIG. 28 is a block diagram showing the configuration of the cryptogram decoder 20c' in the communication system 3' shown in FIG. 26 and in FIG. 28, the same symbols as the symbols already described denote the same or substantially the same portions. As shown in FIG. 28, the cryptogram decoder 20c' has the same configuration as the cryptogram decoder 20c except in that the cryptogram decoder 20c is arranged alone in the tamper-resistant region 60, therefore, its explanation is omitted. The cryptogram decoder 20c' is arranged in the tamper-resistant region 60 along with the encryptor 10c', the nonvolatile memory 151, and the transmission/reception section 152A in the communication devices 3a' and 3b' as explained above with reference to FIG. 26.

Note that, although the channel-decoding section 23 (refer to FIG. 2) is not shown schematically also in the cryptogram decoder 20c' shown in FIG. 28, the channel-decoding section 23 is provided when the channel-coding section 15 is provided on the encryptor 10c' side as with the cryptogram decoder 20 shown in FIG. 2. When the channel decoding section 23 is provided, the channel decoding section 23 may be arranged in the tamper-resistant region 60 or outside the tamper-resistant region 60. Further, the cryptogram decoder 20c' also requires one corresponding to those in the above-mentioned items (41) to (48) as an interface between the inside and the outside of the tamper-resistant region 60.

According to the communication system 3' (the encryptor 10c' and the cryptogram decoder 20c') thus configured, cipher communication to which the encryption technique in the present embodiment is applied is realized between the communication device 3a' and the communication device 3b' and the same function and effect as those in the embodiments described above can be obtained and in addition, the same function and effect as those of the communication system 3 (the encryptor 10c and the cryptogram decoder 20c) in the first example can also be obtained.

In addition, in each of the communication devices 3a' and 3b' in the communication system 3', the whole of the encryptor 10c', the cryptogram decoder 20c', the nonvolatile memory 151, and the transmission/reception section 152A integrated into one is arranged in one of the tamper-resistant regions 60 that provide the structure in the above-mentioned items (51) to (59) on the chip and thus the tamper-resistant properties are secured and input/output between the tamper-resistant region 60 and its outside is limited to those shown in the above-mentioned items (21) to (28) and (41) to (48).

Due to this, it is absolutely impossible to read the pseudo random number $r_i$ generated by the pseudo random number generators 11 and 21, the encryption key held in the ROMs 132 and 142, or the random number table held in the nonvolatile memory 151 to the outside of the tamper-resistant region 60 through the interface in the above-mentioned items (21) to (28) and (41) to (48). Further, by adopting the tamper-resistant region 60 that provides the structure in the above-mentioned items (51) to (59), it is absolutely impossible to read the encryption key held in the ROMs 132 and 142, to tap the signal line of the pseudo random number $r_i$, to tap the signal line of the physical random number $f_i$, to read the random number table held in the nonvolatile memory 151, or to tap the signal line of the random number sequence of the random number table even by disassembling the chip and furthermore, even if physical disturbance (heat or voltage) is applied from the outside of the chip, the probability distribution of the physical random number $f_i$ from the physical random number generator 13 does not change any more. Therefore, also in the communication system 3' in the third example, the same function and effect as those in the communication system 3 in the first example can be obtained.

On the other hand, in the communication system 3', the communication devices 3a' and 3b' in cipher communication with each other come to share the same random number table during the period of cipher communication and accumulate the common random number table in the nonvolatile memory 151 of each of the communication devices 3a' and 3b'. Then, when the need arises to synchronize the pseudo random number generation operation in the communication device 3a' with the pseudo random number generation operation in the communication device 3b', for example, at the time of restoration after an abnormal stop caused by power failure etc., the transmission/reception section 152A in the communication device 3a' and the transmission/reception section 152A in the communication device 3b' perform cipher communication therebetween by the Vernam cipher using the random number table held in the nonvolatile memory 151 and the number of output times of the modulation pseudo random number $r_i$ and that of the demodulation pseudo random number $r_i$ (read from the nonvolatile memories 134 and 144, respectively) are exchanged as synchronization information.

In addition, when performing synchronization processing of the pseudo random number $r_i$ in the communication devices 3a' and 3b', the synchronization adjustment section 153 in each of the communication devices 3a' and 3b' increments the number of output times with less value of the number of output times by setting the number of output times for the nonvolatile memory 134 of the encryptor 10c' or the nonvolatile memory 144 of the cryptogram decoder 20c', or by performing dummy inputting of a clock signal for the pseudo random number generator 11 or 21, and matches the number of output times of the pseudo random number generator 11 in the encryptor 10c' with the number of output times of the pseudo random number generator 21 in the cryptogram decoder 20c', and thus synchronizes the pseudo random number generation operation of the pseudo random number generator 11 in the encryptor 10c' with the pseudo random number generation operation of the pseudo random number generator 21 in the cryptogram decoder 20c'.

Note that, when the synchronization adjustment section 153 performs dummy inputting of a clock signal for the pseudo random number generator 11 or 21, if the seed (encryption key) of the pseudo random number $r_i$ is assumed to be 100 bits, the information of the number of output times also includes 100 bits, however, it is unlikely that the number of output times reaches the order of $2^{100}$ times. In other words, it can be predicted that the synchronization information (number of output times) is biased to lower digits of 100 bits. It is preferable to eliminate such a biased state in order not to give extra information to an interceptor etc. Therefore, when outputting the synchronization information (number of output times) as 100-bit information, it is more preferable to perform permutation of the positions of the bit slot in which the number of output times is stored based on the random number table (nonvolatile memory 51) shared by the communication devices 3a' and 3b'.

By the way, while the communication devices 3a' and 3b' are communicably connected to each other via a communication channel (signal line) in which not only interception but also tampering may occur, when synchronization of the pseudo random number $r_i$ is performed by the procedure that "the encryptor 10c' and the cryptogram decoder 20c' make public to each other the number of output times of the pseudo random number $r_i$ of its own device and the side with less value of the number of output times matches itself to the side with greater value of the number of output times" as described above and if the number of output times (synchronization information) is transmitted and received through the above-mentioned signal line without encrypting it, there is the possibility that the number of output times is tampered into a huge number (for example, $2^{100}$ etc.) by the tampering by an interceptor etc.

If such tampering is made, the dummy inputting of a clock signal for synchronization adjustment continues endlessly in the encryptor 10c' or the cryptogram decoder 20c' and there is the possibility that the encryptor 10c' or the cryptogram decoder 20c' can be used no longer. To cope with such vulnerability, in the communication system 3', the number of output times (synchronization information) is transmitted and received after encrypted into Vernam cipher by the transmission/reception section 152A, therefore, it is no more tampered by an interceptor etc. and the above-described vulnerability to tampering can be eliminated.

[13] Fourth Example of the Communication System in the Present Embodiment

The communication system 3A' in the fourth example is also configured so as to include the two communication devices 3a' and 3b' communicably connected to each other via a communication network etc., as with the communication system 3' in the third example described above, as shown in FIG. 26. For the communication system 3A' in the fourth example, as described above, the case is explained where the two communication devices 3a' and 3b' are communicably connected to each other via a communication channel (signal line) in which tampering may occur and the two communication devices 3a' and 3b' perform synchronization processing by Vernam cipher communication to be described later.

The communication devices 3a' and 3b' in the communication system 3A' have the same configuration and in the communication system 3A', the communication device 3a' is configured so as to include an encryptor $10d'$ for encrypting input data (plain text $x_i$) to be transmitted to the communication device 3b' by the method described above and a cryptogram decoder $20d'$ for decoding encrypted data ($c_i$ or $s_i$) received from the communication device 3b' by the procedure described above, and the nonvolatile memory 151, the transmission/reception section 152A, and the synchronization adjustment section 153 described above in the communication system 3', and the communication device 3b' is configured so as to include the encryptor $10d'$ for encrypting input data (plain text $x_i$) to be transmitted to the communication device 3a' by the method described above and the cryptogram decoder $20d'$ for decoding encrypted data (cipher text $c_i$ or $s_i$) received from the communication device 3a' by the method described above, and the nonvolatile memory 151, the transmission/reception section 152A, and the synchronization adjustment section 153 described above in the communication system 3'. By the way, the configuration of the encryptor $10d'$ will be described later with reference to FIG. 29 and the configuration of the cryptogram decoder $20d'$ will be described later with reference to FIG. 30.

However, as with the communication system 3A in the second example, the encryptor $10d'$ in the communication system 3A' is configured so as to transmit the encrypted data ($s_i$) obtained by the second modulation section 14 to the destination communication device 3a' or 3b' as a plurality of packets and the encryptor 10d' in the communication system 3A' is configured so as to decode the encrypted data ($s_i$) in each packet received from the encryptor 10d' of the sender communication device 3a' or 3b' into input data (plain text $x_i$). In other words, the communication system 3A' (the encryptor 10d' and the cryptogram decoder 20d') also aims at communication using a communication channel in which the arrival order of packets may be permutated or a packet may become extinct and a system that needs to recognize whether or not the individual packets are transmitted from a legitimate transmitter (specifically, a communication system of IP telephone), as with the communication system 3A in the second example.

Further, also in the communication system 3A' the encryptor 10d' in the communication device 3a' and the cryptogram decoder 20d' in the communication device 3b' are paired and the pseudo random number generators 11 and 21 in the devices 10d' and 20d' are configured so as to synchronize and generate the pseudo random number $r_i$ based on the same encryption key. Similarly, the encryptor 10d' in the communication device 3b' and the cryptogram decoder 20d' in the communication device 3a' are paired and the pseudo random number generators 11 and 21 in the devices 10d' and 20d' are also configured so as to synchronize and generate the pseudo random number $r_i$ based on the same encryption key. However, as the encryption key used in each pair of devices described above, different keys are set.

With such a configuration, the transmission data from the communication device 3a' to the communication device 3b' is encrypted by the above-described encryption procedure by the encryptor 10d' and transmitted to the communication device 3b' as the cipher text and on the communication device 3b' side, the cipher text received from the communication device 3a' is decoded into plain text by the above-described cryptogram decoding procedure by the cryptogram decoder 20d'. Similarly, the transmission data from the communication device 3b' to the communication device 3a' is encrypted by the above-described encryption procedure by the encryptor 10d' and transmitted to the communication device 3a' as the cipher text and on the communication device 3a' side, the cipher text received from the communication device 3b' is decoded into plain text by the above-described cryptogram decoding procedure by the cryptogram decoder 20d'.

Note that, in the communication system 3A', the nonvolatile memory 151, the transmission/reception section 152A, and the synchronization adjustment section 153 are the same as those explained in the communication system 3' in the third example, therefore, their explanation is omitted. Further, also in the communication devices 3a' and 3b' in the communication system 3A', the encryptor 10d', the cryptogram decoder 20d', the nonvolatile memory 151, and the transmission/reception section 152A described above are arranged in the tamper-resistant region 60 (that provides the structure corresponding to those in the above-mentioned items (51) to (59)) on a chip, as with the communication system 3'.

Figure 29:
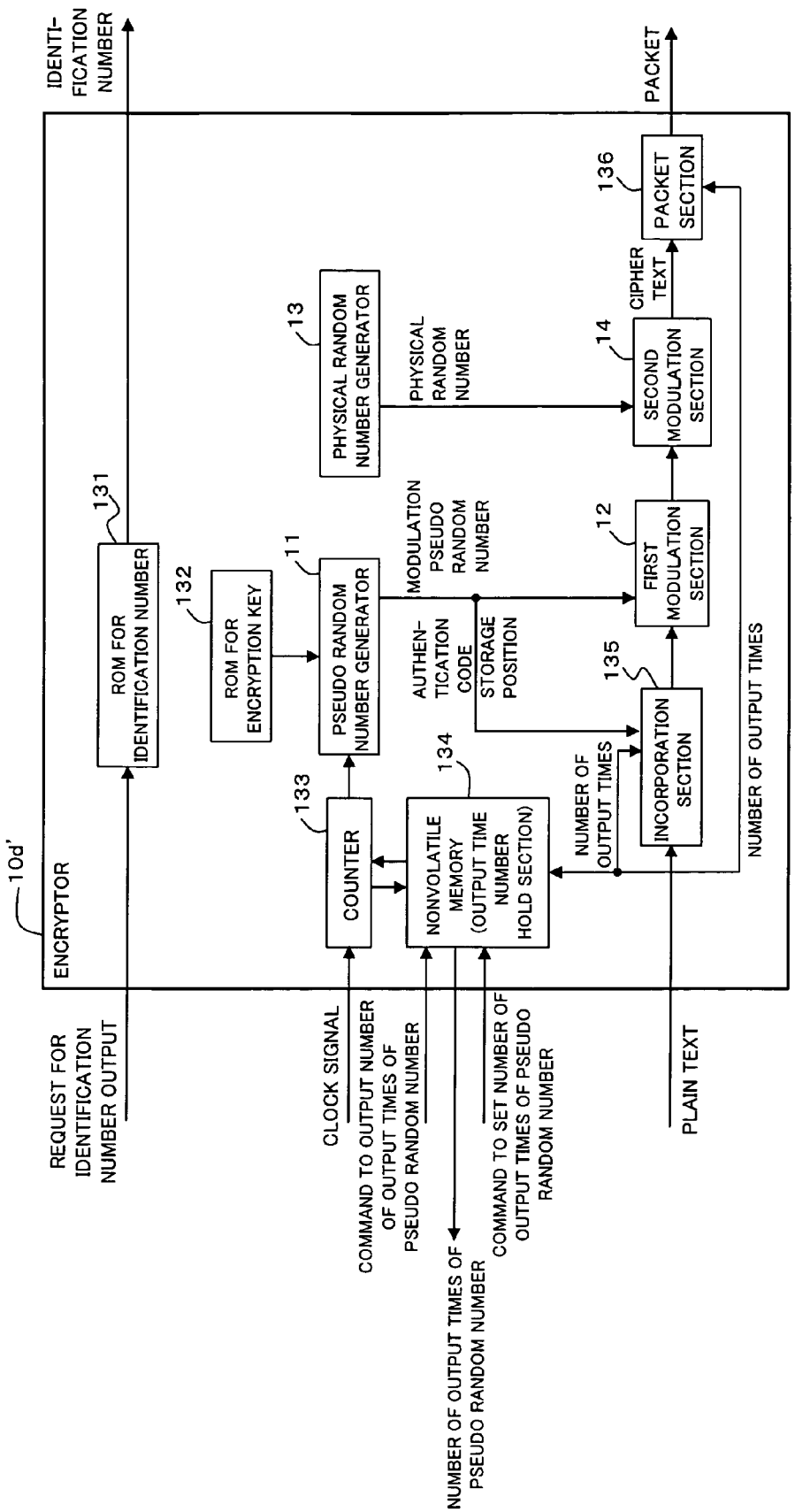
FIG. 29 is a block diagram showing a configuration of an encryptor in the fourth example of the communication system shown in FIG. 26.

Next, the configuration of the encryptor 10d' will be explained with reference to FIG. 29. FIG. 29 is a block diagram showing the configuration of the encryptor 10d' in the communication system 3A' shown in FIG. 26, and in FIG. 29, the same symbols as the symbols already described denote the same or substantially the same portions. As shown in FIG. 29, the encryptor 10d' has the same configuration as that of the encryptor 10d except in that the encryptor 10d shown in FIG. 23 is arranged alone in the tamper-resistant region 60, therefore, its explanation is omitted. The encryptor 10d' is arranged in the tamper-resistant region 60 along with the cryptogram decoder 20d', the nonvolatile memory 151, and the transmission/reception section 152A in the communication devices 3a' and 3b' as explained above with reference to FIG. 26.

Note that, although the channel-coding section 15 (refer to FIG. 1) is not shown schematically also in the encryptor 10d' shown in FIG. 29, the channel-coding section 15 may be provided, as with the encryptor 10 shown in FIG. 1, or may not be provided. When the channel-coding section 15 is provided, the channel-coding section 15 may be arranged in the tamper-resistant region 60 or outside the tamper-resistant region 60. Further, the encryptor 10d' also requires one corresponding to those in the above-mentioned items (21) to (28) as an interface between the inside and the outside of the tamper-resistant region 60.

Figure 30:
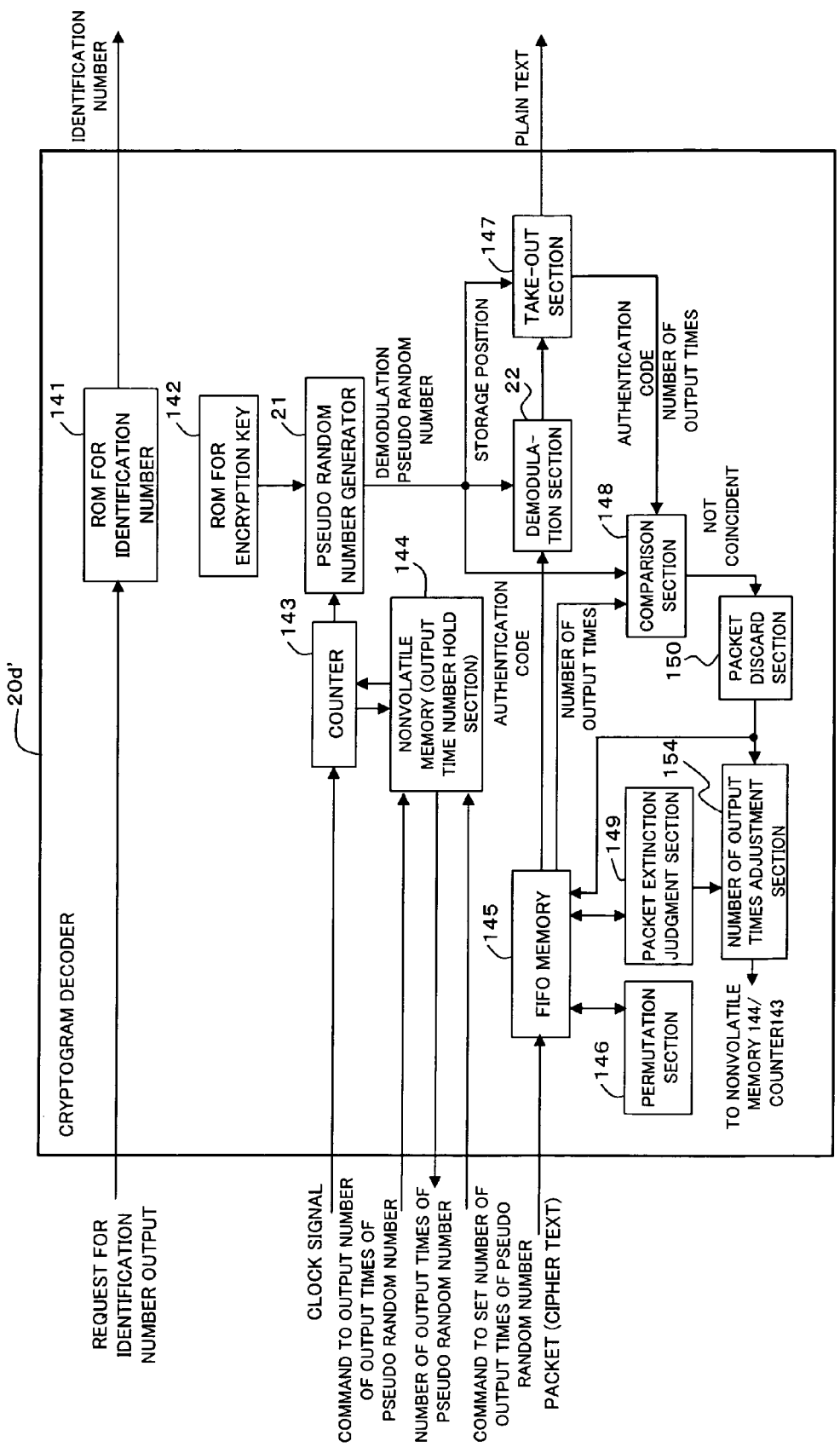
FIG. 30 is a block diagram showing a configuration of a cryptogram decoder in the fourth example of the communication system shown in FIG. 26.
Figure 31:
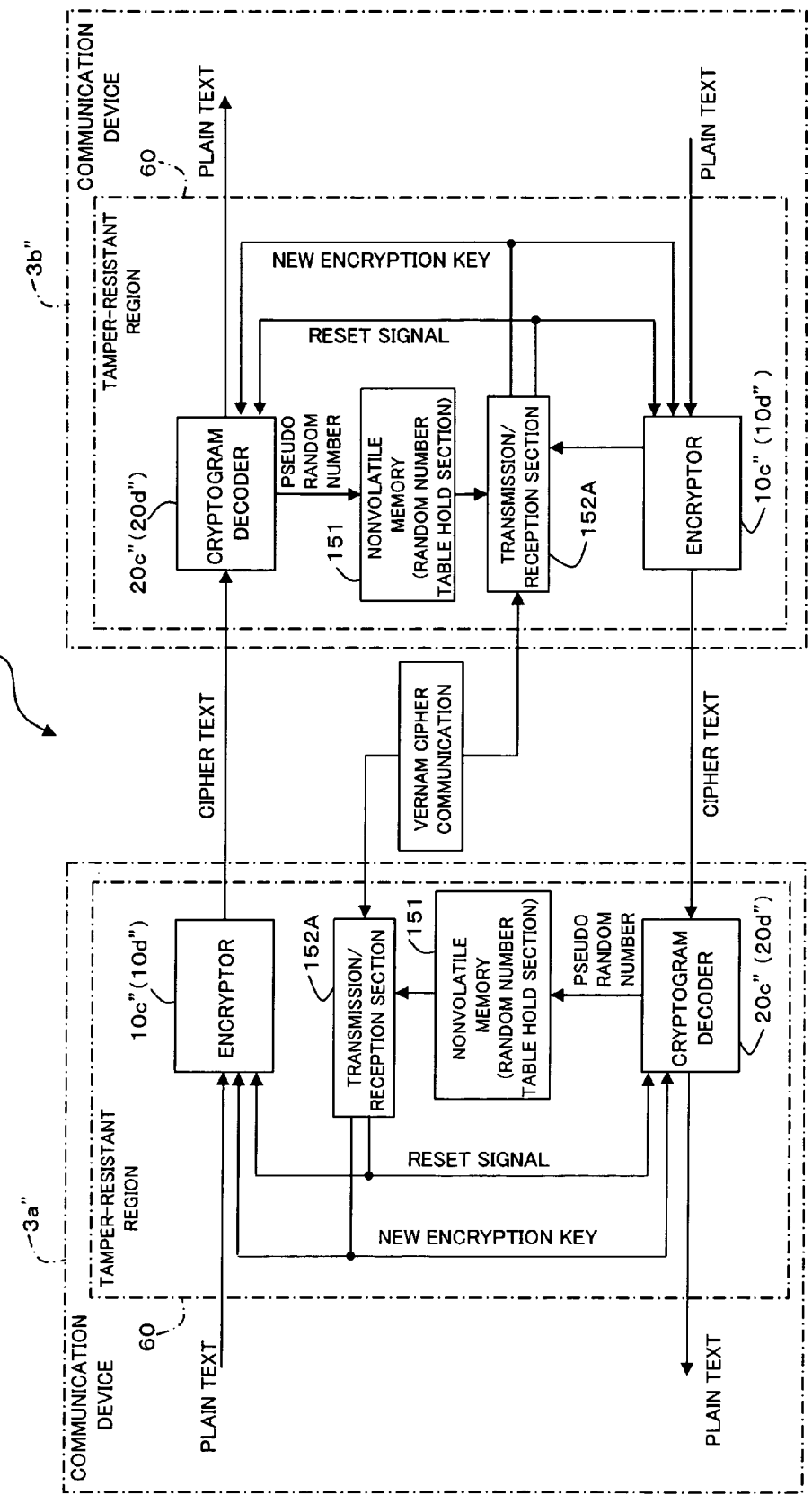
FIG. 31 is a block diagram showing the entire configuration of a fifth example and a sixth example of a communication system to which the encryption/cryptogram decoding technique of the present invention is applied.

Next, the configuration of the cryptogram decoder 20d' will be explained with reference to FIG. 30. FIG. 30 is a block diagram showing the configuration of the cryptogram decoder 20d' in the communication system 3A' shown in FIG. 26 and in FIG. 30, the same symbols as the symbols already described denote the same or substantially the same portions. As shown in FIG. 31, the cryptogram decoder 20d' has the same configuration as the cryptogram decoder 20d except in that the cryptogram decoder 20d shown in FIG. 24 is arranged alone in the tamper-resistant region 60, therefore, its explanation is omitted. The cryptogram decoder 20d' is arranged in the tamper-resistant region 60 along with the encryptor 10d', the nonvolatile memory 151, and the transmission/reception section 152A in the communication devices 3a' and 3b' as explained above with reference to FIG. 26.

Note that, although the channel-decoding section 23 (refer to FIG. 2) is not shown schematically also in the cryptogram decoder 20d' shown in FIG. 30, the channel-decoding section 23 is provided when the channel-coding section 15 is provided on the encryptor 10d' side as with the cryptogram decoder 20 shown in FIG. 2. When the channel-decoding section 23 is provided, the channel-decoding section 23 may be arranged in the tamper-resistant region 60 or outside the tamper-resistant region 60. Further, the cryptogram decoder 20d' also requires one corresponding to those in the above-mentioned items (41) to (48) as an interface between the inside and the outside of the tamper-resistant region 60.

According to the communication system 3A' (the encryptor 10d' and the cryptogram decoder 20d') thus configured, cipher communication to which the encryption technique in the present embodiment is applied is realized between the communication device 3a' and the communication device 3b' and the same function and effect as those in the embodiments described above can be obtained and in addition, the same function and effect as those in the communication system 3A (the encryptor 10d and the cryptogram decoder 20d) in the second example can also be obtained.

In each of the communication devices 3a' and 3b' in the communication system 3A', the whole of the encryptor 10d', the cryptogram decoder 20d', the nonvolatile memory 151, and the transmission/reception section 152A integrated into one is arranged in one of the tamper-resistant regions 60 that provide the structure corresponding to those in the above-mentioned items (51) to (59) on the chip and thus the tamper-resistant properties are secured and input/output between the tamper-resistant region 60 and its outside is limited to those shown in the above-mentioned items (21) to (28) and (41) to (48). Due to this, also in the communication system 3A' in the fourth example, the same function and effect as those in the communication system 3' in the third example can be obtained.

[14] Fifth Example of the Communication System in the Present Embodiment

In the communication systems 3' and 3A' in the third example and the fourth example described above, when performing synchronization processing of the pseudo random number $r_i$, the number of output times is notified as synchronization information by Vernam cipher communication and the synchronization adjustment section 153 synchronizes the pseudo random number $r_i$ by setting the number of output times for the nonvolatile memory 134 of the encryptor 10c'/10d' or the nonvolatile memory 144 of the cryptogram decoder 20c'/20d' or performing dummy inputting of a clock signal for the pseudo random number generator 11 or 21, however, a communication system 3" in the fifth example (refer to FIG. 31) and a communication system 3A" in the sixth example (refer to FIG. 31) to be described later are configured so as to synchronize the pseudo random number $r_i$ by newly encrypting the seed (encryption key) of the pseudo random number $r_i$ with Vernam cipher using the transmission/reception section 152A and re-distributing it to each other to set the new encryption key (new encryption key) again in the encryption key ROMs 132 and 142 and by resetting the number of output times of the pseudo random number $r_i$ in the counters 133 and 143 (nonvolatile memories 134 and 144) to "0" to use a pseudo random number sequence to be generated by the new encryption key.

The fifth example and the sixth example are those corresponding to such a synchronization method and FIG. 31 is a block diagram showing the entire configuration of the fifth example (refer to symbol 3") and the sixth example (refer to symbol 3A") of the communication system to which the encryption/cryptogram decoding technique of the present invention is applied and the communication system 3" in the fifth example shown in FIG. 31 is configured so as to provide two communication devices 3a" and 3b" communicably connected to each other via a communication network etc. For the communication system 3" in the fifth example and the communication system 3A" in the sixth example to be described later, the case is explained where the two communication devices 3a" and 3b" are communicably connected to each other via a communication channel (signal line) in which tampering may occur and the two communication devices 3a" and 3b" perform synchronization processing by Vernam cipher communication described above using the above-mentioned method.

The communication devices 3a" and 3b" have the same configuration and the communication device 3a" is configured so as to include an encryptor 10c" for encrypting input data (plain text $x_i$) to be transmitted to the communication device 3b" by the method described above and a cryptogram decoder 20c" for decoding encrypted data ($c_i$ or $s_i$) received from the communication device 3b" by the method described above, and the nonvolatile memory 151 and the transmission/reception section 152A as same as those described above, and the communication device 3b" is configured so as to include the encryptor 10c" for encrypting input data (plain text $x_i$) to be transmitted to the communication device 3a" by the method described above and the cryptogram decoder 20c" for decoding encrypted data (cipher text $c_i$ or $s_i$) received from the communication device 3a" by the method described above, and the nonvolatile memory 151 and the transmission/reception section 152A as same as those described above. In other words, the communication system 3" in the fifth example has a configuration in which the synchronization adjustment section 153 in the communication system 3' in the third example is omitted. By the way, the configuration of the encryptor 10c" will be described later with reference to FIG. 32 and the configuration of the cryptogram decoder 20c" will be described later with reference to FIG. 33.

Further, in the communication system 3" shown in FIG. 31, the encryptor 10c" in the communication device 3a" and the cryptogram decoder 20c" in the communication device 3b" are paired and the pseudo random number generators 11 and 21 in the devices 10c" and 20c" are configured so as to synchronize and generate the pseudo random number $r_i$ based on the same encryption key. Similarly, the encryptor 10c" in the communication device 3b" and the cryptogram decoder 20c" in the communication device 3a" are paired and the pseudo random number generators 11 and 21 in the devices 10c" and 20c" are also configured so as to synchronize and generate the pseudo random number $r_i$ based on the same encryption key. However, as the encryption key used in each pair of devices described above, different keys are set.

With such a configuration, the transmission data from the communication device 3a" to the communication device 3b" is encrypted by the above-described encryption procedure by the encryptor 10c" and transmitted to the communication device 3b" as the cipher text and on the communication device 3b" side, the cipher text received from the communication device 3a" is decoded into plain text by the above-described cryptogram decoding procedure by the cryptogram decoder 20c". Similarly, the transmission data from the communication device 3b" to the communication device 3a" is encrypted by the above-described encryption procedure by the encryptor 10c" and transmitted to the communication device 3a" as the cipher text and on the communication device 3a" side, the cipher text received from the communication device 3b" is decoded into plain text by the above-described cryptogram decoding procedure by the cryptogram decoder 20c".

Here, the nonvolatile memory 151 and the transmission/reception section 152A are used when synchronization shift occurs for some reason in the pseudo random number generation operation of the pseudo random number generators 11 and 21 and cipher communication between the encryptor 10c' and the cryptogram decoder 20c' becomes no longer possible, and both perform the same functions as those explained in the communication systems 3' and 3A' in the third example and the fourth example.

However, the transmission/reception section 152A in the communication system 3" encrypts a new encryption key, which is to be set again in the encryption key ROMs 132 and 142 at the time of synchronization processing, by the Vernam cipher based on the random number table held in the nonvolatile memory 151 and transmits it to the communication device 3a" or 3b", which is the opposite party in communication, as encrypted synchronization information and at the same time, decodes the encrypted synchronization information received from the communication device 3a" or 3b", which is the opposite party in communication, into the new encryption key based on the random number table held in the nonvolatile memory 151.

When synchronization shift occurs for some reason in the pseudo random number generation operation of the pseudo random number generators 11 and 21 and cipher communication between the encryptor 10c" and the cryptogram decoder 20c" becomes no longer possible, the transmission/reception sections 152A and 152A provided in the communication devices 3a" and 3b", respectively, are used and the encryption/cryptogram decoding operation is performed in synchronization in accordance with the same random number table held in the nonvolatile memories 151 and 151, respectively, and thus the above-mentioned new encryption key is exchanged as the encrypted synchronization information via a communication network etc. (a signal line in which not only interception but also tampering may occur) between the communication devices 3a'' and 3b'' (between the transmission/reception sections 152A and 152A).

The transmission/reception section 152A having received the new encryption key sets the new encryption key again in the encryption key ROMs 132 and 142 and at the same time, outputs a reset signal to the encryptor 10c'' or the cryptogram decoder 20c'' at the same timing in the communication device 3a'' and the communication device 3b'', and resets the number of output times of the pseudo random number $r_i$ in the counters 133 and 143 (the nonvolatile memories 134 and 144) to "0". Incidentally, in the communication system 3'', the synchronization adjustment section 153 is omitted, however, it may also be possible to configure so that the synchronization adjustment section 153 in the communication systems 3' and 3A' sets the new encryption key again and outputs the reset signal as described above.

In addition, in the communication devices 3a'' and 3b'' in the communication system 3'', the encryptor 10c'', the cryptogram decoder 20c'', the nonvolatile memory 151, and the transmission/reception section 152A described above are arranged in the tamper-resistant region 60 that provides the structure corresponding to those in the following items (60) and 61) in addition to those in the above-mentioned items (51) to (59), as with the communication system 3' in the third example.

(60) A structure with which the signal line of the new encryption key (the signal line between the transmission/reception section 152A and the encryption key ROM 132) cannot be tapped even if the chip is disassembled. For example, a wiring structure with which, if the chip is broken in an attempt to tap the signal line of the new encryption key, the chip does not work any longer.

(61) A structure with which the signal line of the reset signal (the signal line between the transmission/reception section 152A and the nonvolatile memory ROM 134 (the counter 133)) cannot be tapped even if the chip is disassembled. For example, a wiring structure with which, if the chip is broken in an attempt to tap the signal line of the reset signal, the chip does not work any longer.

Figure 32:
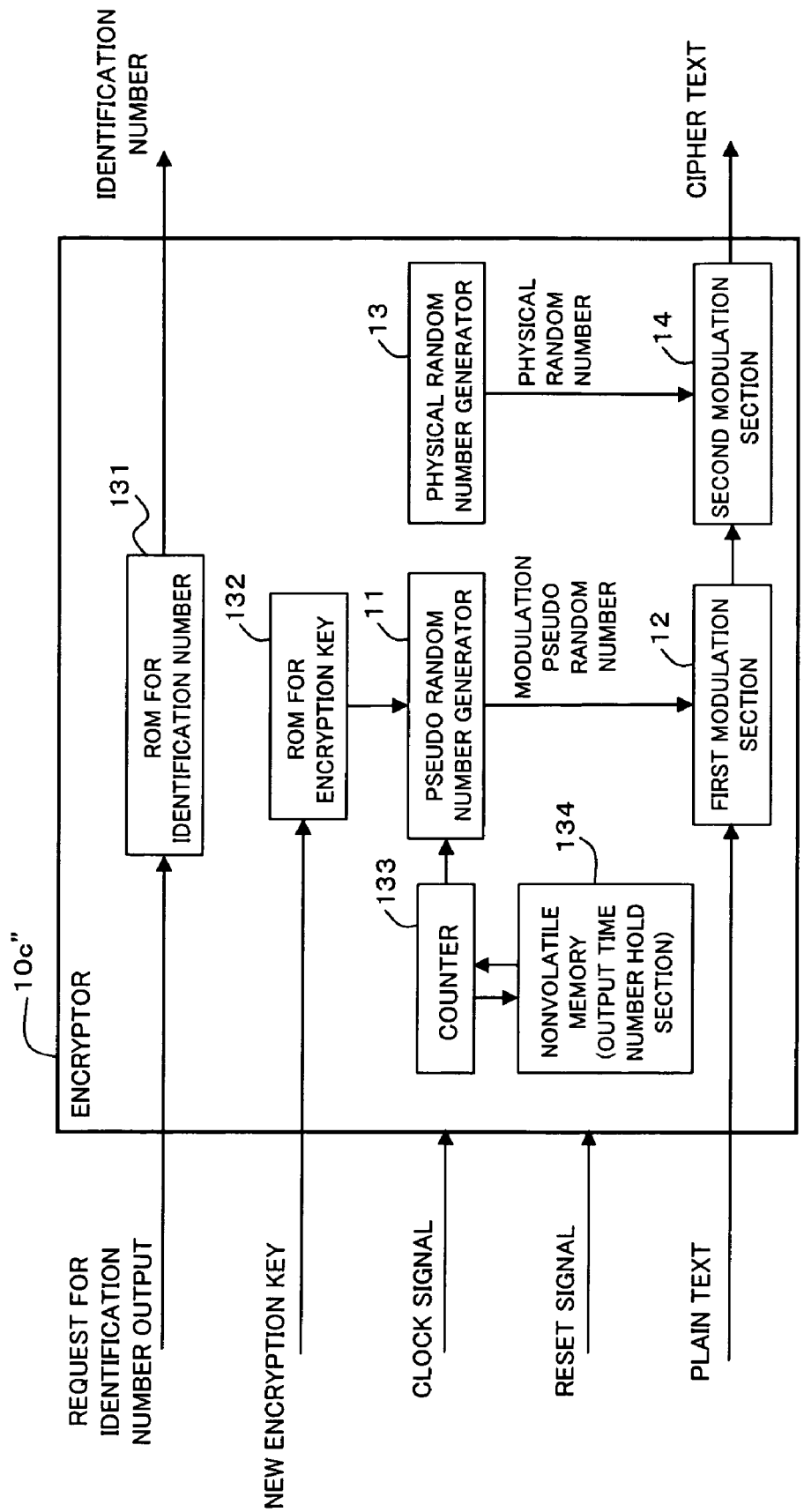
FIG. 32 is a block diagram showing a configuration of an encryptor in the fifth example of the communication system shown in FIG. 31.

Next, the configuration of the encryptor 10c'' will be explained with reference to FIG. 32. FIG. 32 is a block diagram showing the configuration of the encryptor 10c'' in the communication system 3'' shown in FIG. 31 and in FIG. 32, the same symbols as the symbols already described denote the same or substantially the same portions. As shown in FIG. 32, the encryptor 10c'' has the same configuration as that of the encryptor 10c' shown in FIG. 27.

In the encryptor 10c'' in the communication system 3'', however, the encryption key ROM 132 has a configuration with which the encryption key can be set again to a new encryption key in accordance with a direction from the transmission/reception section 152A and the counter 133 (the nonvolatile memory 134) has a configuration with which the number of output times of the pseudo random number $r_i$ can be reset to "0" in accordance with a reset signal from the transmission/reception section 152A. Further, the modulation pseudo random number generator 11 has a configuration with which the number of output times can be returned (can be reset) to 0 when the nonvolatile memory 134, that is, the counter 133 is reset by the reset signal.

Note that, although the channel-coding section 15 (refer to FIG. 1) is not shown schematically also in the encryptor 10c'' shown in FIG. 32, the channel-coding section 15 may be provided, as with the encryptor 10 shown in FIG. 1, or may not be provided. When the channel-coding section 15 is provided, the channel-coding section 15 may be arranged in the tamper-resistant region 60 or outside the tamper-resistant region 60.

Further, in the communication system 3'', as described above, at the time of synchronization processing of the pseudo random number $r_i$, without using the synchronization adjustment section 153 (the number of output times of the pseudo random number $r_i$) outside the tamper-resistant region 60, as is the case with the communication system 3' in the third example, the reset signal and the new encryption key notified from the transmission/reception section 152A in the same tamper-resistant region 60 are used as synchronization information, therefore, as an interface between the inside and the outside of the tamper-resistant region 60 as to the encryptor 10c'' in the present embodiment, one corresponding to those in the above-mentioned items (21) to (25) is necessary and the interface relating to the number of output times of the pseudo random number $r_i$ (one corresponding to those in the above-mentioned items (26) to (28)) is no longer necessary.

Figure 33:
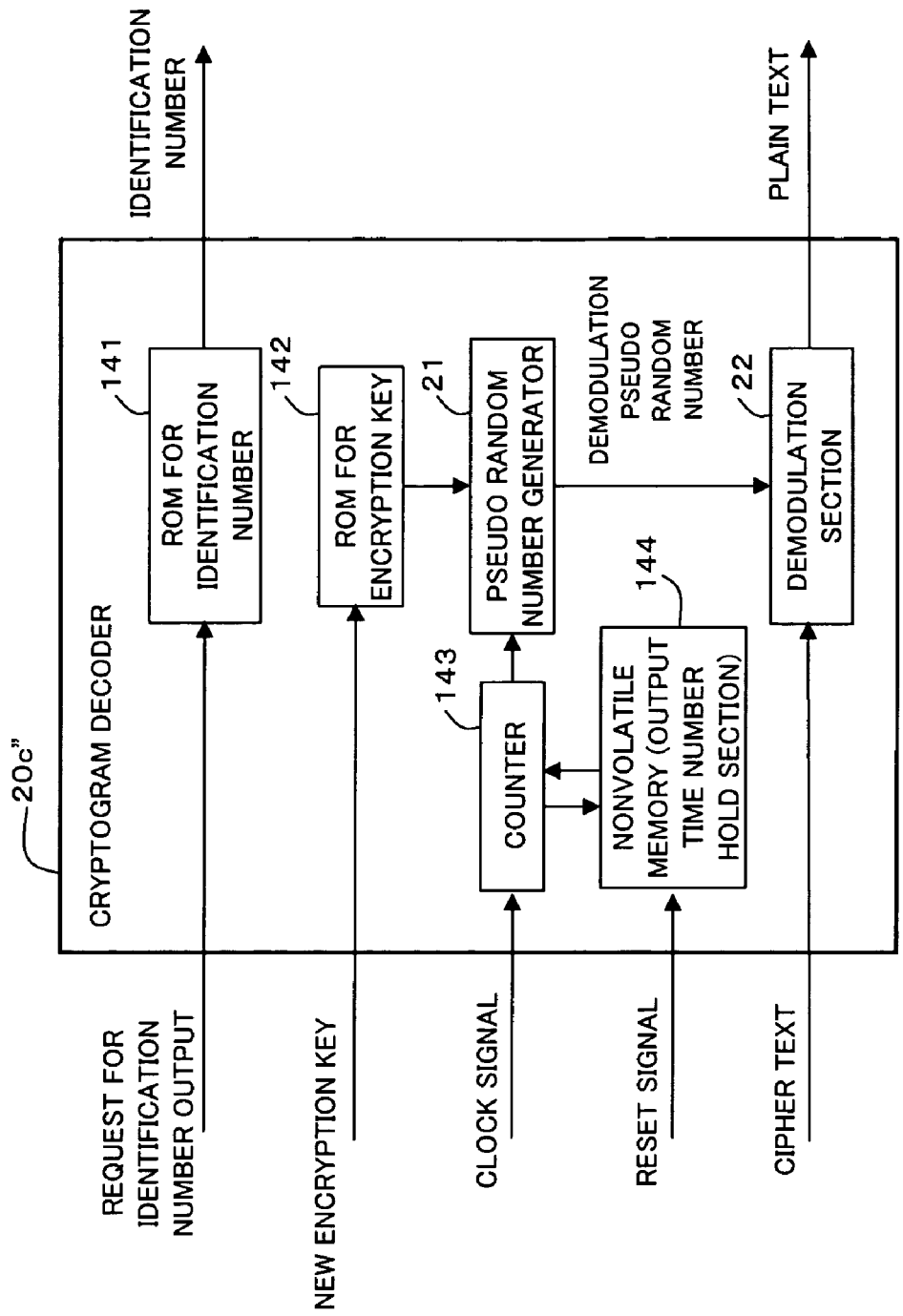
FIG. 33 is a block diagram showing a configuration of a cryptogram decoder in the fifth example of the communication system shown in FIG. 31.

Next, the configuration of the cryptogram decoder 20c'' will be explained with reference to FIG. 33. FIG. 33 is a block diagram showing the configuration of the cryptogram decoder 20c'' in the communication system 3'' shown in FIG. 31 and in FIG. 33, the same symbols as the symbols already described denote the same or substantially the same portions. As shown in FIG. 33, the cryptogram decoder 20c'' has the same configuration as that of the cryptogram decoder 20c' shown in FIG. 28.

In the cryptogram decoder 20c'' in the communication system 3'', however, the encryption key ROM 142 has a configuration with which the encryption key can be set again to a new encryption key in accordance with a direction from the transmission/reception section 152A and the counter 143 (the nonvolatile memory 144) has a configuration with which the number of output times of the pseudo random number $r_i$ can be reset to "0" in accordance with a reset signal from the transmission/reception section 152A. Further, the demodulation pseudo random number generator 21 has a configuration with which the number of output times can be returned (can be reset) to 0 when the nonvolatile memory 144, that is, the counter 143 is reset by the reset signal.

Note that, although the channel-decoding section 23 (refer to FIG. 2) is not shown schematically also in the cryptogram decoder 20c'' shown in FIG. 33, the channel-decoding section 23 is provided when the channel-coding section 15 is provided on the encryptor 10c'' side, as with the cryptogram decoder 20 shown in FIG. 2. When the channel-decoding section 23 is provided, the channel-decoding section 23 may be arranged in the tamper-resistant region 60 or outside the tamper-resistant region 60.

Further, in the present embodiment, as described above, at the time of synchronization processing of the pseudo random number $r_i$, without using the synchronization adjustment section 153 (the number of output times of the pseudo random number $r_i$) outside the tamper-resistant region 60, as is the case with the communication system 3' in the third example, the reset signal and the new encryption key notified from the transmission/reception section 152A in the same tamper-resistant region 60 are used as synchronization information, therefore, as an interface between the inside and the outside of the tamper-resistant region 60 as to the cryptogram decoder 20c'' in the communication system 3'', one corresponding to those in the above-mentioned items (41) to (45) is necessary and the interface relating to the number of output times of the pseudo random number $r_i$ (one corresponding to those in the above-mentioned items (46) to (48)) is no longer necessary.

According to the communication system 3" (the encryptor 10c" and the cryptogram decoder 20c") thus configured, cipher communication to which the encryption technique in the present embodiment is applied is realized between the communication device 3a" and the communication device 3b" and the same function and effect as those in the embodiments described above can be obtained and in addition, the same function and effect as those in the communication system 3' (the encryptor 10c' and the cryptogram decoder 20c') in the third example can also be obtained.

In addition, in each of the communication devices 3a" and 3b" in the communication system 3" in the fifth example, the whole of the encryptor 10c", the cryptogram decoder 20c", the nonvolatile memory 151, and the transmission/reception section 152A integrated into one is arranged in one of the tamper-resistant regions 60 that provide the structure corresponding to those in the above-mentioned items (51) to (61) on the chip and thus the tamper-resistant properties are secured and input/output between the tamper-resistant region 60 and its outside is limited to those shown in the above-mentioned items (21) to (25) and (41) to (45).

Due to this, it is absolutely impossible to read the pseudo random number $r_i$ generated by the pseudo random number generators 11 and 21, the encryption key held in the ROMs 132 and 142, the random number table held in the nonvolatile memory 151, or the new encryption key set again in the ROMs 132 and 142 to the outside of the tamper-resistant region 60 through the interface corresponding to those in the above-items (21) to (25) and (41) to (45). Further, by adopting the tamper-resistant region 60 that provides the structure corresponding to those in the above-mentioned items (51) to (61), it is absolutely impossible to read the encryption key held in the ROMs 132 and 142, to tap the signal line of the pseudo random number $r_i$, to tap the signal line of the physical random number $f_i$, to read the random number table held in the nonvolatile memory 151, to tap the signal line of the random number sequence of the random number table, or to tap the signal line of the new encryption key or the reset signal even by disassembling the chip and furthermore, even if physical disturbance (heat or voltage) is applied from the outside of the chip, the probability distribution of the physical random number $f_i$ from the physical random number generator 13 does not change any more. Therefore, also in the communication system 3" in the fifth example, the same function and effect as those in the communication system 3' in the third example can be obtained.

On the other hand, in the communication system 3" in the fifth example, as with the communication system 3' in the third example, the communication devices 3a" and 3b" in cipher communication with each other share the same random number table during the period of cipher communication and accumulate the common random number table in the nonvolatile memory 151 of each of the communication devices 3a" and 3b". Then, when the need arises to synchronize the pseudo random number generation operation in the communication device 3a" with the pseudo random number generation operation in the communication device 3b", for example, at the time of restoration after an abnormal stop caused by power failure etc., the transmission/reception section 152A in the communication device 3a" and the transmission/reception section 152A in the communication device 3b" mutually perform cipher communication therebetween by the Vernam cipher using the random number table held in the nonvolatile memory 151 and the new encryption keys are exchanged.

In addition, when performing synchronization processing of the pseudo random number $r_i$ in the communication devices 3a" and 3b", as described above, the transmission/reception section 152A having received the new encryption key sets the new encryption key again in the encryption key ROMs 132 and 142 and at the same time, a reset signal is output to the encryptor 10c" or the cryptogram decoder 20c" at the same timing in the communication devices 3a" and 3b" and thus the number of output times of the pseudo random number $r_i$ in the counters 133 and 143 (the nonvolatile memories 134 and 144) is reset to "0". Due to this, the pseudo random number generator 11 in the encryptor 10c" and the pseudo random number generator 21 in the cryptogram decoder 20c" resume the operation simultaneously using the same new encryption key, and, therefore, it is possible to synchronize the pseudo random number generation operation of the pseudo random number generator 11 in the encryptor 10c" with the pseudo random number generation operation of the pseudo random number generator 21 in the cryptogram decoder 20c".

Note that, in the communication system 3", when there exit other means to confirm that the synchronization of pseudo random number is shifted or when confirmation that the synchronization of pseudo random number is shifted can be ignored, a modification is possible in which the same random number table held in the respective nonvolatile memories 151 and 151 in the respective communication devices 3a" and 3b" is not used as the encryption key for the Vernam cipher communication but as the new encryption key itself. In this modification, it is not necessary to perform the Vernam cipher communication, therefore, the transmission/reception section 152A can be omitted.

[15] Sixth Example of the Communication System in the Present Embodiment

The communication system 3A" in the sixth example is also configured so as to include the two communication devices 3a" and 3b" communicably connected to each other via a communication network etc., as with the communication system 3" in the fifth example, as shown in FIG. 31. For the communication system 3A" in the sixth example, as described above, the case is explained where the two communication devices 3a" and 3b" are communicably connected to each other via a communication channel (signal line) in which tampering may occur and the two communication devices 3a" and 3b" perform synchronization processing by the same synchronization method as that in the communication system 3" in the fifth example.

The communication devices 3a" and 3b" in the communication system 3A" have the same configuration and in the communication system 3A", the communication device 3a" is configured so as to include an encryptor 10d" for encrypting input data (plain text $x_i$) to be transmitted to the communication device 3b" by the method described above and a cryptogram decoder 20d" for decoding encrypted data ($c_i$ or $s_i$) received from the communication device 3b" by the method described above, and the nonvolatile memory 151 and the transmission/reception section 152A described in the communication system 3" in the fifth example, and the communication device 3b" is configured so as to include the encryptor 10d" for encrypting input data (plain text $x_i$) to be transmitted to the communication device 3a" by the method described above and the cryptogram decoder 20d" for decoding encrypted data (cipher text $c_i$ or $s_i$) received from the communication device 3a" by the method described above, and the nonvolatile memory 151 and the transmission/reception section 152A as same as those described above. In other words, the communication system 3A" in the sixth example has a configuration in which the synchronization adjustment section 153 in the communication system 3A' in the fourth example is omitted. The configuration of the encryptor 10d" will be described later with reference to FIG. 34 and the configuration of the cryptogram decoder 20d" will be described later with reference to FIG. 35.

However, as with encryptors 10d and 10d' in the communication systems 3A and 3A' in the second example and the fourth example, the encryptor 10d" in the communication system 3A" is configured so as to transmit the encrypted data ($s_i$) obtained by the second modulation section 14 to the destination communication device 3a" or 3b" as a plurality of packets and the cryptogram decoder 20d" in the communication system 3A" is configured so as to decode the encrypted data ($s_i$) in each packet received from the encryptor 10d" of the sender communication device 3a" or 3b" into input data (plain text $x_i$). In other words, the communication system 3A" in the sixth example (the encryptor 10d" and the cryptogram decoder 20d") also aims at communication using a communication channel in which the arrival order of packets may be permutated or a packet may become extinct and a system that needs to recognize whether or not the individual packets are transmitted from a legitimate transmitter (specifically, a communication system of IP telephone), as with the communication systems 3A and 3A' in the second example and the fourth example.

Further, also in the communication system 3A" in the sixth example, the encryptor 10d" in the communication device 3a" and the cryptogram decoder 20d" in the communication device 3b" are paired and the pseudo random number generators 11 and 21 in the devices 10d" and 20d" are configured so as to synchronize and generate the pseudo random number $r_i$ based on the same encryption key. Similarly, the encryptor 10d" in the communication device 3b" and the cryptogram decoder 20d" in the communication device 3a" are paired and the pseudo random number generators 11 and 21 in the devices 10d" and 20d" are also configured so as to synchronize and generate the pseudo random number $r_i$ based on the same encryption key. However, as the encryption key used in each pair of devices described above, different keys are set.

With such a configuration, the transmission data from the communication device 3a" to the communication device 3b" is encrypted by the encryption procedure described above by the encryptor 10d" and transmitted to the communication device 3b" as the cipher text and on the communication device 3b" side, the cipher text received from the communication device 3a" is decoded into plain text by the cryptogram decoding procedure described above by the cryptogram decoder 20d". Similarly, the transmission data from the communication device 3b" to the communication device 3a" is encrypted by the encryption procedure described above by the encryptor 10d" and transmitted to the communication device 3a" as the cipher text and on the communication device 3a" side, the cipher text received from the communication device 3b" is decoded into plain text by the cryptogram decoding procedure described above by the cryptogram decoder 20d".

By the way, in the communication system 3A" in the sixth example, the nonvolatile memory 151 and the transmission/reception section 152A are the same as those explained in the communication system 3" in the fifth example, therefore, their explanation is omitted. Further, also in the communication devices 3a" and 3b" in the communication system 3A", the encryptor 10d", the cryptogram decoder 20d", the nonvolatile memory 151, and the transmission/reception section 152A are arranged in the tamper-resistant region 60 (that provides the structure corresponding to those in the above-mentioned items (51) to (61)) on a chip, as with the communication system 3" in the fifth example.

Figure 34:
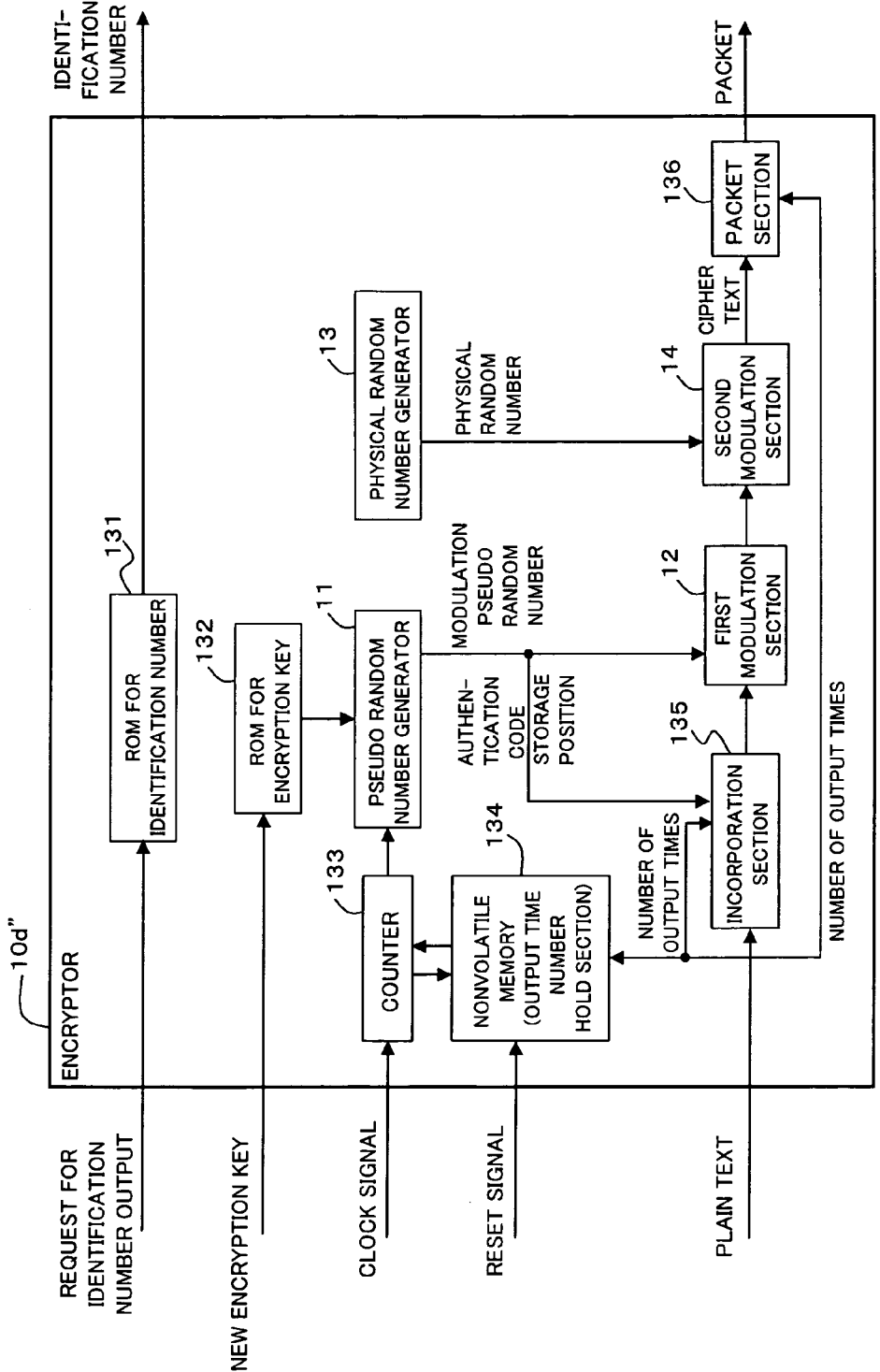
FIG. 34 is a block diagram showing a configuration of an encryptor in the sixth example of the communication system shown in FIG. 31.

Next, the configuration of the encryptor 10d" will be explained with reference to FIG. 34. FIG. 34 is a block diagram showing the configuration of the encryptor 10d" in the communication system 3A" shown in FIG. 31 and in FIG. 34, the same symbols as the symbols already described denote the same or substantially the same portions. As shown in FIG. 34, the encryptor 10d" has substantially the same configuration as that of the encryptor 10d' shown in FIG. 29.

In the encryptor 10d" also, however, as with the encryptor 10c" in the communication system 3" in the fifth example, the encryption key ROM 132 has a configuration with which the encryption key can be set again to a new encryption key in accordance with a direction from the transmission/reception section 152A and the counter 133 (the nonvolatile memory 134) has a configuration with which the number of output times of the pseudo random number $r_i$ can be reset to "0" in accordance with a reset signal from the transmission/reception section 152A. Further, the modulation pseudo random number generator 11 has a configuration with which the number of output times can be returned (can be reset) to 0 when the nonvolatile memory 134, that is, the counter 133 is reset by the reset signal.

Note that, although the channel-coding section 15 (refer to FIG. 1) is not shown schematically also in the encryptor 10d" shown in FIG. 34, the channel-coding section 15 may be provided, as with the encryptor 10 shown in FIG. 1, or may not be provided. When the channel-coding section 15 is provided, the channel-coding section 15 may be arranged in the tamper-resistant region 60 or outside the tamper-resistant region 60. As an interface between the inside and the outside of the tamper-resistant region 60 as to the encryptor 10d" in the present embodiment, as with the encryptor 10c" in the communication system 3" in the fifth example, one corresponding to those in the above-mentioned items (21) to (25) is necessary and the interface relating to the number of output times of the pseudo random number $r_i$ (one corresponding to those in the above-mentioned items (26) to (28)) is no longer necessary.

Figure 35:
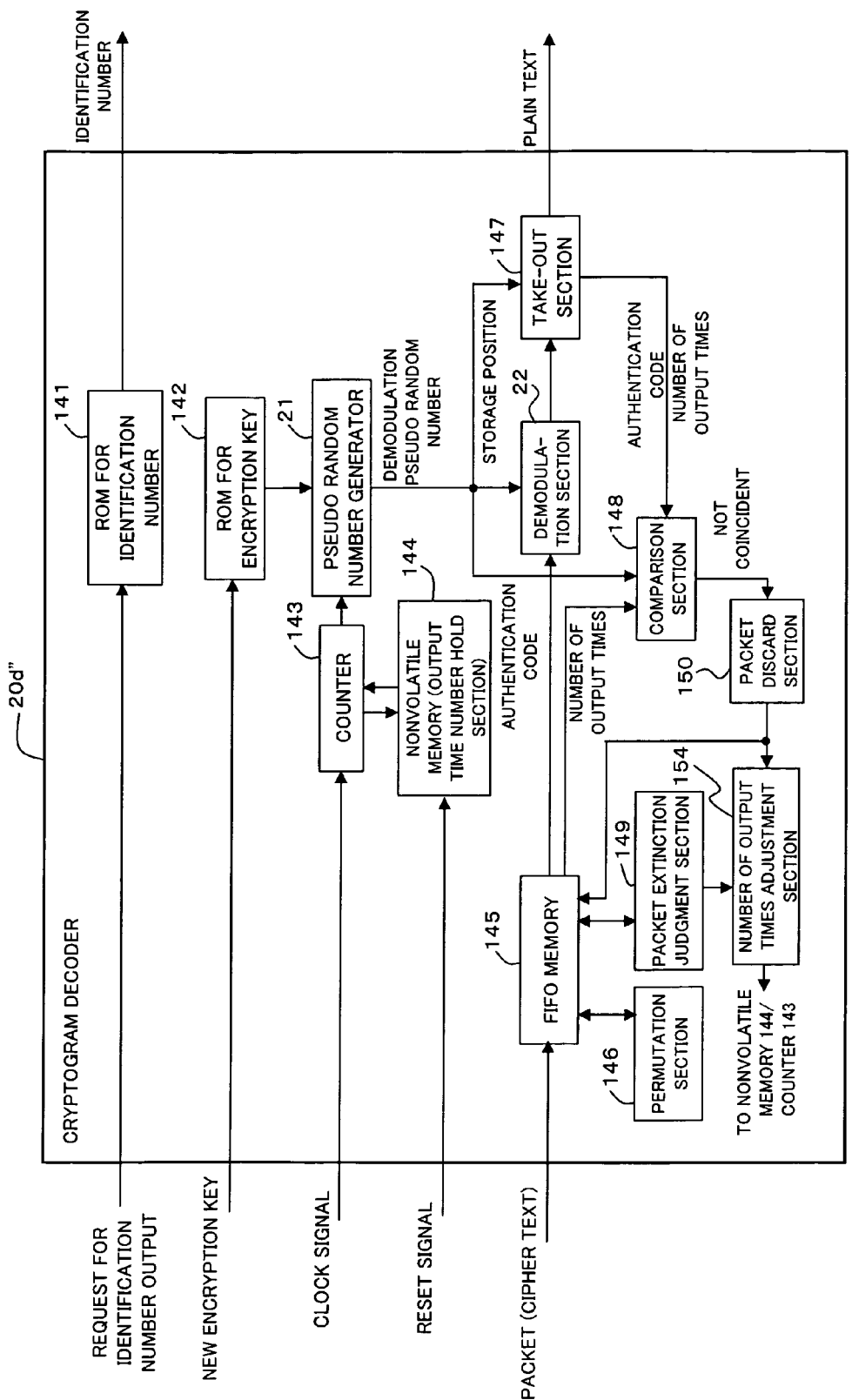
FIG. 35 is a block diagram showing a configuration of a cryptogram decoder in the sixth example of the communication system shown in FIG. 31.

Next, the configuration of the cryptogram decoder 20d" will be explained with reference to FIG. 35. FIG. 35 is a block diagram showing the configuration of the cryptogram decoder 20d" in the communication system 3A" shown in FIG. 31 and in FIG. 35, the same symbols as the symbols already described denote the same or substantially the same portions. As shown in FIG. 35, the cryptogram decoder 20d" has substantially the same configuration as that of the cryptogram decoder 20d' shown in FIG. 30.

In the cryptogram decoder 20d" also, however, as with the cryptogram decoder 20c" in the communication system 3" in the fifth example, the encryption key ROM 142 has a configuration with which the encryption key can be set again to a new encryption key in accordance with a direction from the transmission/reception section 152A and the counter 143 (the nonvolatile memory 144) has a configuration with which the number of output times of pseudo random number $r_i$ can be reset to "0" in accordance with a reset signal from the transmission/reception section 152A. Further, the demodulation pseudo random number generator 21 has a configuration with which the number of output times can be returned (can be reset) to 0 when the nonvolatile memory 144, that is, the counter 143 is reset by the reset signal.

Note that, although the channel-decoding section 23 (refer to FIG. 2) is not shown schematically also in the cryptogram decoder 20d" shown in FIG. 35, the channel-decoding section 23 is provided when the channel-coding section 15 is provided on the encryptor $10c''$ side, as with the cryptogram decoder 20 shown in FIG. 2. When the channel-decoding section 23 is provided, the channel-decoding section 23 may be arranged in the tamper-resistant region 60 or outside the tamper-resistant region 60. As an interface between the inside and the outside of the tamper-resistant region 60 as to the cryptogram decoder $20d''$ in the present embodiment, as with the cryptogram decoder $20c''$ in the communication system $3''$ in the fifth example, one corresponding to those in the above-mentioned items (41) to (45) is necessary and the interface relating to the number of output times of pseudo random number $r_i$ (one corresponding to those in the above-mentioned items (46) to (48)) is no longer necessary.

According to the communication system $3A''$ (the encryptor $10d''$ and the cryptogram decoder $20d''$) thus configured, cipher communication to which the encryption technique in the present embodiment is applied is mutually realized between the communication device $3a''$ and the communication device $3b''$ and the same function and effect as those in the embodiments described above can be obtained and in addition, the same function and effect as those in the communication system $3A'$ (the encryptor $10d'$ and the cryptogram decoder $20d'$) in the fourth example can also be obtained.

In addition, in each of the communication devices $3a''$ and $3b''$ in the communication system $3A''$ in the sixth example, the whole of the encryptor $10d''$, the cryptogram decoder $20d''$, the nonvolatile memory 151, and the transmission/reception section 152A integrated into one is arranged in one of the tamper-resistant regions 60 that provide the structure corresponding to those in the above-mentioned items (51) to (61) on the chip and thus the tamper-resistant properties are secured and input/output between the tamper-resistant region 60 and its outside is limited to those shown in the above-mentioned items (21) to (28) and (41) to (48). Due to this, also in the communication system $3A''$ in the sixth example, the same function and effect as those in the communication system $3''$ in the fifth example can be obtained.

Note that, in the communication system $3A''$ in the sixth example, when there exit other means to confirm that the synchronization of pseudo random number is shifted or when confirmation that the synchronization of pseudo random number is shifted can be ignored, a modification is possible in which the same random number table held in the respective nonvolatile memories 151 and 151 in the respective communication devices $3a''$ and $3b''$ is not used as the encryption key for the Vernam cipher communication but as the new encryption key itself. In this modification, it is not necessary to perform the Vernam cipher communication, therefore, the transmission/reception section 152A can be omitted.

[16] Modification Examples

It is to be noted that the present invention is not limited to the above-described embodiments and a variety of modifications can be made without departing from the gist and scope of the present invention.

For example, for the transmission/reception system 1, the public line system 2, and the communication systems 3, 3A, $3'$, $3A'$, $3''$, and $3A''$, the cases the encryption technique of the present invention is applied to both directions of transmission and reception, however, the present invention is not limited to this and it may also be possible to apply the encryption technique of the present invention to only the single direction of transmission or reception.

Figure 36:
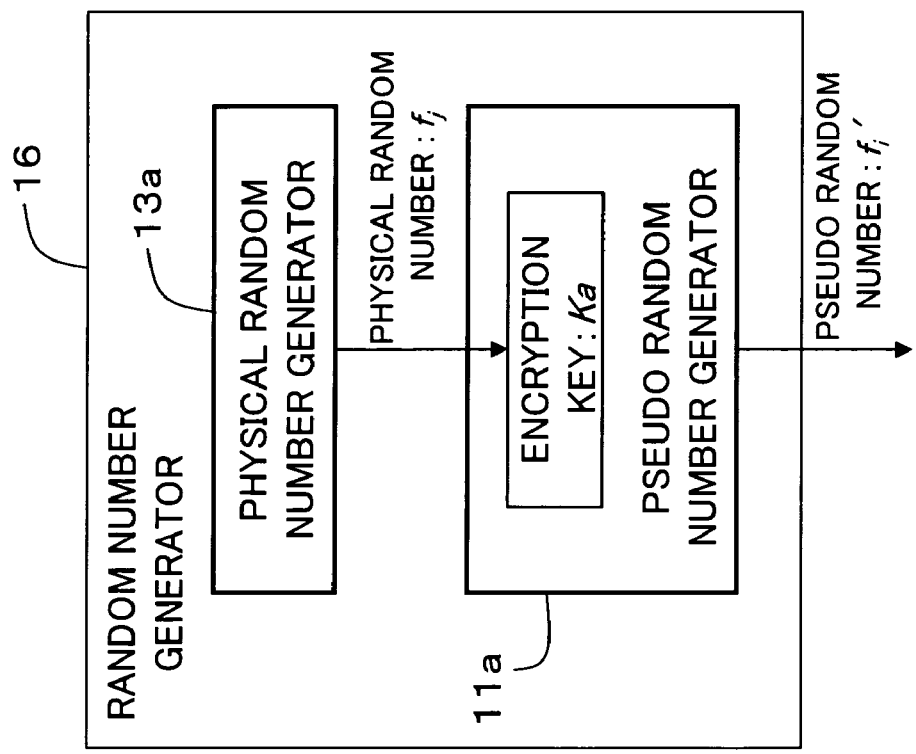
FIG. 36 is a block diagram showing a configuration of a random number generator used instead of a physical random number generator in the present embodiment.

Further, in the above-described embodiments, the physical random number generator 13 is used, however, a pseudo random number generator or a random number generator 16 as shown in FIG. 36 may be used instead of the physical random number generator 13.

In the encryptors 10, $10a$ to $10d$, $10c''$, $10d''$, $10c'''$, and $10d'''$, by using a pseudo random number generator (encryption key is fixed; not shown) different from the pseudo random number generators 11 and 21 instead of the physical random number generator 13, it is no longer necessary to use an expensive physical random number generator and it is made possible to configure the encryptors 10, $10a$ to $10d$, $10c'$, $10d'$, $10c''$, and $10d''$ at a low cost and in addition, an advantage that implementation is perfectly enabled only with software is obtained.

The random number generator 16 shown in FIG. 36 is configured so as to include a pseudo random number generator $11a$ different from the pseudo random number generators 11 and 21 and a physical random number generator $13a$. The pseudo random number generator (the second pseudo random number generation section, the modulation pseudo random number generation section) $11a$ generates and outputs a pseudo random number (a second pseudo random number) $f_i'$ instead of the above-described physical random number $f_i$ based on an encryption key Kb and the physical random number generator (the physical random number generation section) $13a$ generates the physical random number $f_i$ based on a physical phenomenon, as with the above-described physical random number generator 13. In addition, an encryption key Ka of the pseudo random number generator $11a$ is configured so as to change periodically or non-periodically to a value determined by the physical random number $f_i$ generated by the physical random number generator $13a$. At this time, the configuration may be made such that the timing to change the encryption key Ka is determined by the output value of the physical random number generator.

In the encryptor 10, it is necessary to generate at least two-bit physical random number $f_i$ for the one-bit plain text by the physical random number generator 13, therefore, a physical random number generator capable of high speed operation needs to be used, however, as the physical random number generator $13a$ in the random number generator 16, it is possible to use one with lower speed operation than that of the physical random number generator 13. As described above, a physical random number generator capable of high speed operation is expensive, however, a physical random number generator with low speed operation is inexpensive, therefore, it is made possible to configure the encryptor of the present invention without sacrificing the safety (encryption strength) significantly when the pseudo random number generator 16 shown in FIG. 36 is used instead of the physical random number generator 13.

In addition, for example, when the encryptor of the present invention is realized by utilizing a personal computer etc., if a pseudo random number generator that operates with data such as "the position on a screen pointed with a mouse pointer at a certain point of time" as an encryption key is used instead of the physical random number generator 13, it is possible to realize an encryptor that secures substantially the same encryption strength (safety) as that when a physical random number generator is used without the need to mount an expensive physical random number generator.

On the other hand, by using the communication system 3A in the second example described above, it is made possible to provide a contents distribution service by a recording medium such as an optical disc, which has made clear the relationship between the number of reproduction times of the contents and the charge.

For example, when the contents distributor charges a user and provides the user with the contents recorded in an optical disc, the contents distributor uses, for example, the encryptor $10d$ as a contents recording device to an optical disc, while the user uses, for example, the cryptogram decoder $20d$ as an optical disc reproducing device (a player). Incidentally, at that time, the packets in the communication system 3A in the second example are dealt with as those corresponding to the contents to be recorded in one optical disc.

To explain more specifically, the contents provider records the encrypted contents obtained by modulating the contents by the encryptor $10d$ in the encrypted region of an optical disc and at the same time, writes an identification number (a character string corresponding to the encryption key one-to-one, however, from which the encryption key cannot be predicted) and the number of output times of the pseudo random number (or information indicating what number optical disc) in the label on the optical disc surface or the non-encrypted region of the optical disc and provides the user with the optical disc.

At this time, as the identification number, for example, the identification number (ID number) held in the identification number ROM 131 is read and written into the above-mentioned non-encrypted region. Further, as the number of output times of pseudo random number, the number of output times (a numerical value indicating what number pseudo random number) of the modulation pseudo random number $r_i$ from the pseudo random number generator 11 used when modulating the first data $x_i$ of the contents to be provided by the first modulation section 12 is read from the counter 133 (the same nonvolatile memory 134) and written into the above-mentioned non-encrypted region. Further, into the encrypted region of the optical disc, in addition to the above-described encrypted contents, the number of output times of pseudo random number is also embedded. It is preferable for the embedment position to be scrambled using the pseudo random number generated by the pseudo random number generator 11, as with the communication system 3A in the second example.

Then, upon receipt of the optical disc from the contents distributor, the user demodulates the contents of the optical disc by the cryptogram decoder $20d$ and reproduces them. When starting reproduction of the optical disc, the cryptogram decoder $20d$ reads the number of output times of pseudo random number written into the non-encrypted region and if there are some missing discs, for example, when plural optical discs are reproduced in a predetermined sequence and if an attempt is made to reproduce without following the predetermined sequence by skipping one or more optical discs, "warning" is issued to the user.

If the user exchanges the optical disc with a correct one in accordance with the "warning", the cryptogram decoder $20d$ confirms the number of output times again and starts reproduction. Further, if the user refers to the "warning" and agrees to reproduce with one or more optical discs skipped, the cryptogram decoder $20d$ uses, for example, the function of the number of output times adjustment section 154 and adjusts the number of output times of the demodulation pseudo random number $r_i$ output to the demodulation section 22 from the pseudo random number generator 21 to the number of output times as to the optical disc to be reproduced next by setting the number of output times for the nonvolatile memory 144, or by performing dummy inputting of a clock signal for the pseudo random number generator 21. Due to this, it is made possible to correctly demodulate the encrypted contents in the next optical disc while maintaining the correspondence relationship between the modulation pseudo random number and the demodulation pseudo random number. However, the pseudo random number generator 21 of the cryptogram decoder $20d$ is configured so as to prohibit reset and repetition of the generation operation of the demodulation pseudo random number $r_i$, therefore, the encrypted contents of the skipped optical disc cannot be reproduced any longer.

At this time, as describe above, the pseudo random number generator 21 of the cryptogram decoder $20d$ is configured so as to prohibit reset and repetition of the generation operation of the demodulation pseudo random number $r_i$, therefore, if the user once reproduces the contents of the optical disc, the contents cannot be reproduced any longer again. Due to this, if the user desires reproduction of the contents two or more times, the user pays the fee corresponding to the number of reproduction times to the contents provider and by the number of reproduction times, the contents are modulated repeatedly and recorded in the optical disc as the encrypted contents. Therefore, it is made possible for the contents provider to make clear the relationship between the number of reproduction times of the contents and the charge and to charge without fail the user in accordance with the number of reproduction times.

Note that, the cryptogram decoder $20d$ may be configured so as to compare, when starting reproduction of an optical disc, the number of output times demodulated and taken out from the encrypted region and the number of output times written into the non-encrypted region and, if the numbers of output times do not coincide, regard that some tampering has been made to the contents of the optical disc and prohibit the reproduction of the optical disc in substantially the same manner as the communication system 3A in the second example.

Further, if a reproduction device for converting the decoded digital signal into an analog image signal or voice signal is internally provided in the tamper-resistant region 60 of the cryptogram decoder $20d$ used as a contents reproducing device, the reproduced signal output from the tamper-resistant region 60 of the cryptogram decoder $20d$ can be converted into an analog signal, therefore, the duplication of the digital reproduction signal can be suppressed and therefore effective.

Figure 37:
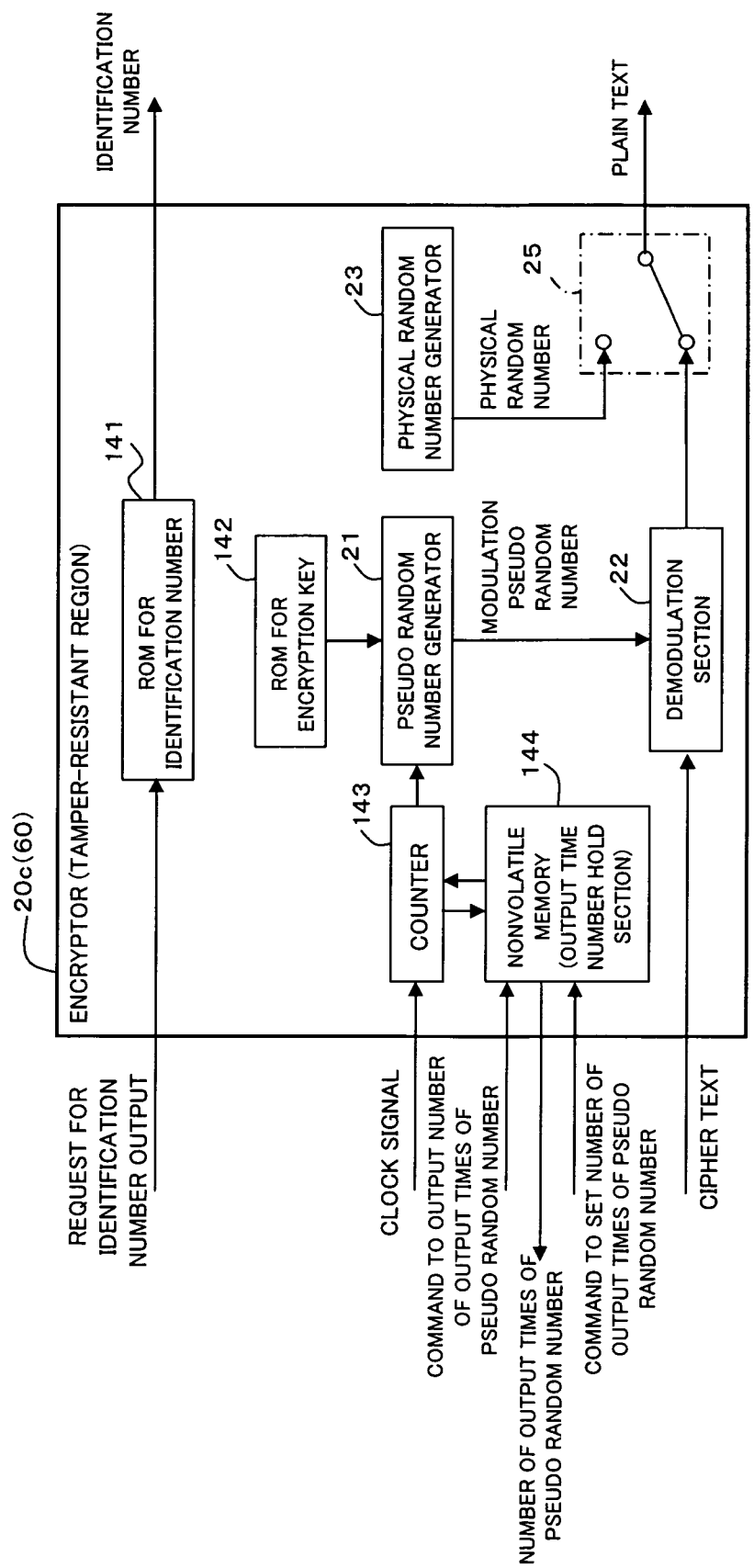
FIG. 37 is a block diagram showing a configuration of a modification example of the cryptogram decoder in the communication system to which the encryption/cryptogram decoding technique of the present invention is applied.

On the other hand, the cryptogram decoder $20c$ (the cryptogram decoders $20d$, $20c'$, $20d'$, $20c''$, and $20d''$ also apply) may be configured so as to further include a physical random number generator 24 and a switching section 25 in the tamper-resistant region 60, as shown in FIG. 37. Here, FIG. 37 is a block diagram showing a configuration of a modification example of the cryptogram decoder $20c$ in the communication system 3 to which the encryption/decoding technique of the present invention is applied.

Here, the physical random number generator 24 is substantially the same as the physical random number generator 13 provided in the encryptor 10 etc. and the switching section 25 selectively switches between the output (plain text) from the demodulation section 22 and the output (physical random number) from the physical random number generator 13 and outputs either one. Here, FIG. 37 shows a state in which the switching section 25 selects the plain text from the demodulation section 22 and outputs the plain text.

The switching section 25 performs a switching operation, when cipher text that is to be input to the cryptogram decoder $20c$ etc. and that cannot be existent from the inverse calculation from the correspondence relationship between pseudo random number and output (that is, it is obvious that the cipher text is not one transmitted by a legitimate transmitter) is input, so that the physical random number from the physical random number generator 13 is output from the plain text output interface as plain text instead of the plain text from the demodulation section 22.

By employing such a configuration in the cryptogram decoder 20c etc., it is not possible to predict the value of a pseudo random number even by stealing the cryptogram decoder 20c etc., inputting false cipher text, and predicting the value of the pseudo random number because a physical random number having nothing with the cipher text is output. For example, in the procedure to predict the first pseudo random number value "2" described above, the value of a pseudo random number is predicted by obtaining "error" as the plain-text output for the cipher-text input "2" or "7", however, "error" is not output because of the switching by the switching section 25, therefore, the value of the pseudo random number cannot be predicted. In other words, by employing such a configuration, the safety against a selected-cipher-text attack is obtained. Incidentally, since it is possible to know that the opposite party in communication is the legitimate transmitter by using the authentication method described above with reference to FIG. 19, it is not necessary to provide separately a "function to detect an illegitimate transmitter from error information when cipher text impossible to exist originally is sent".

[17] Others

The functions (all of the functions or part of them) as the pseudo random number generator 11, the first modulation section 12, the physical random number generator 13, the second modulation section 14, the channel-coding section 15, the counter 133, the incorporation section 135, and the packet section 136 in the above-described encryptors 10, 10a to 10d, 10c', 10d', 10c'', and 10d'', or the functions (all of the functions or part of them) as the channel-decoding section 23, the pseudo random number generator 21, the demodulation sections 22, the physical random number generator 24, the switching section 25, the counter 143, the permutation section 146, the take-out section 147, the comparison section 148, the packet extinction judgment section 149, the packet discard section 150, and the number of output times adjustment section 154 in the above-described cryptogram decoders 20, 20a to 20d, 20c', 20d', 20c'', and 20d'', or the functions (all of the functions or part of them) as the transmission/reception section 152 and the synchronization adjustment section 153 in the above-described communication devices 3a and 3b can be realized by a computer (including a CPU, an information processing device, and various terminals) that executes a predetermined application program (encryption program/cryptogram decoding program).

The program is provided in a form recorded in a computer-readable recording medium such as, for example, a flexible disc, a CD (CD-ROM, CD-R, CD-RW, etc.), and a DVD (DVD-ROM, DVD-RAM, DVD-R, DVD-RW, DVD+R, DVD+RW, etc.) etc. In this case, the computer reads the program from the recording medium, transfers it to an internal storage device or an external storage device, and stores it for use. Further, the program may be recorded in a storage device (a recording medium) such as, for example, a magnetic disc, an optical disc, and an opto-magnetic disc and provided to a computer from the storage device via a communication line.

Here, a computer is a concept including hardware and an OS (operating system) and means hardware that operates under the control of the OS. Further, when hardware is operated with an application program alone without an OS, the hardware itself corresponds to a computer. Hardware is provided with at least a microprocessor such as a CPU and a means to read a program recorded in a recording medium. An application program as the above-mentioned encryption program or cryptogram decoding program includes program code for causing such a computer described above to realize the functions (all of the functions or part of them) as the pseudo random number generator 11, the first modulation section 12, the physical random number generator 13, the second modulation sections 14, the channel-coding section 15, the counter 133, the incorporation section 135, the packet section 136, the channel-decoding section 23, the pseudo random number generator 21, the demodulation sections 22, the physical random number generator 24, the switching section 25, the counter 143, the permutation section 146, the take-out section 147, the comparison section 148, the packet extinction judgment section 149, the packet discard section 150, the number of output times adjustment section 154, the transmission/reception section 152, and the synchronization adjustment section 153. Alternatively, it may also be possible to realize part of the functions by an OS not by an application program.

Furthermore, as the recording medium in the present embodiment, in addition to the above-described flexible disc, CD, DVD, magnetic disc, optical disc, and opto-magnetic disc, a variety of computer-readable media such as an IC card, ROM cartridge, magnetic tape, punch card, internal storage device (memory as RAM, ROM, etc.) of a computer, an external storage device, and a printing on which code such as bar code is printed may be used.

INDUSTRIAL APPLICABILITY

As described above, according to the present invention, by obtaining encrypted data by further performing modulation of the modulation output by a pseudo random number using a physical random number, it is made possible for the legitimate receiver side to decode the encrypted data only by the pseudo random number without using the physical random number while securing high safety against the know plain-text attack by giving an irregular association to the encrypted data by the physical random number. At this time, the encryption technique of the present invention can be realized by code, therefore, it is possible to provide an encryption technique that can be used in radio wave communication and electrical communication and can be stored as data in electric memories and a variety of recoding media, and further can minimize the influence on the communication speed without being influenced by noises. Therefore the present invention is suitable for the system transmitting and receiving information in an encrypted form.

What is claimed is:

1. An encryption method comprising:
    modulating input data into a multilevel signal by associating the data with one set of a plurality of sets of pairs of states by a pseudo random number;
    providing an irregular association to the multilevel signal by modulating the multilevel signal by associating the multilevel signal with a discrete value determined by a physical random number so that the modulated multilevel signal belongs to either a first range which is determined by said pseudo random number when a state of said input data is one state of each pair of states, or a second range which is determined by said pseudo random number when said state of said input data is the other state of each pair of states and which does not overlap said first range to be exclusive to said first range, the irregular association being provided to the multilevel signal by adding/subtracting the output value of said physical random number to/from the multilevel signal; and channel-coding the modulated multilevel signal, to which the irregular association is provided, into a desired coded word and outputting the coded word as encrypted data, wherein: the decoded signal obtained by channel-decoding said encrypted data is demodulated into said input data by determining whether the decoded signal belongs to said first range or said second range based on a demodulation pseudo random number and associating the decoded signal with either state of each pair of states based on the determined range and said demodulation pseudo random number.

2. The encryption method according to claim 1, wherein the number of states selected by said physical random number is equal to or greater than 4 and is set so as not to exceed the number of sets of said pair of states.

3. The encryption method according to claim 1, wherein the number of states selected by said physical random number is determined in accordance with a desired encryption strength, the number of said pairs of states is determined in accordance with the number of states, and the number of states of said pseudo random number is determined in accordance with the number of said pairs of states.

4. A cryptogram decoding method comprising:

channel-decoding encrypted data into a decoded signal, said encrypted data being: obtained by performing a first modulation for modulating input data into a multilevel signal by associating the data with one set of a plurality of sets of pairs of states by a pseudo random number and by channel-coding the output of a second modulation into a desired coded word, said second modulation being carried out through providing an irregular association to the multilevel signal by modulating the multilevel signal by associating the multilevel signal with a discrete value determined by a physical random number so that the modulated multilevel signal belongs to either a first range which is determined by said pseudo random number when a state of said input data is one state of each pair of states, or a second range which is determined by said pseudo random number when said state of said input data is the other state of each pair of states and which does not overlap said first range to be exclusive to said first range, the irregular association being provided to the multilevel signal by adding/subtracting the output value of said physical random number to/from the multilevel signal; and encrypted in such a manner that the decoded signal obtained by channel-decoding said encrypted data is demodulated into said input data by determining whether the decoded signal belongs to said first range or said second range based on said pseudo random number and associating the decoded signal with either state of each pair of states based on the determined range and said pseudo random number, wherein said decoded signal is demodulated into said input data by determining whether the decoded signal belongs to said first range or said second range by a demodulation pseudo random number based on the same encryption key as the encryption key having generated said pseudo random number used in said first modulation, and associating the decoded signal with either state of each pair of states based on the determined range and said demodulation pseudo random number.

5. An encryptor comprising:
at least one hardware processor providing:
a pseudo random number generation section for generating a pseudo random number based on an encryption key;
a first modulation section for modulating input data into a multilevel signal by associating the data with one set of a plurality of sets of pairs of states by a pseudo random number generated by said pseudo random number generation section;
a physical random number generation section for generating a physical random number based on a physical phenomenon;
a second modulation section for providing an irregular association to the multilevel signal from said modulation section by modulating the multilevel signal by associating the multilevel signal with a discrete value determined by a physical random number generated by said physical random number generation section so that the modulated multilevel signal belongs to either a first range which is determined by said pseudo random number when a state of said input data is one state of each pair of states, or a second range which is determined by said pseudo random number when said state of said input data is the other state of each pair of states and which does not overlap said first range to be exclusive to said first range, the irregular association being provided to the multilevel signal by adding/subtracting the output value of said physical random number to/from the multilevel signal; and
a channel coding section for channel-coding the modulated multilevel signal from said second modulation section into a desired coded word and outputting said coded word as encrypted data, wherein:
modulation is performed by said first modulation section and said second modulation section so that the decoded signal obtained by channel-decoding said encrypted data is demodulated into said input data by determining whether the decoded signal belongs to said first range or said second range based on demodulation pseudo random number and associating the decoded signal with either state of each pair of states based on the determined range and said demodulation pseudo random number.

6. The encryptor according to claim 5, wherein the number of states selected by said physical random number is equal to or greater than 4 and is set so as not to exceed the number of sets of said pair of states.

7. A cryptogram decoder for decoding encrypted data, said encrypted data being: obtained by performing a first modulation for modulating input data into a multilevel signal by associating the data with one set of a plurality of sets of pairs of states by a pseudo random number and by channel-coding the output of a second modulation into a desired coded word, said second modulation being carried out through providing an irregular association to the multilevel signal by modulating the multilevel signal by associating the multilevel signal with a discrete value determined by a physical random number so that the modulated multilevel signal belongs to either a first range which is determined by said pseudo random number when a state of said input data is one state of each pair of states, or a second range which is determined by said pseudo random number when said state of said input data is the other state of each pair of states and which does not overlap said first range to be exclusive to said first range, the irregular association being provided to the multilevel signal by adding/subtracting the output value of said physical random number to/from the multilevel signal; and encrypted in such a manner that the decoded signal obtained by channel-decoding said encrypted data is demodulated into said input data by determining whether the decoded signal belongs to said first range or said second range based on said pseudo random number and associating the decoded signal with either state of each pair of states based on the determined range and said pseudo random number, said cryptogram decoder comprising:
at least one hardware processor providing:
a channel decoding section for channel-decoding said encrypted data into a decoded signal;
a demodulation pseudo random number generation section for generating a demodulation pseudo random number based on the same encryption key as the encryption key having generated said pseudo random number used in said first modulation; and
a demodulation section for demodulating said decoded signal into said input data by determining whether the decoded signal belongs to said first range or said second range by a demodulation pseudo random number generated by said demodulation pseudo random number generation section, and associating the decoded signal with either state of each pair of states based on the determined range and the demodulation pseudo random number.

8. A non-transitory computer readable recording medium in which an encryption program is recorded, the program causing a computer to function as:
a pseudo random number generation section for generating a pseudo random number based on an encryption key;
a first modulation section for modulating input data into a multilevel signal by associating the data with one set of a plurality of sets of pairs of states by a pseudo random number generated by said pseudo random number generation section;
a physical random number generation section for generating a physical random number based on a physical phenomenon;
a second modulation section for providing an irregular association to the multilevel signal from said first modulation section by modulating the multilevel signal by associating the multilevel signal with a discrete value determined by a physical random number generated by said physical random number generation section so that the modulated multilevel signal belongs to either a first range which is determined by said pseudo random number when a state of said input data is one state of each pair of states, or a second range which is determined by said pseudo random number when said state of said input data is the other state of each pair of states and which does not overlap said first range to be exclusive to said first range, the irregular association being provided to the multilevel signal by adding/subtracting the output value of said physical random number to/from the multilevel signal; and
a channel coding section for channel-coding the modulated multilevel signal from said second modulation section into a desired coded word and outputting said coded word as encrypted data,
wherein: causing said computer to perform modulation by said first modulation section and said second modulation section so that the decoded signal obtained by channel-decoding said encrypted data is demodulated into said input data by determining whether the decoded signal belongs to said first range or said second range based on a demodulation pseudo random number and associating the decoded signal with either state of each pair of states based on the determined range and said demodulation pseudo random number.

9. The non-transitory computer readable recording medium according to claim 8, wherein the number of states selected by said physical random number is equal to or greater than 4 and is set so as not to exceed the number of sets of said pair of states.

10. A non-transitory computer-readable recording medium in which a cryptogram decoding program is recorded, the program causing a computer to function as a cryptogram decoder for decoding encrypted data, said encrypted data being: obtained by performing a first modulation for modulating input data into a multilevel signal by associating the data with one set of a plurality of sets of pairs of states by a pseudo random number and by channel-coding the output of a second modulation into a desired coded word, said second modulation being carried out through providing an irregular association to the multilevel signal by modulating the multilevel signal by associating the multilevel signal with a discrete value determined by a physical random number so that the modulated multilevel signal belongs to either a first range which is determined by said pseudo random number when a state of said input data is one state of each pair of states, or a second range which is determined by said pseudo random number when said state of said input data is the other state of each pair of states and which does not overlap said first range to be exclusive to said first range, the irregular association being provided to the multilevel signal by adding/subtracting the output value of said physical random number to/from the multilevel signal; and encrypted in such a manner that the decoded signal obtained by channel-decoding said encrypted data is demodulated into said input data by determining whether the decoded signal belongs to said first range or said second range based on said pseudo random number and associating the decoded signal with either state of each pair of states based on the determined range and said pseudo random number, and causing said computer to function as:
a channel decoding section for channel-decoding said encrypted data into a decoded signal;
a pseudo random number generation section for generating a pseudo random number based on the same encryption key as the encryption key having generated said pseudo random number used in said first modulation; and
a demodulation section for demodulating said decoded signal into said input data by determining whether the decoded signal belongs to said first range or said second range by a pseudo random number generated by said pseudo random number generation section, and associating the decoded signal with either state of each pair of states based on the determined range and said pseudo random number.

11. A transmission/reception system comprising a first transmission/reception device and a second transmission/reception device connected to each other so that communication is possible,
wherein:
said first transmission/reception device is configured so as to provide a first encryptor for encrypting input data to be transmitted to said second transmission/reception device and a first cryptogram decoder for decoding encrypted data received from said second transmission/reception device;
said second transmission/reception device is configured so as to provide a second encryptor for encrypting input data to be transmitted to said first transmission/reception device and a second cryptogram decoder for decoding encrypted data received from said first transmission/reception device;

said first encryptor and said second encryptor respectively comprises:

a modulation pseudo random number generation section for generating a modulation pseudo random number based on an encryption key;

a first modulation section for modulating input data into a multilevel signal by associating the data with one set of a plurality of sets of pairs of states by a modulation pseudo random number generated by said modulation pseudo random number generation section;

a physical random number generation section for generating a physical random number based on a physical phenomenon;

a second modulation section for providing an irregular association to the multilevel signal from said first modulation section by modulating the multilevel signal by associating the multilevel signal with a discrete value determined by a physical random number generated by said physical random number generation section so that the modulated multilevel signal belongs to either a first range which is determined by said modulation pseudo random number when a state of said input data is one state of each pair of states, or a second range which is determined by said modulation pseudo random number when said state of said input data is the other state of each pair of states and which does not overlap said first range to be exclusive to said first range, the irregular association being provided to the multilevel signal by adding/subtracting the output value of said physical random number to/from the multilevel signal; and a channel coding section for channel-coding the modulated multilevel signal from said second modulation section into a desired coded word and outputting said coded word as encrypted data;

said first modulation section and said second modulation section are configured so that the decoded signal obtained by channel-decoding said encrypted data is demodulated into said input data by determining whether the decoded signal belongs to said first range or said second range based on a demodulation pseudo random number and associating the decoded signal with either state of each pair of states based on the determined range and said demodulation pseudo random number; and said first cryptogram decoder and said second cryptogram decoder are configured so as to respectively provide:

a channel decoding section for channel-decoding said encrypted data into a decoded signal;

a demodulation pseudo random number generation section for generating a demodulation pseudo random number based on the same encryption key as the encryption key having generated said modulation pseudo random number; and a demodulation section for demodulating said decoded signal into said input data by determining whether the decoded signal belongs to said first range or said second range by a demodulation pseudo random number generated by said demodulation pseudo random number generation section, and associating the decoded signal with either state of each pair of states based on the determined range and the demodulation pseudo random number.

12. The transmission/reception system according to claim 11 further comprising:

a means for inputting an authentication numerical sequence, having a length equal to or greater than the length of an encryption key for generating said modulation pseudo random number and said demodulation pseudo random number, as said input data of said first encryptor;

a means for inputting, after transmitting encrypted data of said authentication numerical sequence from said first encryptor to said second transmission/reception device, a decoded numerical sequence, obtained by decoding the encrypted data of said authentication numerical sequence by said second cryptogram decoder, as said input data of said second encryptor;

a means for transmitting the encrypted data of said decoded numerical sequence from said second encryptor to said first transmission/reception device;

a means for authenticating, when a response numerical sequence obtained by decoding the encrypted data of said decoded numerical sequence by said first cryptogram decoder coincides with said authentication numerical sequence, that said first transmission/reception device and said second transmission/reception device are legitimate communication parties to each other; and a means for confirming that said modulation pseudo random number of said first encryptor and said demodulation pseudo random number of said second cryptogram decoder are in synchronization with each other and said modulation pseudo random number of said second encryptor and said demodulation pseudo random number of said first cryptogram decoder are in synchronization with each other.

13. A public line system configured so as to provide an exchange office and a plurality of terminal devices that can communicate with each another via said exchange office, wherein:

each terminal device is configured so as to provide a first encryptor for encrypting input data to be transmitted to a specific terminal device via said exchange office and a first cryptogram decoder for decoding encrypted data received from said specific terminal device via said exchange office;

said exchange office is configured so as to provide an exchanger for performing an exchange operation for connecting each terminal device and said specific terminal device and a transmission/reception section interposed between each terminal device and said exchanger;

said transmission/reception section is configured so as to provide a second encryptor for receiving input data to be transmitted from said specific terminal device to each terminal device via said exchanger and encrypting the data and a second cryptogram decoder for decoding encrypted data to be transmitted from each terminal device to said specific terminal device and inputting the data into said exchanger;

said first encryptor and said second encryptor respectively comprises:

a modulation pseudo random number generation section for generating a modulation pseudo random number based on an encryption key;

a first modulation section for modulating input data into a multilevel signal by associating the data with one set of a plurality of sets of pairs of states by a modulation pseudo random number generated by said modulation pseudo random number generation section;

a physical random number generation section for generating a physical random number based on a physical phenomenon;

a second modulation section for providing an irregular association to the multilevel signal from said first modulation section by modulating the multilevel signal by associating the multilevel signal with a discrete value determined by a physical random number generated by said physical random number generation section so that the modulated multilevel signal belongs to either a first range which is determined by said modulation pseudo random number when a state of said input data is one state of each pair of states, or a second range which is determined by said modulation pseudo random number when said state of said input data is the other state of each pair of states and which does not overlap said first range to be exclusive to said first range, the irregular association being provided to the multilevel signal by adding/subtracting the output value of said physical random number to/from the multilevel signal; and a channel coding section for channel-coding the modulated multilevel signal from said second modulation section into a desired coded word and outputting said coded word as encrypted data;

said first modulation section and said second modulation section are configured so that the decoded signal obtained by channel-decoding said encrypted data is demodulated into said input data by determining whether the decoded signal belongs to said first range or said second range based on a demodulation pseudo random number and associating the decoded signal with either state of each pair of states based on the determined range and said demodulation pseudo random number; and said first cryptogram decoder and said second cryptogram decoder are configured so as to respectively provide:

a channel decoding section for channel-decoding said encrypted data into a decoded signal;

a demodulation pseudo random number generation section for generating a demodulation pseudo random number based on the same encryption key as the encryption key having generated said modulation pseudo random number; and a demodulation section for demodulating said decoded signal into said input data by determining whether the decoded signal belongs to said first range or said second range by a demodulation pseudo random number generated by said demodulation pseudo random number generation section, and associating the decoded signal with either state of each pair of states based on the determined range and the demodulation pseudo random number.

14. The encryptor according to claim 5, wherein said pseudo random number generation section, said first modulation section, said physical random number generation section, and said second modulation section are arranged in a tamper-resistant region for suppressing the probability distribution variations by physical disturbance in the physical random number generated by said physical random number generation section as well as suppressing the leakage of said encryption key and said pseudo random number.

15. The encryptor according to claim 14, wherein the pseudo random number generation section is configured so as to prohibit reset and repetition of said pseudo random number generation operation.

16. The encryptor according to claim 15, wherein said at least one hardware processor providing:

a nonvolatile first hold section for holding the number of input times of a clock signal for causing said pseudo random number generation section to perform said pseudo random number generation operation as said number of output times of pseudo random number and outputting said number of output times to the outside of said tamper-resistant region in response to a command from the outside of said tamper-resistant region; and a synchronization adjustment section for adjusting said number of output times of pseudo random number from said pseudo random number generation section based on said number of output times read from said first hold section in order to synchronize said pseudo random number generation operation by said pseudo random number generation section with a demodulation pseudo random number generation operation by a demodulation pseudo random number generation section of a cryptogram decoder in a destination communication device of said encrypted data.

17. The encryptor according to claim 16, wherein said at least one hardware processor providing:

a nonvolatile second hold section for holding the same random number table as that of a destination communication device;

a cryptogram transmission section for encrypting said number of output times of pseudo random number read from said first hold section into encrypted synchronization information based on said random number table held in said second hold section and transmitting said encrypted synchronization information to said destination communication device; and a decoding reception section for decoding the encrypted synchronization information received from said destination communication device into the number of output times of demodulation pseudo random number based on said random number table held in said second hold section, wherein said synchronization adjustment section, when said number of output times of demodulation pseudo random number on said destination communication device side decoded by said decoding reception section is greater than said number of output times of pseudo random number read from said first hold section, adjusts said number of output times of pseudo random number from said pseudo random number generation section to said number of output times of demodulation pseudo random number on said destination communication device side.

18. The cryptogram decoder according to claim 7, wherein said demodulation pseudo random number generation section and said demodulation section are arranged in a tamper-resistant region for suppressing the leakage of said encryption key and said demodulation pseudo random number.

19. The cryptogram decoder according to claim 18, wherein said demodulation pseudo random number generation section is configured so as to prohibit reset and repetition of said demodulation pseudo random number generation operation.

20. The cryptogram decoder according to claim 19, wherein said at least one hardware processor providing:

a nonvolatile first hold section for holding the number of input times of a clock signal for causing said demodulation pseudo random number generation section to perform said demodulation pseudo random number generation operation as said number of output times of demodulation pseudo random number and outputting said number of output times to the outside of said tamper-resistant region in response to a command from the outside of said tamper-resistant region; and a synchronization adjustment section for adjusting said number of output times of demodulation pseudo random number from said demodulation pseudo random number generation section based on said number of output times read from said first hold section in order to synchronize said demodulation pseudo random number generation operation by said demodulation pseudo random number generation section with a pseudo random number generation operation by a pseudo random number generation section of an encryptor in a sender communication device of said encrypted data.

21. The cryptogram decoder according to claim 20, wherein said at least one hardware processor providing:
   a nonvolatile second hold section for holding the same random number table as that of said sender communication device;
   a cryptogram transmission section for encrypting said number of output times of demodulation pseudo random number read from said first hold section into encrypted synchronization information based on said random number table held in said second hold section and transmitting said encrypted synchronization information to said sender communication device; and
   a decoding reception section for decoding the encrypted synchronization information received from said sender communication device into the number of output times of pseudo random number based on said random number table held in said second hold section, wherein
   said synchronization adjustment section, when said number of output times of pseudo random number on said sender communication device side decoded by said decoding reception section is greater than said number of output times of demodulation pseudo random number read from said first hold section, adjusts said number of output times of demodulation pseudo random number from said demodulation pseudo random number generation section to said number of output times of pseudo random number on said sender communication device side.

22. A communication system comprising:
   an encryptor provided in a sender communication device of encrypted data and transmitting said encrypted data to a destination communication device as a plurality of packets; and
   a cryptogram decoder provided in said destination communication device of said encrypted data and demodulating said encrypted data in each packet received from said encryptor of said sender communication device into said input data,
   wherein:
   said encryptor is configured so as to provide: a modulation pseudo random number generation section for generating a modulation pseudo random number based on an encryption key; a first modulation section for modulating input data into a multilevel signal by associating the data with one set of a plurality of sets of pairs of states by a modulation pseudo random number generated by said modulation pseudo random number generation section; a physical random number generation section for generating a physical random number based on a physical phenomenon; a second modulation section for providing an irregular association to the multilevel signal from said first modulation section by modulating the multilevel signal by associating the multilevel signal with a discrete value determined by a physical random number generated by said physical random number generation section so that the modulated multilevel signal belongs to either a first range which is determined by said modulation pseudo random number when a state of said input data is one state of each pair of states, or a second range which is determined by said modulation pseudo random number when said state of said input data is the other state of each pair of states and which does not overlap said first range to be exclusive to said first range, the irregular association being provided to the multilevel signal by adding/subtracting the output value of said physical random number to/from the multilevel signal; and a channel coding section for channel-coding the modulated multilevel signal from said second modulation section into a desired coded word and outputting said coded word as encrypted data, and perform modulation by said first modulation section and said second modulation section so that the decoded signal obtained by channel-decoding said encrypted data is demodulated into said input data by determining whether the decoded signal belongs to said first range or said second range based on a demodulation pseudo random number and associating the decoded signal with either state of each pair of states based on the determined range and said demodulation pseudo random number;
   said cryptogram decoder is configured so as to provide: a channel decoding section for channel-decoding said encrypted data into a decoded signal; a demodulation pseudo random number generation section for generating a demodulation pseudo random number based on the same encryption key as the encryption key having generated said pseudo random number used in said first modulation; and a demodulation section for demodulating a decoded signal into said input data by determining whether the decoded signal belongs to said first range or said second range by a demodulation pseudo random number generated by said demodulation pseudo random number generation section and associating the decoded signal with either state of each pair of states based on the determined range and the demodulation pseudo random number;
   a serial number about said plurality of packets or said number of output times of pseudo random number used in said first modulation section for said encrypted data in the container section of each packet is described in the header section of each packet to be transmitted from said encryptor to said cryptogram decoder; and
   said cryptogram decoder comprises a packet hold section for holding said plurality of packets from said encryptor and a permutation section for permutating said plurality of packets held in said packet hold section into an order in accordance with said serial number or said number of output times described in the header section of each packet and inputting said packets to said demodulation section.

23. The communication system according to claim 22, wherein:
   in said encrypted data in the container section of each packet to be transmitted from said encryptor to said cryptogram decoder, said serial number or said number of output times is included; and
   said cryptogram decoder comprises:
   a first comparison section for comparing said serial number or said number of output times described in the header section of each packet with said serial number or said number of output times included in the demodulation result of said encrypted data by said demodulation section; and
   a packet discard section for discarding said packet when the result of comparison by said first comparison section is that said serial numbers or said numbers of output times do not coincide.

24. The communication system according to claim 22, wherein:

in said encrypted data in the container section of each packet to be transmitted from said encryptor to said cryptogram decoder, a pseudo random number sequence generated by said pseudo random number generation section is included as an intrinsic authentication code for said packet; and said cryptogram decoder comprises:

a second comparison section for comparing said authentication code included in the demodulation result of said encrypted data by said demodulation section with a demodulation pseudo random number sequence corresponding to said authentication code generated by said demodulation pseudo random number generation section; and a packet discard section for discarding said packet when the result of comparison by said second comparison section is that said authentication codes do not coincide.

25. The communication system according to claim 23, wherein said cryptogram decoder comprises:

a packet extinction judgment section for judging, after receiving one of said plurality of packets and when a packet to be received in accordance with said serial number or said number of output times is not received within a predetermined time, that said packet has become extinct; and a number of output times adjustment section for adjusting, if said packet discard section has discarded the packet or if said packet extinction judgment section has judged that the packet has become extinct, said number of output times of demodulation pseudo random number from said demodulation pseudo random number generation section to a number of output times in accordance with said serial number or said number of output times of a packet normally received after the discarded packet or the packet judged to have become extinct.

26. The communication system according to claim 23, wherein:

said encryptor comprises an incorporation section for determining a storage position in said container section of each packet of said serial number or said number of output times or said authentication code included in each of said packets based on said pseudo random number generated by said pseudo random number generation section and incorporating said serial number or said number of output times or said authentication code into said input data so that said serial number or said number of output times or said authentication code is arranged in said determined storage position; and said cryptogram decoder comprises a take-out section for taking out said serial number or said number of output times or said authentication code from the demodulation result by said demodulation section based on said demodulation pseudo random number generated by said demodulation pseudo random number generation section.

\* \* \* \* \*

UNITED STATES PATENT AND TRADEMARK OFFICE
CERTIFICATE OF CORRECTION

| | | |
|---|---|---|
| PATENT NO. | : 7,822,204 B2 | |
| APPLICATION NO. | : 11/525164 | |
| DATED | : October 26, 2010 | |
| INVENTOR(S) | : Setsuo Yoshida et al. | |

It is certified that error appears in the above-identified patent and that said Letters Patent is hereby corrected as shown below:

Title Page (73) Assignee:

Please ADD --Osamu Hirota, Yokohama, Japan--

Signed and Sealed this
Twenty-eighth Day of December, 2010

David J. Kappos
*Director of the United States Patent and Trademark Office*